US012362944B2

(12) United States Patent
Li et al.

(10) Patent No.: US 12,362,944 B2
(45) Date of Patent: Jul. 15, 2025

(54) PROCESSOR WITH AN ELLIPTIC CURVE CRYPTOGRAPHIC ALGORITHM AND A DATA PROCESSING METHOD THEREOF

(71) Applicant: Shanghai Zhaoxin Semiconductor Co., Ltd., Shanghai (CN)

(72) Inventors: Yanting Li, Beijing (CN); Zhenhua Huang, Beijing (CN); Yingbing Guan, Shanghai (CN); Yun Shen, Beijing (CN); Lei Yi, Xi'an (CN); Shuang Yang, Shanghai (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 495 days.

(21) Appl. No.: 17/837,607

(22) Filed: Jun. 10, 2022

(65) Prior Publication Data
US 2023/0085569 A1 Mar. 16, 2023

(30) Foreign Application Priority Data

Sep. 1, 2021 (CN) .......................... 202111020825.6

(51) Int. Cl.
*H04L 9/32* (2006.01)
*G06F 9/30* (2018.01)
(Continued)

(52) U.S. Cl.
CPC .......... *H04L 9/3247* (2013.01); *G06F 9/3001* (2013.01); *G06F 9/30029* (2013.01);
(Continued)

(58) Field of Classification Search
CPC .. H04L 9/3247; H04L 9/3242; G06F 9/30101
See application file for complete search history.

(56) References Cited

U.S. PATENT DOCUMENTS 7,853,012 B2 * 12/2010 Sarangarajan ........ H04L 9/3066
380/263
8,261,085 B1 9/2012 Gutierrez
(Continued)

FOREIGN PATENT DOCUMENTS

CN 1700637 A 11/2005
CN 102694649 A 9/2012
(Continued)

OTHER PUBLICATIONS

Non-Final Office Action dated Jul. 15, 2024, issued in U.S. Appl. No. 17/837,695 (copy not provided).
(Continued)

*Primary Examiner* — Dhairya A Patel
(74) *Attorney, Agent, or Firm* — McClure, Qualey & Rodack, LLP

(57) ABSTRACT

A processor with an elliptic curve cryptographic algorithm and a data processing method thereof are shown. The processor has first register storing a Hash value pointer, and a second register, storing a private key pointer. In response to a first elliptic curve cryptographic instruction of an instruction set architecture, the processor reads a first storage space within a system memory by referring to the first register to get a Hash value of the data to be signed, reads a private key by referring to the second register, performs a signature procedure using the elliptic curve cryptographic algorithm on the Hash value based on the private key to generate a digital signature, and programs the digital signature into a second storage space within the system memory.

37 Claims, 38 Drawing Sheets

(51) Int. Cl.
*H04L 9/30* (2006.01)
*G06F 7/72* (2006.01)

(52) U.S. Cl.
CPC ........ *G06F 9/30101* (2013.01); *H04L 9/3066* (2013.01); *H04L 9/3242* (2013.01); *G06F 7/725* (2013.01); *G06F 9/30007* (2013.01); *H04L 2209/12* (2013.01)

(56) References Cited

U.S. PATENT DOCUMENTS

| | | | |
|---|---|---|---|
| 9,893,885 | B1 | 2/2018 | Miller |
| 10,038,561 | B2* | 7/2018 | Li ................. H04L 9/3066 |
| 10,936,759 | B1 | 3/2021 | Chatterjee |
| 11,336,440 | B2* | 5/2022 | Shpurov ............ G06Q 30/0226 |
| 11,823,009 | B1 | 11/2023 | Stapleton |
| 12,149,619 | B2* | 11/2024 | Li ................. H04L 9/0643 |
| 12,149,620 | B2* | 11/2024 | Li ................. H04L 9/3066 |
| 12,155,763 | B2* | 11/2024 | Li ................. H04L 9/0869 |
| 12,212,655 | B2* | 1/2025 | Huang ............... H04L 9/3247 |
| 12,243,115 | B2* | 3/2025 | Geng ................ G06Q 20/3827 |
| 2005/0188216 | A1 | 8/2005 | Crispin |
| 2008/0256336 | A1 | 10/2008 | Henry |
| 2008/0292100 | A1 | 11/2008 | Komano |
| 2010/0106979 | A1 | 4/2010 | Krig |
| 2010/0107249 | A1 | 4/2010 | Krig |
| 2010/0131770 | A1* | 5/2010 | Torrubia ............. G06F 21/51 713/176 |
| 2010/0250966 | A1 | 9/2010 | Olson |
| 2011/0173452 | A1* | 7/2011 | Nan ................. H04L 9/3073 380/279 |
| 2012/0221845 | A1 | 8/2012 | Ferris |
| 2012/0221847 | A1 | 8/2012 | Ducharme |
| 2012/0221852 | A1 | 8/2012 | Ducharme |
| 2012/0328091 | A1 | 12/2012 | Callen |
| 2014/0164789 | A1* | 6/2014 | Kaplan ............. G06F 21/572 713/191 |
| 2014/0195782 | A1 | 7/2014 | Yap |
| 2014/0258736 | A1 | 9/2014 | Merchan |
| 2014/0372765 | A1* | 12/2014 | Zaverucha ........... H04L 9/3242 713/176 |
| 2015/0039904 | A1 | 2/2015 | Matsuda |
| 2015/0143105 | A1 | 5/2015 | Perrine |
| 2016/0092688 | A1 | 3/2016 | Wolrich |
| 2017/0141914 | A1 | 5/2017 | Satpathy |
| 2018/0026798 | A1* | 1/2018 | Susella ............. H04L 9/3066 713/180 |
| 2018/0241554 | A1 | 8/2018 | Ghosh |
| 2018/0288069 | A1* | 10/2018 | Burchard ............ H04L 63/123 |
| 2019/0245686 | A1 | 8/2019 | Rahimi |
| 2020/0067907 | A1* | 2/2020 | Avetisov ............. H04L 67/133 |
| 2020/0117825 | A1* | 4/2020 | Vaswani ................. H04L 9/50 |
| 2020/0380140 | A1 | 12/2020 | Medwed |
| 2021/0184843 | A1* | 6/2021 | Shpurov .............. H04L 9/0861 |
| 2021/0201409 | A1 | 7/2021 | Hoshizuki |
| 2021/0218547 | A1 | 7/2021 | Weiler |
| 2021/0234678 | A1 | 7/2021 | Armleder |
| 2021/0312055 | A1 | 10/2021 | Kloth |
| 2022/0075873 | A1 | 3/2022 | Gao |
| 2022/0121781 | A1 | 4/2022 | Klapman |
| 2023/0078830 | A1* | 3/2023 | Li ............................. G06F 9/223 713/168 |
| 2023/0269076 | A1 | 8/2023 | Brandt |
| 2024/0411925 | A1* | 12/2024 | Wang ....................... H04L 9/30 |

FOREIGN PATENT DOCUMENTS

| | | |
|---|---|---|
| CN | 102739396 A | 10/2012 |
| CN | 104753684 A | 7/2015 |
| CN | 107276745 A | 10/2017 |
| CN | 111984962 A | 11/2020 |
| CN | 112149152 A | 12/2020 |
| CN | 112182609 A | 1/2021 |
| CN | 113078997 A | 7/2021 |
| CN | 1133193962 A | 7/2021 |
| KR | 20090070060 A | 7/2009 |

OTHER PUBLICATIONS

Shen, S., et al.; "The SM3 Cryptographic Hash Function, draft-sca-cfrg-sm3-01;" Network Working Group; Jul. 2018; pp. 1-140.
Notice of Allowance dated Aug. 22, 2024, issued in U.S. Appl. No. 17/837,582 (copy not provided).
Notice of Allowance dated Aug. 28, 2024, issued in U.S. Appl. No. 17/837,674 (copy not provided).
Notice of Allowance dated Sep. 5, 2024, issued in U.S. Appl. No. 17/837,649 (copy not provided).
Notice of Allowance dated Sep. 16, 2024, issued in U.S. Appl. No. 17/837,627 (copy not provided).
Non-Final Office Action issued in Utility U.S. Appl. No. 17/837,559, filed Jun. 10, 2022, mailed Nov. 21, 2024.
Non-Final Office Action dated Mar. 28, 2024, issued in U.S. Appl. No. 17/837,627 (copy not provided).
Non-Final Office Action dated Apr. 24, 2024, issued in U.S. Appl. No. 17/837,582 (copy not provided).
Non-Final Office Action dated Apr. 25, 2024, issued in U.S. Appl. No. 17/837,674 (copy not provided).

* cited by examiner

204

| | Input | Output |
|---|---|---|
| EAX | EAX=0, message padding is required for the input message m; EAX=-1, the input message m does not require message padding | if the input register EAX is 0, at the end of the SM3 algorithm, EAX is updated to the value of ECX; if the input register EAX is -1, at the end of the SM3 algorithm, no change is made on EAX |
| ECX | a length of input message m; EAX=0, a length measured in bytes is stored in ECX; EAX=-1, a length measured in units of 64-byte block is stored in ECX | if the input register EAX is 0, at the end of the SM3 algorithm, no change is made on ECX; if the input register EAX is -1, at the end of the SM3 algorithm, ECX is reset to zero |
| ESI | input message pointer | Increased by an address increment; if the input register EAX is 0, an address increment made on the input message pointer is the input message length stored in ECX; if the input register EAX is -1, the address increment made on the input message pointer is set by multiplying the input message length obtained from ECX by 64. |
| EDI | Hash value pointer | not changed |

FIG. 2A-2

| 212 → | 0xF3 | 0x0F 0xA6 | 0xE8 | non | non | non |
|---|---|---|---|---|---|---|
| 214 → | prefix | Opcode | ModR/M | SIB | Displacement | Immediate |

| | Input | Output |
|---|---|---|
| EAX | EAX=0, message padding is required for the input message m; EAX=-1, the input message m does not require message padding | if the input register EAX is 0, at the end of the SM3 algorithm, EAX is updated to the value of ECX; if the input register EAX is -1, at the end of the SM3 algorithm, no change is made on EAX |
| ECX | a length of input message m; EAX=0, a length measured in bytes is stored in ECX; EAX=-1, a length measured in units of 64-byte block is stored in ECX | if the input register EAX is 0, at the end of the SM3 algorithm, no change is made on ECX; if the input register EAX is -1, at the end of the SM3 algorithm, ECX is reset to zero |
| ESI | an information pointer pointing to a storage space within the system memory which stores an input message pointer and a Hash value pointer | not changed |

| | Input | | Output |
|---|---|---|---|
| EAX | EAX=0, message padding is required for the input message m; EAX=-1, the input message m does not require message padding | EAX | if the input register EAX is 0, at the end of the SM3 algorithm, EAX is updated to the value of ECX; if the input register EAX is -1, at the end of the SM3 algorithm, no change is made on EAX |
| ECX | a length of input message m; EAX=0, a length measured in bytes is stored in ECX; EAX=-1, a length measured in units of 64-byte block is stored in ECX | ECX | if the input register EAX is 0, at the end of the SM3 algorithm, no change is made on ECX; if the input register EAX is -1, at the end of the SM3 algorithm, ECX is reset to zero |
| ESI | input message pointer | ESI | Increased by an address increment; if the input register EAX is 0, an address increment made on the input message pointer is the input message length stored in ECX; if the input register EAX is -1, the address increment made on the input message pointer is set by multiplying the input message length obtained from ECX by 64. |
| EDI | 0 | EDI | an internal register number |

FIG. 2C-2

| 232 → | 0xF3 | 0x0F 0xA6 | 0xE8 | non | input message pointer | Hash value pointer |
|---|---|---|---|---|---|---|
| | prefix | Opcode | ModR/M | SIB | InPointer | OutPointer |

| | Input | | Output |
|---|---|---|---|
| EAX | EAX=0, message padding is required for the input message m; EAX=-1, the input message m does not require message padding | EAX | if the input register EAX is 0, at the end of the SM3 algorithm, EAX is updated to the value of ECX; if the input register EAX is -1, at the end of the SM3 algorithm, no change is made on EAX |
| ECX | a length of input message m; EAX=0, a length measured in bytes is stored in ECX; EAX=-1, a length measured in units of 64-byte block is stored in ECX | ECX | if the input register EAX is 0, at the end of the SM3 algorithm, no change is made on ECX; if the input register EAX is -1, at the end of the SM3 algorithm, ECX is reset to zero |

FIG. 2D

| 0xF2 | 0x0F 0xA6 | 0xC0 | non | non | non |
|---|---|---|---|---|---|
| prefix | Opcode | ModR/M | SIB | Displacement | Immediate |

| | Input | | Output |
|---|---|---|---|
| EAX | plaintext input pointer for M | EAX | modified by an address increment which is the number of bytes of the plaintext input M |
| EBX | encryption public key pointer for $P_B$ | ECX | the number of bytes of the ciphertext output C |
| ECX | byte number of the plaintext input M | EDI | modified by an address increment which is the number of bytes of the ciphertext output C |
| EDX | control word cw (an encryption code 6'b 000001) | | |
| ESI | intermediate variable pointer | | |
| EDI | ciphertext output pointer for C | | |

| Input | | Output | |
|---|---|---|---|
| EAX | Hash value pointer for e | ECX | the number of bytes of the digital signature (r, s) |
| EBX | private key pointer for $d_A$ | EDI | increased by an address increment that is the number of bytes of the digital signature (r, s) |
| EDX | control word cw, which is 6'b 000100, representing the signature procedure | | |
| ESI | intermediate variable pointer | | |
| EDI | signature pointer for digital signal (r, s) | | |

| | Input | Output |
|---|---|---|
| EAX | Hash value pointer for e' | show the success of signature verification by "1", and to show the failed signature verification by "0" |
| EBX | public key pointer for $P_A$ | |
| EDX | control word cw, which is 6'b 001000, representing the signature verification procedure | |
| ESI | intermediate variable pointer | |
| EDI | signature pointer for digital signal (r', s') | |

FIG. 14

| | Input | Output |
|---|---|---|
| EDX | control word cw, which is 6'b 010000, representing the first key exchange procedure | |
| ESI | intermediate variable pointer | |
| EDI | key pair output pointer for ($r_A$, $R_A$) | EDI not changed |

|  | Input | | Output | |
|---|---|---|---|---|
| EAX | key exchange information pointer, pointing to $r_A$, $R_A$, $R_B$, $P_B$, $d_A$, $P_A$, $ID_A\_len$, $ID_A$, $ID_B\_len$, and $ID_B$ | | EDI | not changed |
| ECX | bit length klen of shared key | | | |
| EDX | control word cw: 6'b 010010 (irrelevant to Hash values), or 6'b 010110 (depending on Hash values) | | | |
| ESI | intermediate variable pointer | | | |
| EDI | shared key pointer, indicating the storage of $K_A$ (or even $S_1$ and $S_A$) | | | |

PROCESSOR WITH AN ELLIPTIC CURVE CRYPTOGRAPHIC ALGORITHM AND A DATA PROCESSING METHOD THEREOF

CROSS REFERENCE TO RELATED APPLICATIONS

This application claims priority of China Patent Application No. 202111020825.6 filed on Sep. 1, 2021, the entirety of which is incorporated by reference herein.

BACKGROUND

Field of the Invention

The present application relates to a processor with a cryptographic algorithm and a data processing method performed by the processor.

Description of the Related Art

The Organization of State Commercial Administration of China has issued a variety of cryptographic algorithms, including SM2, SM3, SM4 and other cryptographic algorithms, replacing RSA (abbreviated from Rivest-Shamir-Adleman), SHA (abbreviated from Secure Hash Algorithm), AES (Advanced Encryption Standard), and other international general cryptographic algorithms.

SM2 is an elliptic curve cryptographic algorithm. In comparison with the other international standards, such as ECDSA (abbreviated from Elliptic Curve Digital Signature Algorithm) and ECDH (abbreviated from Elliptic-curve Diffie-Hellman), SM2 has a special design in signature and key exchange, which introduces a higher security mechanism. In addition to encryption and decryption, SM2 further involves such techniques as digital signature, signature verification, and key exchange.

SM3 is a Hash cryptographic algorithm. In particular, some functions of the SM3 algorithm may be frequently used in the SM2 algorithm.

Known technology uses software and/or specialized hardware (such as an external cryptographic card) to implement the SM2 algorithm. The use of software cannot effectively guarantee data security, and the use of specialized hardware increases the deployment costs.

How to perform an SM2 algorithm efficiently and more securely is an important area of research in this technical field.

BRIEF SUMMARY

In order to effectively ensure data security and reduce deployment costs, a processor with an elliptic curve cryptographic algorithm (SM2 algorithm) and its data processing method are introduced.

A processor in accordance with an exemplary embodiment of the present invention has a first register and a second register. The first register stores a Hash value pointer pointing to a first storage space within a system memory. A Hash value of data to be signed is stored in the first storage space. The second register stores a private key pointer pointing to a private key of a signer. In response to a first elliptic curve cryptographic instruction of an instruction set architecture, the processor reads the Hash value of the data to be signed from the first storage space by referring to the first register, reads the private key by referring to the second register, performs a signature procedure using the elliptic curve cryptographic algorithm on the Hash value based on the private key to generate a digital signature, and programs the digital signature into a second storage space within the system memory.

In another exemplary embodiment, a method for performing an elliptic curve cryptographic algorithm using a processor is shown, which comprises: in response to a first elliptic curve cryptographic instruction of an instruction set architecture, reading a first storage space of a system memory to obtain a Hash value of data to be signed, reading a private key, performing a signature procedure using the elliptic curve cryptographic algorithm on the Hash value based on the private key to generate a digital signature, and programming the digital signature into a second storage space within the system memory.

Based on the presented processor with the elliptic curve cryptographic algorithm (SM2 algorithm) and its data processing method, the intermediate data generated in the process of the elliptic curve cryptographic algorithm is protected within the internal storage space of the processor. It is impossible to access these intermediate data from outside the processor. Data security is greatly improved. In some exemplary embodiments, there is no need to purchase additional specialized hardware for the SM2 algorithm, thereby reducing the deployment costs.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIGS. 2A to 2D (FIG. 2A comprises FIGS. 2A-1 and 2A-2, and FIG. 2C comprises FIGS. 2C-1 and 2C-2) show examples regarding the instruction format of the ISA SM3 instruction, and further show the related design about the microcode UCODE;

FIG. 7 illustrates an instruction format 702 of an ISA SM2 instruction in accordance with an exemplary embodiment of the present application;

FIG. 8 presents a table 804 to introduce the design in the microcode UCODE related to the encryption procedure of SM2 algorithm;

FIG. 12 presents a table 1204 to introduce the design in the microcode UCODE related to the signature procedure of SM2 algorithm;

FIG. 14 presents a table 1404 to introduce the design in the microcode UCODE related to the signature verification procedure of SM2 algorithm;

FIG. 16 presents a table 1604 to introduce the design in the microcode UCODE related to the first key exchange procedure for the key exchange function of SM2 algorithm;

FIG. 20 presents a table 2004 to introduce the design in the microcode UCODE related to the third key exchange procedure for the key exchange function of SM2 algorithm;

DETAILED DESCRIPTION OF THE EMBODIMENTS

The following description is made for the purpose of illustrating the general principles of the invention and should not be taken in a limiting sense. The scope of the invention is best determined by reference to the appended claims.

The present application discloses a processor with a Hash cryptographic algorithm (SM3 algorithm), and proposes a Hash cryptographic instruction (SM3 instruction) that is an Instruction Set Architecture (ISA) instruction. In an exemplary embodiment, the microcode (UCODE) of the processor is specially designed for the execution of the SM3 instruction, and there may be a Hash cryptographic acceleration engine (SM3 engine) in a cryptographic unit of the processor. The processor decodes the SM3 instruction to microinstructions according to the microcode (UCODE). According to the microinstructions, the contents in the architectural registers are defined, read, and updated, and the SM3 engine operates, based on the architectural registers, to perform the SM3 algorithm to process an input message m for a Hash value transform. According to the SM3 algorithm, an initial Hash value V(0) is transformed into a final Hash value V(n) by message padding (generating the padded message m'), message splitting (dividing the padded message m' into n message blocks B(0), ..., B(n−1)), message expansion (expanding each message block B(i) to 132 words $W_0^i$ ... $W_{67}^i$, and $W_0^{i'}$ ... $W_{63}^{i'}$), and an iterative compression function (e.g., based on the expansion result of each message block B(i), iteratively transforming the Hash value from V(i) to V(i+1)). The instruction set supported by the processor may be an x86 instruction set. The intermediate data (for example, $W_0^i$ ... $W_{67}^i$, and $W_0^{i'}$ ... $W_{63}^{i'}$, or, V(1) to V(n−1), and so on) generated during the transform from the initial Hash value V(0) to the final Hash value V(n) can be safely hidden in the cryptographic unit, without being exposed on the architectural registers.

Figure 1:
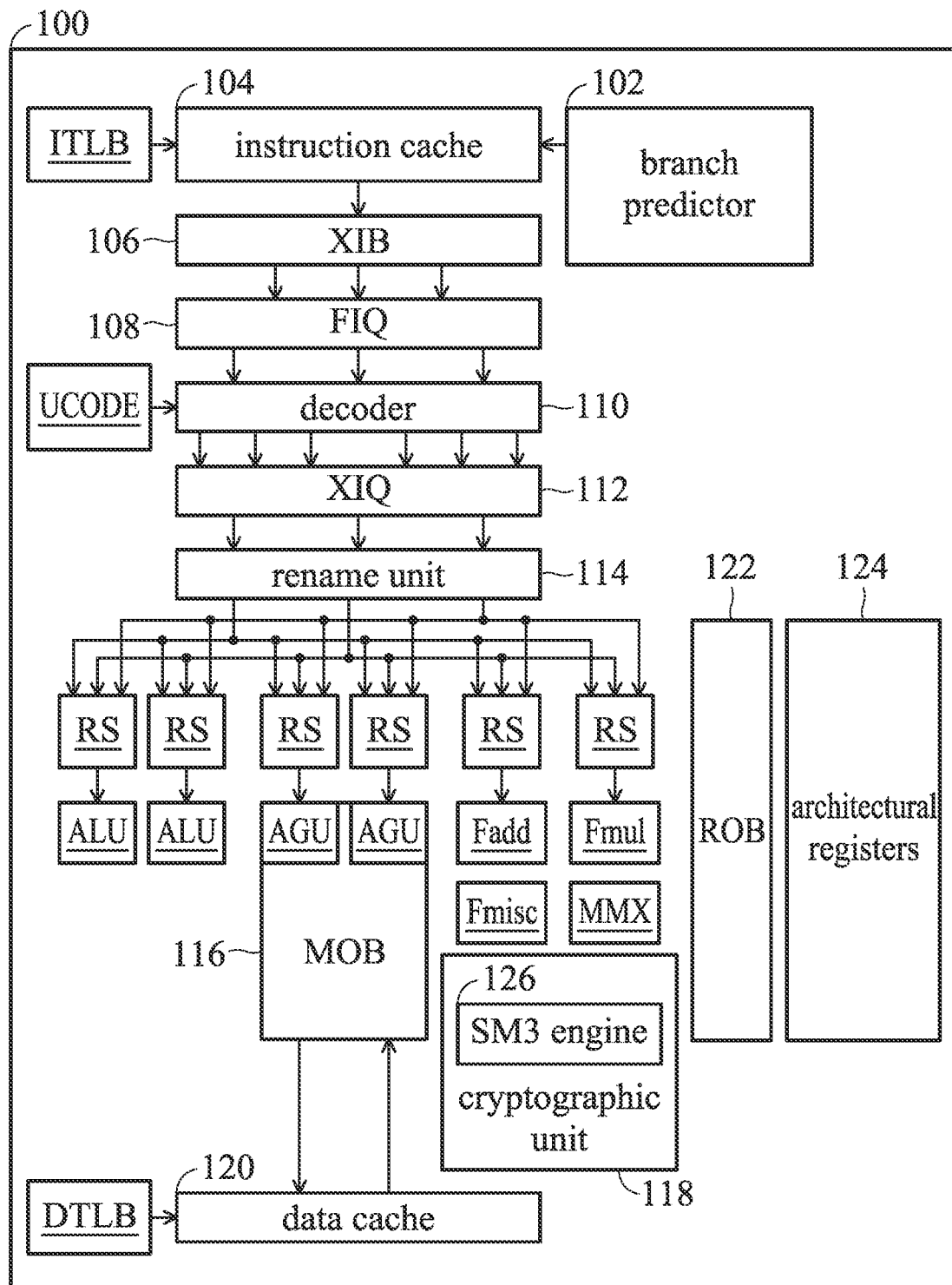
FIG. 1 is a block diagram illustrating a processor 100 in accordance with an exemplary embodiment of the present application.

FIG. 1 is a block diagram illustrating a processor 100 in accordance with an exemplary embodiment of the present application. According to a branch predictor 102, an instruction translation lookaside buffer (ITLB) is checked and instructions are loaded into the instruction cache 104 and then buffered in an instruction buffer (XIB) 106, and then pushed into a format instruction queue (FIQ) 108 waiting to be decoded by the decoder 110. Based on microcode (UCODE, stored in a microcode storage device), the decoder 110 decodes the received instructions into microinstructions which can be recognized by the pipelined hardware of the processor 100. The microinstructions are pushed into an instruction queue (XIQ) 112, and then are distributed into the corresponding reservation stations RS via a rename unit 114, to drive the arithmetic logical units ALUs, or the address generating units AGU of a memory order buffer (MOB) 116, or the hardware Fadd, Fmul, Fmisc, and MMX, or a cryptographic unit 118. The data required in calculations may be loaded into a data cache 120 by checking a data translation lookaside buffer DTLB, and then stored in the memory order buffer (MOB) 116. The processor 100 further includes a reorder buffer (ROB) 122 and a set of architectural registers 124 required in the calculations.

The cryptographic unit 118 includes an SM3 engine 126. In the microcode UCODE, there are microinstructions about accessing the architectural registers 124 associated with an ISA SM3 instruction. For example, the accessed registers may provide information about how to preprocess the input message m (e.g., showing whether to perform message padding on the input message m), and what size the input message m is. In some exemplary embodiments, the accessed registers further provide information about an input message pointer pointing to the input message m, and a Hash value pointer indicating the storage of a Hash value. Based on the microcode UCODE, the decoder 110 decodes the SM3 instruction of the present application (which is an ISA instruction) into a plurality of microinstructions that can be recognized by the pipelined hardware of the processor 100, interprets the contents of the architecture register 124 according to the microinstructions to obtain an initial Hash value V(0) and an input message m, and drives the SM3 engine 126 to perform a Hash value transform to generate a final Hash value V(n). The decoded microinstructions include an engine driving microinstruction (an SM3 engine microinstruction), which is operative to drive the SM3 engine 126. The decoded microinstructions are further operative to read and update the architectural registers 124, and operate the cryptographic unit 118 to perform the SM3 algorithm on the input message m.

FIGS. 2A to 2D show examples regarding the instruction format of the ISA SM3 instruction, and further show the related design about the microcode UCODE. In addition to the illustrated embodiments, the format content (for example, the numerical code, opcode) and the register definition may have many variations.

Figures 1, 2A:
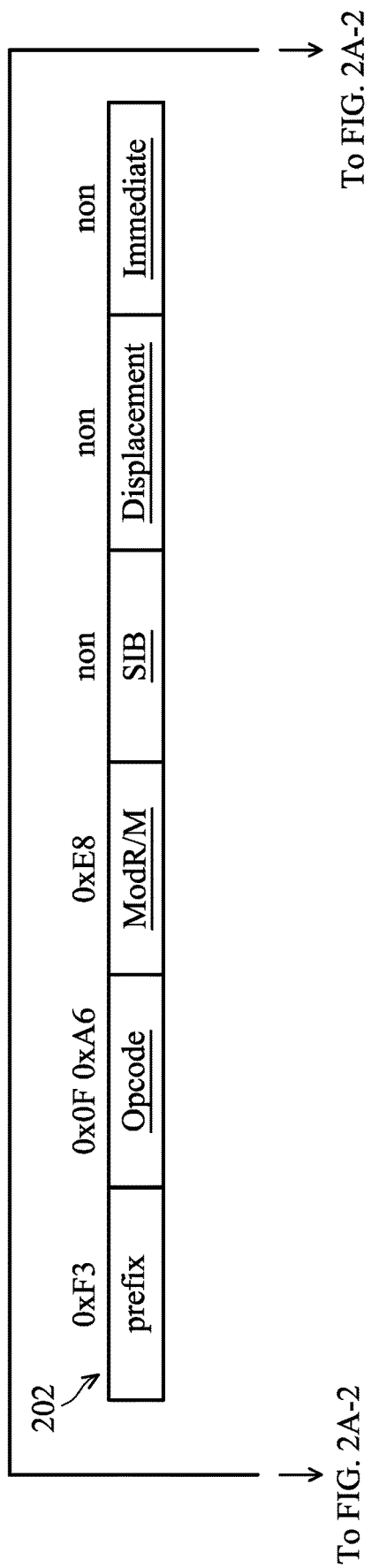

FIG. 2A-1 illustrates an instruction format 202 of the ISA SM3 instruction, and FIG. 2A-2 presents a table 204 to introduce the related design in the microcode UCODE. The prefix, opcode, and ModR/M fields presented in the instruction format 202 are filled: 0xF3 0x0F 0xA6 0xE8 (not limited thereto), wherein the prefix is 0xF3, the opcode is 0x0F 0xA6, and the ModR/M is 0xE8. The SIB, Displacement, and Immediate fields are not filled (non). When recognizing the code "0xF3 0x0F 0xA6 0xE8", the decoder 110 decodes the ISA SM3 instruction, based on the microcode UCODE, into a plurality of microinstructions. According to the microinstructions, the contents in the architectural registers 124 are defined, read and updated. Based on the contents in the architectural registers 124, the cryptographic unit 118 including the SM3 engine 126 operates to perform the SM3 algorithm on the input message m.

First, referring to the table 204, the following discussion is about how the microcode UCODE defines input registers for the ISA SM3 instruction. The input registers include the EAX, ECX, ESI, and EDI registers in the architectural registers 124.

The register EAX contains a message padding flag, which shows whether the input message m needs padding to satisfy the input bit length for performing the SM3 algorithm. If EAX=0, it means that message padding is required for the input message m. If EAX=−1, it means that the input message m does not require message padding. According to the microinstructions, if the message padding flag shows the padding demand, the input message m is padded till the message length becomes a multiple of the size of one message block. In an exemplary embodiment, each message block is 512 bits. When EAX=0, according to the microinstructions, the input message m is padded to generate the padded message m', wherein m'=m, 1, k{0}, 64{len}, and len is the bit length of the input message m. The padded message m' includes the input message m, 1-bit '1', k-bit zeros, and a 64-bit value representing len. The value k makes (len+1+k) divided by 512 result in a remainder 448. According to these microinstructions, the input message m or the padded message m' that is a multiple size of 512 bits is divided into 512-bit message blocks B(0), . . . , B(n−1), where n is an integer.

The register ECX stores a length of input message m. If EAX=0, a length measured in bytes is stored in the register ECX. If EAX=−1, a length measured in units of 64-byte block is stored in the register ECX.

The register ESI stores an input message pointer, which points to a storage space within the system memory that stores the input message m. The system memory may be a RAM connected to the processor, and the storage of the input message m can follow the ES segmentation technology. The register EDI stores a Hash value pointer, which points to a storage space within the system memory that stores the initial Hash value V(0) (may also follow the ES segmentation technology).

In addition, Table 204 further shows what architectural registers are defined as output registers in the microcode UCODE corresponding to the SM3 instruction. When the SM3 algorithm is finished and the final Hash value V(n) is calculated, the registers EAX, ECX, ESI, and EDI are set as follows.

The input message pointer maintained in the register ESI is increased in address. If the input register EAX is 0, the address increment made on the input message pointer is the input message length stored in the register ECX. If the input register EAX is −1, the address increment made on the input message pointer is set by multiplying the input message length obtained from the register ECX by 64. The Hash value pointer stored in the register EDI is not changed, so that the final Hash value V(n) calculated by the SM3 algorithm may overwrite the initial Hash constant V(0), and the updated initial Hash value is used in the processing of the next input message.

When the SM3 algorithm is finished, the register EAX and register ECX may be modified. In a case wherein the input register EAX is 0, at the end of the SM3 algorithm, no change is made on the register ECX, and the register EAX is updated to the value of the register ECX. In a case wherein the input register EAX is −1, at the end of the SM3 algorithm, the register ECX is reset to zero, and no change is made on the register EAX.

FIG. 2B illustrates another instruction format 212 of the ISA SM3 instruction, and presents a table 214 to introduce the related design in the microcode UCODE. The instruction format 212 is the same as the instruction format 202. When recognizing the code "0xF3 0x0F 0xA6 0xE8", the decoder 110 decodes the ISA SM3 instruction, based on the microcode UCODE, into a plurality of microinstructions. According to the microinstructions, the contents in the architectural registers 124 are defined, read and updated and, based on the contents in the architectural registers 124, the cryptographic unit 118 operates to perform the SM3 algorithm on the input message m.

Different from the table 204 which shows that according to the design of the microcode UCODE the register ESI stores an input message pointer and the register EDI stores a Hash value pointer, the table 214 shows that according to the design of the microcode UCODE the register ESI stores an information pointer pointing to a storage space within the system memory which stores an input message pointer and a Hash value pointer. The input message pointer points to a storage space within the system memory that stores the input message m. The Hash value pointer points to a storage space within the system memory that stores an initial Hash value V(0). As being used as an output register (referring to Table 214) for SM3 algorithm, the content in the register ESI is not changed by the microcode UCODE when the SM3 algorithm is finished.

Figures 1, 2C:
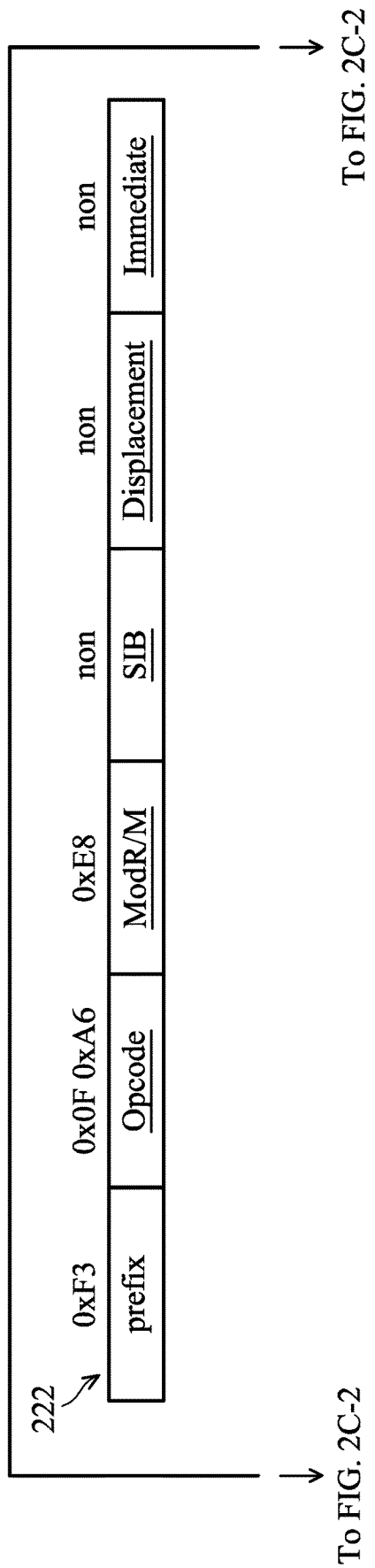

FIG. 2C-1 illustrates another instruction format 222 of the ISA SM3 instruction, and FIG. 2C-2 presents a table 224 to introduce the related design in the microcode UCODE. The instruction format 222 is the same as the instruction formats 202 and 212. When recognizing the code "0xF3 0x0F 0xA6 0xE8", the decoder 110 decodes the ISA SM3 instruction, based on the microcode UCODE, into a plurality of microinstructions. According to the microinstructions, the contents in the architectural registers 124 are defined, read and updated and, based on the contents in the architectural registers 124, the cryptographic unit 118 operates to perform the SM3 algorithm on the input message m.

Different from the table 204 which shows that according to the design of the microcode UCODE the register EDI stores a Hash value pointer, the table 224 of FIG. 2C-2 shows that according to the design of the microcode UCODE the register EDI is used as an input register and is set to 0, which means that the final Hash value V(n) should be stored in an internal register within the cryptographic unit 118. As being used as an output register (referring to Table 224) for SM3 algorithm, the register EDI is programmed to store an internal register number. The register EDI may be read later by a microinstruction. According to the internal register number read from the register EDI, the final Hash value V(n) stored in the internal register within the cryptographic unit 118 is read as the initial Hash value for processing of the next input message.

FIG. 2D illustrates another instruction format 232 of the ISA SM3 instruction, and presents a table 234 to introduce the related design in the microcode UCODE. Different from the instruction format 202/212/222, the instruction format 232 further provides two fields InPointer and OutPointer for the entry of an input message pointer and a Hash value pointer. The input message pointer points to an input message m, and the Hash value pointer points to an initial Hash value V(0). In this way, the use of the architectural registers 124 can be saved. In an exemplary embodiment of the instruction format 232 of the SM3 instruction, there may use 32 bits to indicate the input message pointer InPointer and another 32 bits to indicate the Hash value pointer OutPointer. When recognizing the code "0xF3 0x0F 0xA6 0xE8", the decoder 110 decodes the ISA SM3 instruction, based on the microcode UCODE, into a plurality of microinstructions. According to the microinstructions, the contents in the architectural registers 124 are defined, read and updated. Note that the registers ESI and EDI are not required in this example.

Figure 3:
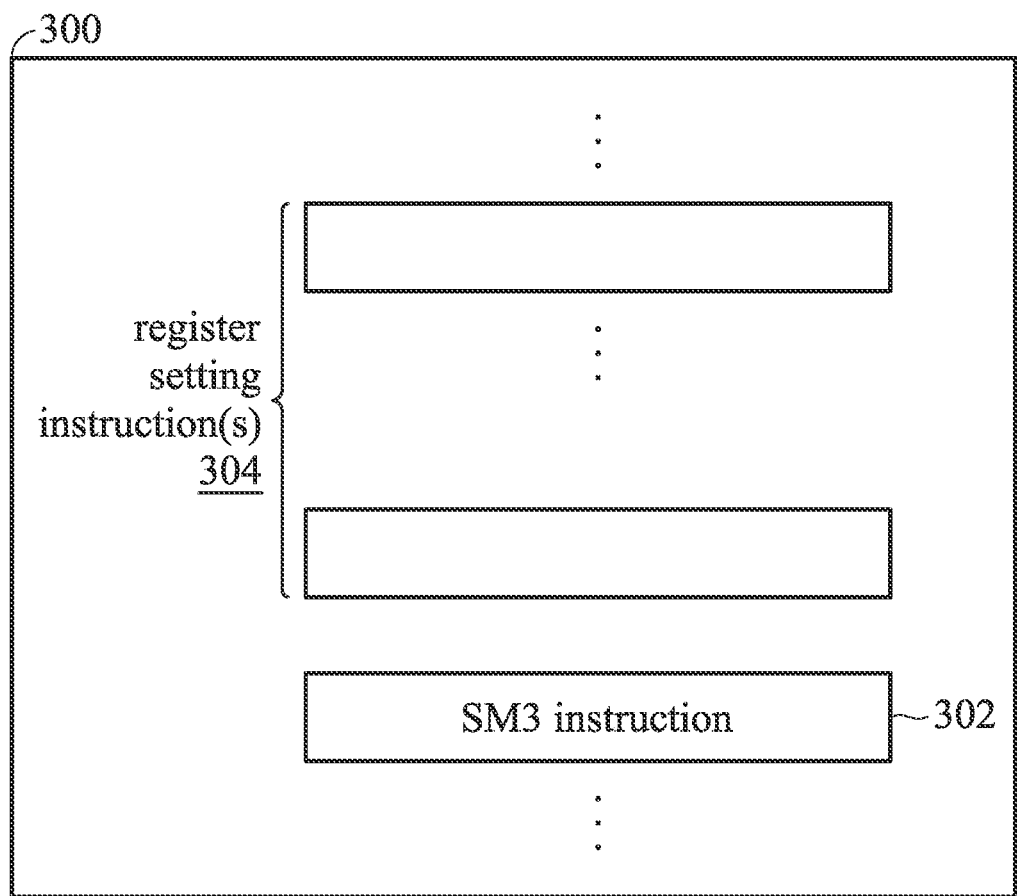
FIG. 3 illustrates the programming associated with ISA instructions in accordance with an exemplary embodiment of the present application.

FIG. 3 illustrates the programming associated with ISA instructions in accordance with an exemplary embodiment of the present application. In the program code 300, there may include an SM3 instruction 302 in the above format 202, 212, 222, or 232, and may further include register setting instruction(s) 304 prior to the SM3 instruction 302. According to the register setting instruction(s) 304, the architectural registers 124 are programmed to contain the information required during the execution of the SM3 instruction 302.

Figure 4:
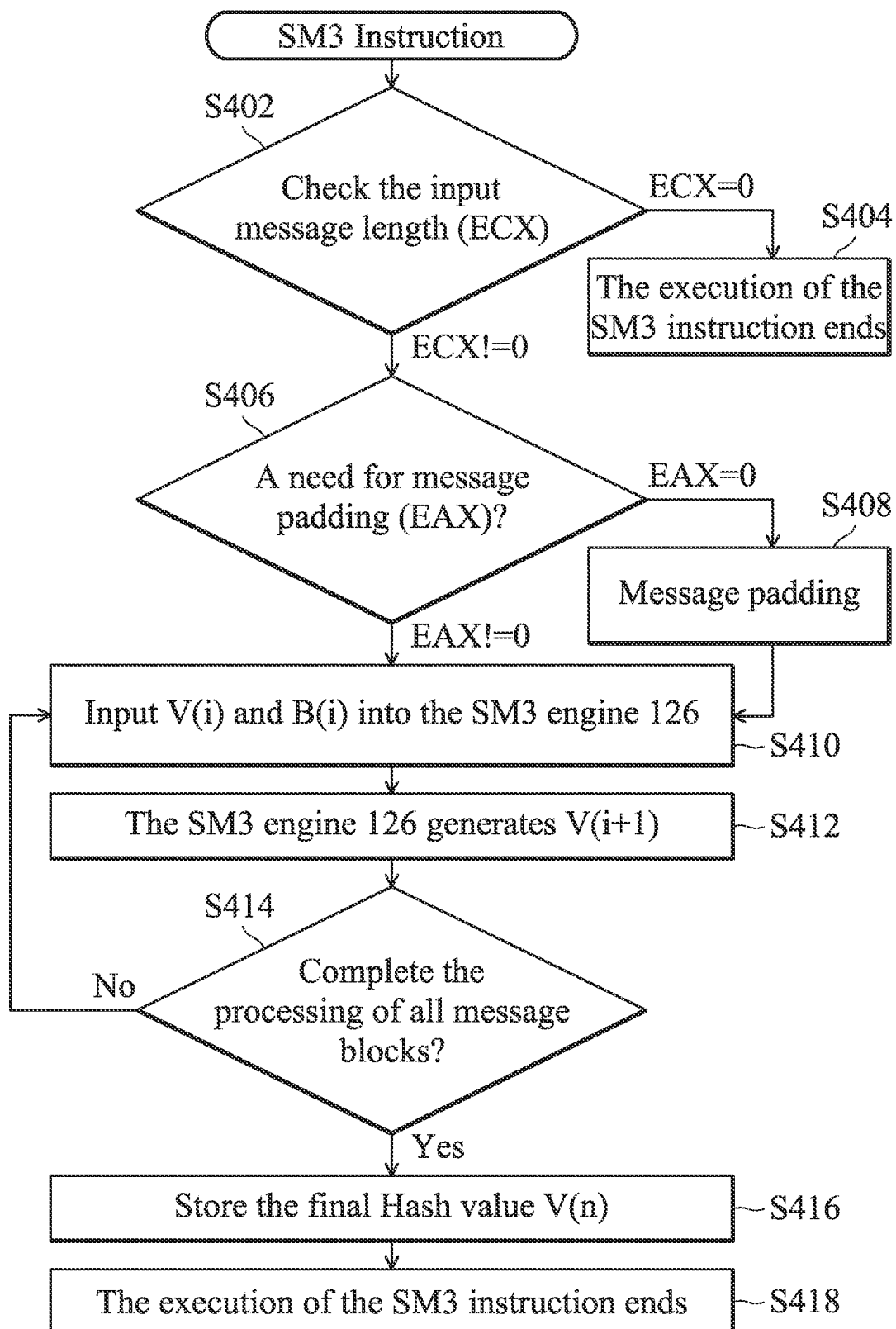
FIG. 4 is a flow chart illustrating a flow performed by executing an ISA SM3 instruction in accordance with an exemplary embodiment of the present application.

FIG. 4 is a flow chart illustrating a flow performed by executing an ISA SM3 instruction in accordance with an exemplary embodiment of the present application. The illustrated steps relate to the microinstructions decoded from the ISA SM3 instruction.

In step S402, the length of the input message, m, is checked, e.g., by checking the register ECX. If ECX is 0, the flow proceeds to step S404, the flow for SM3 algorithm ends. If ECX is not 0, the flow proceeds to step S406.

In step S406, the register EAX is checked to determine whether there is a need for message padding (padding the input message m to a multiple size of 512 bits). If the register EAX is 0, the flow proceeds to step S408 to perform message padding on the input message m and thereby generates a padded message m' (=m, 1, k{0}, 64{len}). If the register EAX is not 0, the flow skips the message padding step S408. The input message m (or the padded input message m') that is a multiple size of 512 bits includes 512-bit message blocks B(0), . . . , B(n−1), where n is an integer. By performing steps S410, S412, and S414, the processor 100 gradually transforms the initial Hash value V(0) to the final Hash value V(n) by processing the message blocks B(0), . . . , B(n−1) block by block. In step S410, it starts to drive the SM3 engine 126 in accordance with an engine driving microinstruction.

In step S410, the initial Hash value V(0) and the first 512-bit message block B(0) are read from the system memory and input into the SM3 engine 126, and the SM3 engine 126 operates based on the initial Hash value V(0) and the first 512-bit message block B(0). In step S412, the SM3 engine 126 generates an intermediate Hash value V(1). In step S414, it checks whether the processing on all message blocks is completed. If not, the routine continues. If yes, the routine ends. In an exemplary embodiment, a register temp_gpr within the cryptographic unit 118 is updated to monitor the repeated time of the routine. The initial value stored in the register temp_gpr depends on the input information programmed in the registers EAX and ECX. A number recorded in the register temp_gpr is decreased as the calculation of each message block is completed, to show whether all message blocks B(0), . . . , B(n−1) obtained from the input message m have been processed, that is, whether the SM3 algorithm performed on the input message m is completed. If there are still message blocks that have not been processed, the flow repeats step S410, and the SM3 engine 126 operates according to the intermediate Hash value (e.g., V(1)) and the next message block (e.g., B(1)). In step S412, the next intermediate hash value (e.g., V(2)) is calculated. The processor 100 processes all message blocks B(0), . . . , B(n−1) block by block until all message blocks are processed and the final Hash value V(n) is calculated. The final Hash value V(n) is of a specific length, such as 256 bits.

If processing of all message blocks B(0), . . . , B(n−1) are finished, the SM3 algorithm of the input message m is completed, and the flow proceeds to step S416 for storage of the final Hash value V(n). According to the design introduced in FIG. 2A, 2B or 2D, the SM3 engine 126 outputs the final Hash value V(n) to the system memory. For example, the final Hash value V(n) is programmed into the system memory as indicated by a Hash value pointer to overwrite the initial Hash value V(0). According to the design introduced in FIG. 2C-2, the SM3 engine 126 stores the final Hash value V(n) in an internal register within the cryptographic unit 118, which will be read by a later microinstruction. In step S418, the execution of the SM3 instruction ends.

The engine driving microinstruction corresponds to the two steps S410 and S412. The SM3 engine 126 is driven by the engine driving microinstruction to perform the Hash value conversion (from V(i) to V(i+1)) of a message block B(i). By repeatedly driving the SM3 engine 126 to execute the engine driving microinstruction on the different message block, the initial Hash value V(0) is transformed into the final Hash value V(n).

The calculation performed by the SM3 engine 126 is:

$$V(i+1)=CF(V(i),B(i))$$

CF is a compression function, by which each 512-bit message block B(i) is expanded and then compressed by 64 rounds (j=0~63) of compression (iterative compression) to generate a 256-bit Hash value V(i+1). Through the compression function on the all message blocks B(0) to B(n−1) block by block, the initial Hash value V(0) is gradually transformed into the final Hash value V(n).

Figure 5:
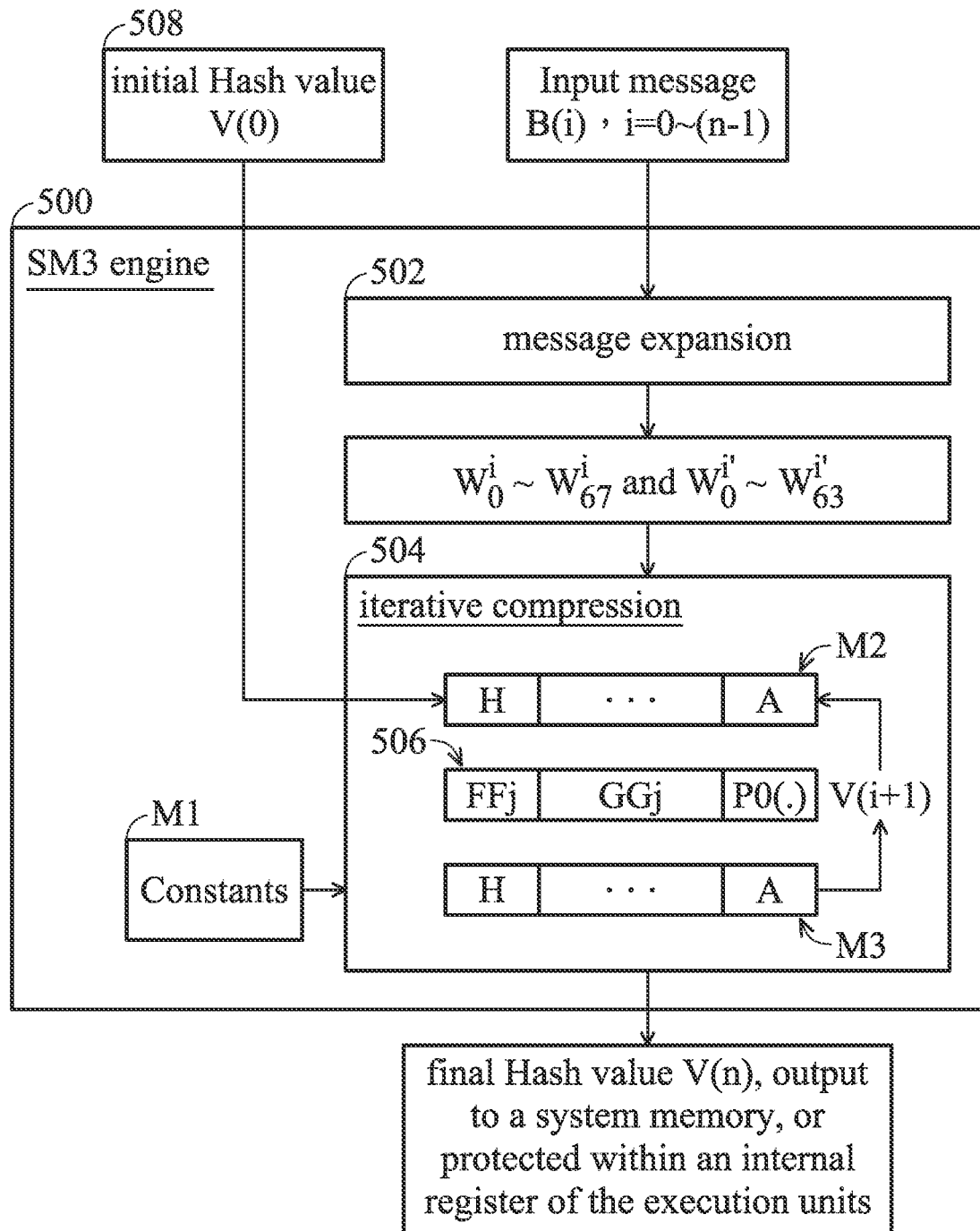
FIG. 5 illustrates an SM3 engine 500 in accordance with an exemplary embodiment of the present application.

FIG. 5 illustrates an SM3 engine 500 in accordance with an exemplary embodiment of the present application. In FIG. 5, the processing of one message block B(i) is shown. The SM3 engine 500 includes hardware for message expansion 502, iterative compression 504, and an internal storage space M1. The internal storage space M1 within the SM3 engine 500 stores constants required in the iterative compression (504).

The SM3 engine 500 receives a 512-bit message block B(i), expands the received message block B(i) to 132 words $W_0^i \sim W_{67}^i$ and $W_0^{i'} \sim W_{63}^{i'}$ by the hardware for message expansion 502, and performs 64 rounds of compression (by the hardware for iterative compression 504) based on the 132 words to transform the Hash value from V(i) to V(i+1). The transformed Hash value V(i+1) is used in the processing of the next 512-bit message block B(i+1).

The iterative compression (504) is:

```
ABCDEFGH ← V(i)
FOR j=0 TO 63
    SS1 ← ((A <<< 12) + E + (Tj <<< j)) <<< 7
    SS2 ← SS1 ^ (A <<< 12)
    TT1 ← FFj(A, B, C) + D + SS2 + Wj'
    TT2 ← GGj(E, F, G) + H + SS1 + Wj
    D ← C
    C ← B <<< 9
    B ← A
    A ← TT1
    H ← G
    G ← F <<< 19
    F ← E
    E ← P0(TT2)
ENDFOR
V(i+1) ← ABCDEFGH ^ V(i)
```

FFj and GGj are Boolean functions, and P0(.) is a permutation function. The hardware for iterative compression 504 further provides internal storage spaces M2 and M3 (storage spaces within the SM3 engine 500), and includes hardware 506 for the functions FFj, GGj, and P0(.). The internal storage space M2 stores a Hash value V(i) for starting the 64 rounds of compression, which is assigned as the parameters A to H. After being processed by the functions FFj, GGj, and P0(.) provided by the hardware 506, the parameters A to H are updated and cached in the internal storage space M3 within the SM3 engine 500 to be transformed into a Hash value V(i+1) for the processing of the next 512-bit message block B(i+1). After all message blocks B(0) . . . B(n−1) are processed, the content updated to the internal storage space M3 is read and transformed into the final Hash value V(n).

The initial Hash value V(0) (508 shown in the figure) is read from the system memory as indicated by the aforementioned Hash value pointer, and is programmed into the internal storage space M2 within the SM3 engine 500 for the iterative compression on the 132 words $W_0^0 \sim W_{67}^0$ and $W_0^{0'} \sim W_{63}^{0'}$ of the message block B(0).

In an exemplary embodiment, the final Hash value V(n) generated after the processing of all message blocks B(0) . . . B(n−1) is stored in an internal storage space within the cryptographic unit 118. The internal storage space storing the final Hash value V(n) may be read by the subsequent microinstructions. In another embodiment, the final Hash value V(n) is overwritten on the system storage space indicated by the Hash value pointer.

In the present application, the intermediate Hash values V(1) to V(n−1) are properly protected within the SM3 engine 500. This case introduces the higher security cryptographic hardware.

In an exemplary embodiment, the cryptographic unit 118 does not include the specifically designed SM3 engine 126. The microcode UCODE is specially designed to transform an ISA SM3 instruction into a plurality of microinstructions to operate the existing arithmetic logic units ALUs to perform an SM3 algorithm on an input message m. In such an exemplary embodiment, the intermediate data generated during the calculations of the SM3 algorithm is safely protected within the internal storage space of the processor, too.

In an exemplary embodiment, the SM3 engine is not as powerful as the forgoing SM3 engine 500. Some functional modules of the SM3 engine 500 (for example, the hardware for message expansion 506) are implemented by the existing arithmetic logic units ALUs which are operated by microinstructions generated according to a specially designed microcode UCODE. This embodiment also has the capability to protect important intermediate data of the SM3 algorithm in the internal storage space of the processor.

In summary, a processor in accordance with an exemplary embodiment of the present application operates in response to one single Hash cryptographic instruction (e.g., an SM3 instruction) of an instruction set architecture (ISA). The processor reads an input message m of a limited length from a first storage space of a system memory, performs a Hash cryptographic algorithm (SM3 algorithm) on the input message m, and generates a final Hash value of a specific length. In this case, the SM3 algorithm is performed by executing just one single ISA instruction. The optional SM3 engine 126 can accelerate the processing speed and improve the security of the SM3 algorithm. In another exemplary embodiment, the SM3 algorithm is achieved by microcode design without any additional SM3 engine (126).

In an exemplary embodiment, the SM3 engine 126 is driven to implement an elliptic curve cryptographic algorithm (SM2 algorithm). A processor with SM2 algorithm is introduced in the following paragraphs.

Figure 6:
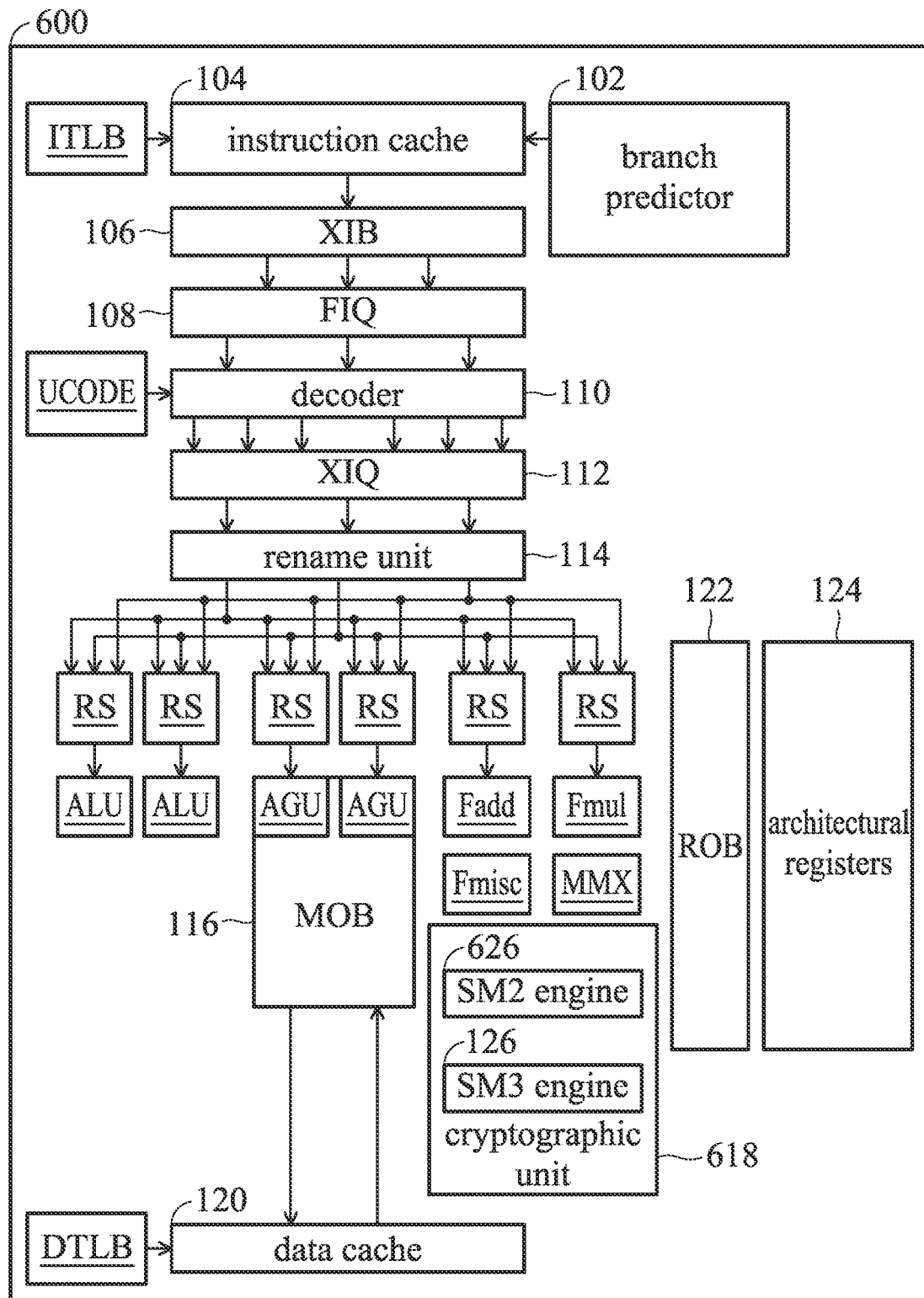
FIG. 6 is a block diagram illustrating a processor 600 in accordance with an exemplary embodiment of the present application.

FIG. 6 is a block diagram illustrating a processor 600 in accordance with an exemplary embodiment of the present application. Compared with FIG. 1, the cryptographic unit 618 includes an SM2 engine 626 (i.e., an elliptic curve cryptographic acceleration engine) in addition to the SM3 engine 126. The detailed hardware architecture of the SM2 engine 626 is described later in FIG. 27. The microcode UCODE has contents corresponding to an ISA SM2 instruction (an elliptic curve cryptographic instruction). The decoder 110 decodes the ISA SM2 instruction proposed in the present application into a plurality of microinstructions which can be recognized by the pipelined hardware of the processor 600. According to the microinstructions, the contents in the architectural registers 124 are interpreted and used in operating the cryptographic unit 618 (which includes the SM2 engine 626 and the SM3 engine 126) to implement the encryption, decryption, digital signature, signature verification, key exchange of SM2 algorithm. In particular, the critical intermediate variables generated during the calculations of SM2 algorithm are properly hidden inside the processor; this is a high security design. As for the other intermediate variables whose security level is not so high, the temporary storage on the system memory (for example, a RAM outside the processor) is allowed to save the storage space inside the processor.

FIG. 7 illustrates an instruction format 702 of an ISA SM2 instruction in accordance with an exemplary embodiment of the present application. The prefix, opcode, and ModR/M fields presented in the instruction format 702 are filled: 0xF2 0x0F 0xA6 0xC0 (not limited thereto), wherein the prefix is 0xF2, the opcode is 0x0F 0xA6, and the ModR/M is 0xC0. The SIB, Displacement, and Immediate fields are not filled (non). When recognizing the code "0xF2 0x0F 0xA6 0xC0", the decoder 110 decodes the ISA SM2 instruction, based on the microcode UCODE, into a plurality of microinstructions. According to the microinstructions, a control word stored in a register EDX of the architectural registers 124 is checked. The control word shows which function of SM2 algorithm is called. The control word may uses 6 bits to represent the different functions:

6'b 000001: Encryption.
6'b 000010: Decryption.
6'b 000100: Digital signature.
6'b 001000: Signature verification.
6'b 010000: The first key exchange procedure (Key exchange1).
6'b 010001: The second key exchange procedure, without using Hash value calculations (Key exchange2, without Hash value calculations).
6'b 010101: The second key exchange procedure, using Hash value calculations (Key exchange2, with Hash value calculations).
6'b 010010: The third key exchange procedure, without using Hash value calculations (Key exchange3, without Hash value calculations).
6'b 010110: The third key exchange procedure, using Hash value calculations (Key exchange3, with Hash value calculations).
6'b 100000: The first preprocessing procedure (Preprocess1), which calculates a Hash value Z for identification of the user.
6'b 100001: The second preprocessing procedure (Preprocess2), which calculates a Hash value based on the Hash value Z and a message M.

First, the encryption procedure of SM2 algorithm is introduced.

FIG. 8 presents a table 804 to introduce the design in the microcode UCODE related to the encryption procedure of SM2 algorithm. According to the microinstructions generated based on the microcode UCODE corresponding to the encryption procedure of SM2 algorithm, the contents in the architectural registers 124 are defined, read and updated as shown in table 804. The aforementioned control word (cw) 6'b 000001 is programed into the input register EDX in advance to indicate that an encryption procedure is called. In addition to EDX, the table 804 further lists the other input registers EAX, EBX, ECX, ESI, and EDI required to start the encryption procedure. When the encryption procedure called by an ISA SM2 instruction is completed, the registers EAX, ECX, EDI are programmed as output registers. The design of the input and output registers may have the other variants.

When being used as an input register, the register EAX stores a plaintext input pointer, pointing to a storage space that stores a plaintext input M. The storage space of the plaintext input M may be provided by a system memory, such as an RAM, and can follow the ES segmentation technology. The register EBX stores an encryption public key pointer pointing to a storage space (within the system memory and following ES segmentation technology) that stores an encryption public key $P_B$. The register ECX stores a byte number of the plaintext input M. The register EDX stores the control word cw that shows the encryption code 6'b 000001. The register ESI stores an intermediate variable pointer pointing to a storage space (within the system memory and named as a scratch space for temporary storage of high security intermediate variables, may be 8K in size, follow the ES segmentation technology, be initialized to all zeros, and be allocated by an operating system according to a request from software). In an exemplary embodiment, the intermediate variables are parameters generated and used in calculations. For example, in a point multiplication function, intermediate variables may be coordinated points converted from coordinate system conversion, the intermediate data calculated during the coordinate system conversion, and so on. The register EDI stores a ciphertext output pointer, pointing to a storage space (within the system memory and following ES segmentation technology) that stores a ciphertext output C.

When finishing the SM2 algorithm requested by the ISA SM2 instruction, the output registers are programed, wherein: the pointer stored in the register EAX is modified to point to the higher address, wherein the address increment is the number of bytes of the plaintext input M; the register ECX is programmed to record the number of bytes of the ciphertext output C; and, the pointer stored in the register EDI is modified to point to the higher address, wherein the address increment is the number of bytes of the ciphertext output C.

Figure 9A:
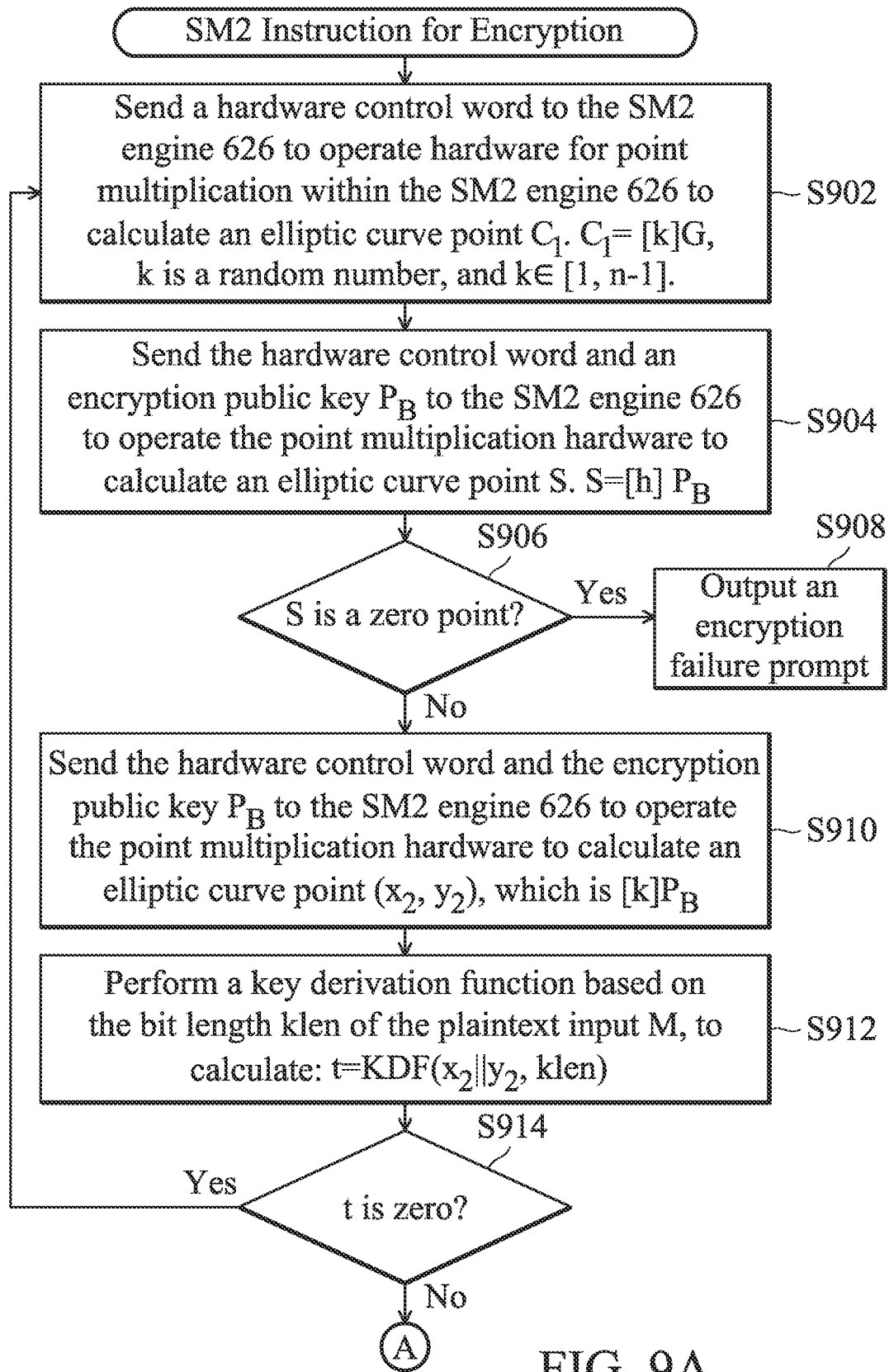
FIGS. 9A and 9B are a flow chart illustrating an encryption procedure performed by executing an ISA SM2 instruction in accordance with an exemplary embodiment of the present application.
Figure 9B:
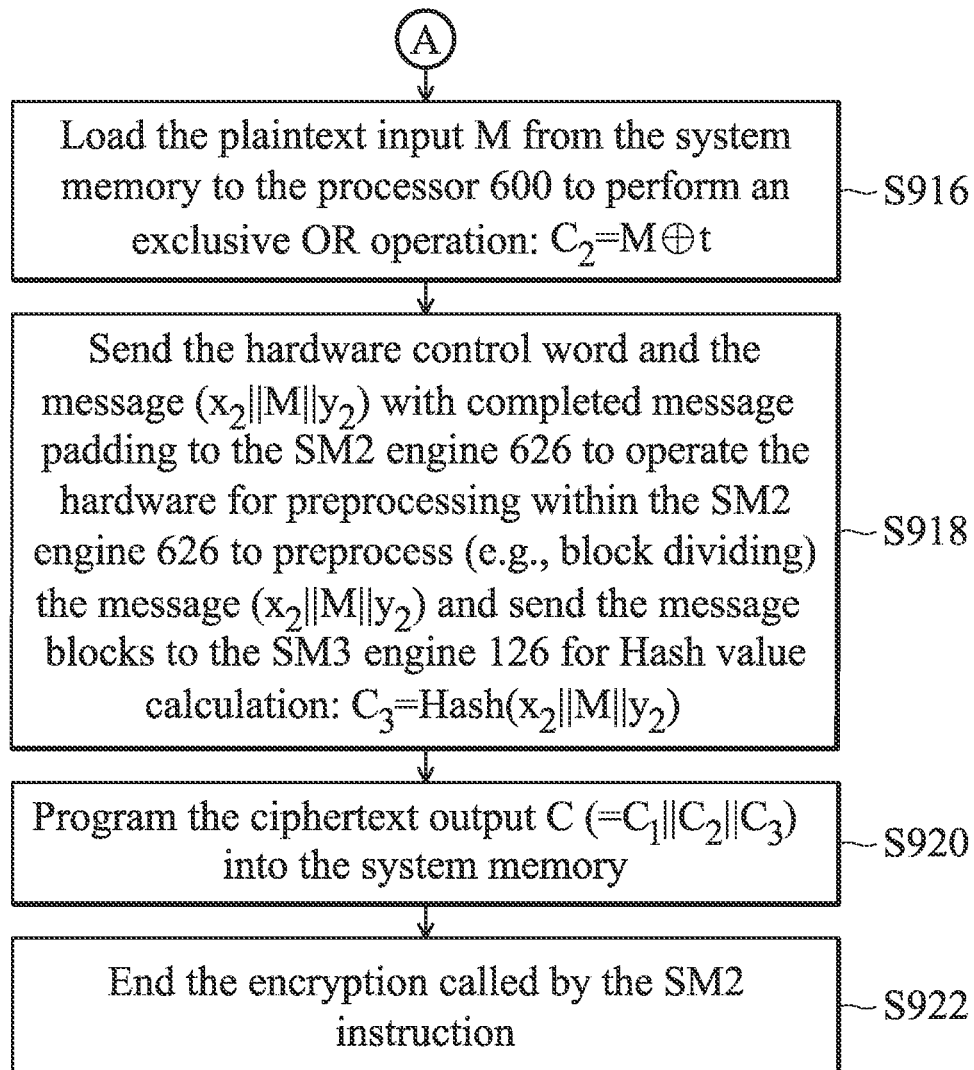

FIGS. 9A and 9B are a flow chart illustrating an encryption procedure performed by executing an ISA SM2 instruction in accordance with an exemplary embodiment of the present application. The illustrated steps relate to the microinstructions decoded from the ISA SM2 instruction.

Referring to FIG. 9A, in step S902, a hardware control word (generated according to the control word cw stored in the input register EDX) is sent to the SM2 engine 626, and hardware for point multiplication provided by the SM2 engine 626 operates to calculate an elliptic curve point $C_1$. $C_1$=[k]G, k is a random number, and k∈[1, n−1]. G is one of the elliptic curve parameters, which is defined in the microcode UCODE and is a base point of an elliptic curve. The SM2 engine 626 outputs the elliptic curve point $C_1$. In step S902, a microinstruction for operating the point multiplication hardware is executed. The cryptographic unit 618 may include a random number generator, which generates the random number k in response to a random number generation microinstruction.

In step S904, the hardware control word and an encryption public key $P_B$ (read from the system memory according to the pointer stored in the input register EBX) are sent to the SM2 engine 626, to operate the point multiplication hardware to calculate an elliptic curve point S. S=[h] $P_B$. h is the cofactor of the elliptic curve, one of the parameters of the elliptic curve. The SM2 engine 626 outputs the elliptic curve point S. In step S904, a microinstruction for operating the point multiplication hardware is executed.

In step S906, it is determined whether the elliptic curve point S is a zero point. Zero point is a special point on an elliptic curve, also known as an infinite point. If yes, the flow proceeds to step S908, and the processor generates an encryption failure prompt. If not, the flow proceeds to step S910, the hardware control word and the encryption public key $P_B$ are input to the SM2 engine 626, to operate the point multiplication hardware to calculate an elliptic curve point $(x_2, y_2)$, which is $[k]P_B$. The SM2 engine 626 outputs the elliptic curve point $(x_2, y_2)$. In step S910, a microinstruction for operating the point multiplication hardware is executed.

In step S912, a key derivation function is performed based on the bit length klen of the plaintext input M (stored in the system memory and indicated by the plaintext input pointer stored in the input register EAX). The key derivation function is: $t=KDF(x_2\|y_2, klen)$. KDF(.) is the key derivation function, and $x_2\|y_2$ represents the combination of $x_2$ and $y_2$.

In step S914, it is determined whether the value t derived in step S912 is zero (e.g., determining whether each bit of t is zero). If yes, the flow repeats step S902 to change the random number k, and new elliptic curve points $C_1$, S, $(x_2, y_2)$ and t are calculated. If not, the flow proceeds to step S916 in FIG. 9B, the plaintext input M is retrieved from the system memory and loaded into the processor 600 to perform an exclusive OR operation to generate a part of the ciphertext: $C_2=M\oplus t$.

In step S918, the hardware control word and the message $(x_2\|M\|y_2)$ with completed message padding are sent to the SM2 engine 626 to operate the hardware for preprocessing within the SM2 engine 626 to preprocess (e.g., block dividing) the message $(x_2\|M\|y_2)$ and send the message blocks to the SM3 engine 126 for Hash value calculation (referring to the steps S410, S412 and S414 in FIG. 4). The Hash value calculation is: $C_3=Hash(x_2\|M\|y_2)$, where Hash(.) represents the Hash cryptographic function, and $x_2\|M\|y_2$ represents the combination of $x_2$, M and $y_2$. The SM2 engine 626 outputs $C_3$, which is a part of the ciphertext. Step S918 may be performed through the execution of a preprocessing microinstruction that operates the hardware for preprocessing. In another exemplary embodiment, step S918 may be performed through the execution of an engine driving microinstruction that drives the SM3 engine 126.

In step S920, as indicated by the ciphertext output pointer stored in the input register EDI, the ciphertext output C (e.g., $C_1\|C_2\|C_3$, a combination of $C_1$, $C_2$, and $C_3$) is programmed into the system memory. In step S922, the encryption called by the SM2 instruction ends. In another exemplary embodiment, $C=C_1\|C_3\|C_2$.

To summarize, in response to a single elliptic curve cryptographic instruction (SM2 instruction) of an instruction set architecture (ISA), a processor reads a plaintext input M from a first storage space of the system memory, reads a public key $P_B$ by referring to a first register, performs an encryption procedure using an elliptic curve cryptographic algorithm (SM2 algorithm) on the plaintext input M based on the public key $P_B$ to encrypt the plaintext input M into a ciphertext output C, and programs the ciphertext output C into a second storage space of the system memory. In this case, only one single ISA instruction is enough to complete the SM2 encryption. In addition to the SM2 engine 626, the SM3 engine 126 speeds up the SM2 encryption and improves security. In another exemplary embodiment, the cryptographic unit 118 does not include the specifically designed SM2 engine 626 nor the SM3 engine 126, but the microcode UCODE is specially designed to transform an ISA SM2 instruction into a plurality of microinstructions to operate the existing arithmetic logic units ALUs to perform the SM2 encryption.

Then, the decryption procedure of SM2 algorithm is introduced.

Figure 10:
FIG. 10 presents a table 1004 to introduce the design in the microcode UCODE related to the decryption procedure of SM2 algorithm.

FIG. 10 presents a table 1004 to introduce the design in the microcode UCODE related to the decryption procedure of SM2 algorithm, which shows how the contents in the architectural registers 124 are defined, read and updated. The aforementioned control word (cw) 6'b 000010 is programed into the input register EDX in advance to indicate that the decryption procedure is called. In addition to the input register EDX, the table 1004 further lists the other input registers EAX, EBX, ECX, ESI, and EDI required to start the decryption procedure. When finishing the decryption procedure called by an ISA SM2 instruction, registers EAX, ECX, EDI are programmed as output registers. The design of the input and output registers may have the other variants.

When being used as an input register, the register EAX stores a ciphertext input pointer, pointing to a storage space (within the system memory and following ES segmentation technology) that stores a ciphertext input C. The ciphertext input C is $C_1\|C_2\|C_3$ (in another embodiment, $C=C_1\|C_3\|C_2$). The input register EBX stores a private key pointer pointing to a storage space (within the system memory and following ES segmentation technology) that stores a private key $d_B$ for decryption. The input register ECX stores the number of bytes of the ciphertext input C. The control word cw stored in the input register EDX is 6'b 000010, which represents the decryption procedure. The input register ESI stores an intermediate variable pointer pointing to a storage space (within the system memory and named as a scratch space for temporary storage of high security intermediate variables, may be 8K in size, follow the ES segmentation technology, be initialized to all zeros, and be allocated by the operating system according to a request from software). The input register EDI stores a plaintext output pointer pointing to a storage space (within the system memory and following ES segmentation technology) that stores a plaintext output M'.

When finishing the SM2 decryption requested by the ISA SM2 instruction, the output registers are programed, wherein: the pointer stored in the register EAX is modified to point to the higher address, wherein the address increment is the number of bytes of the ciphertext input C; the register ECX is programmed to record the number of bytes of the plaintext output M'; and, the pointer stored in the register EDI is modified to point to the higher address, wherein the address increment is the number of bytes of the plaintext output M'.

Figure 11A:
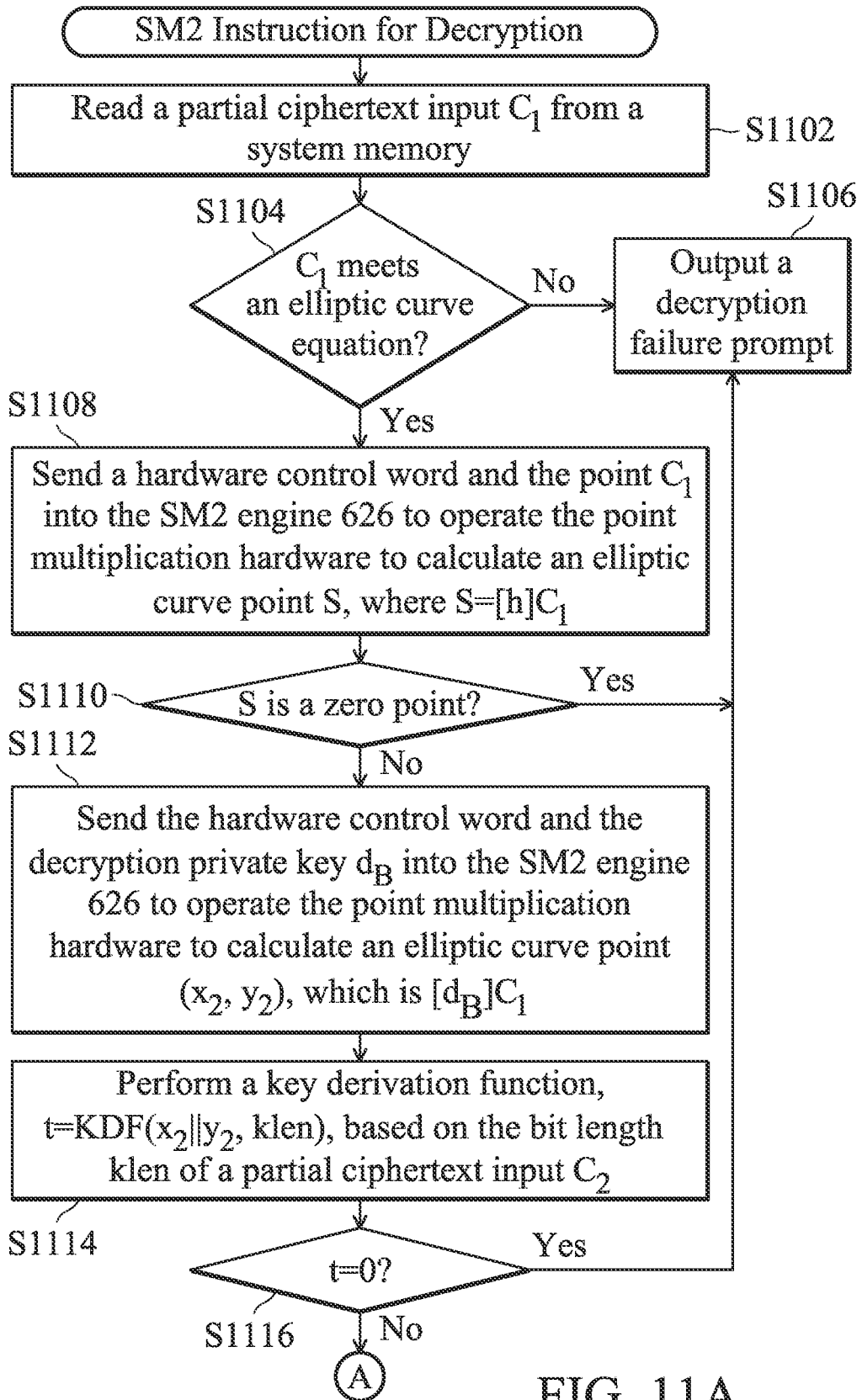
FIGS. 11A and 11B are a flow chart illustrating a decryption procedure performed by executing an ISA SM2 instruction in accordance with an exemplary embodiment of the present application.
Figure 11B:
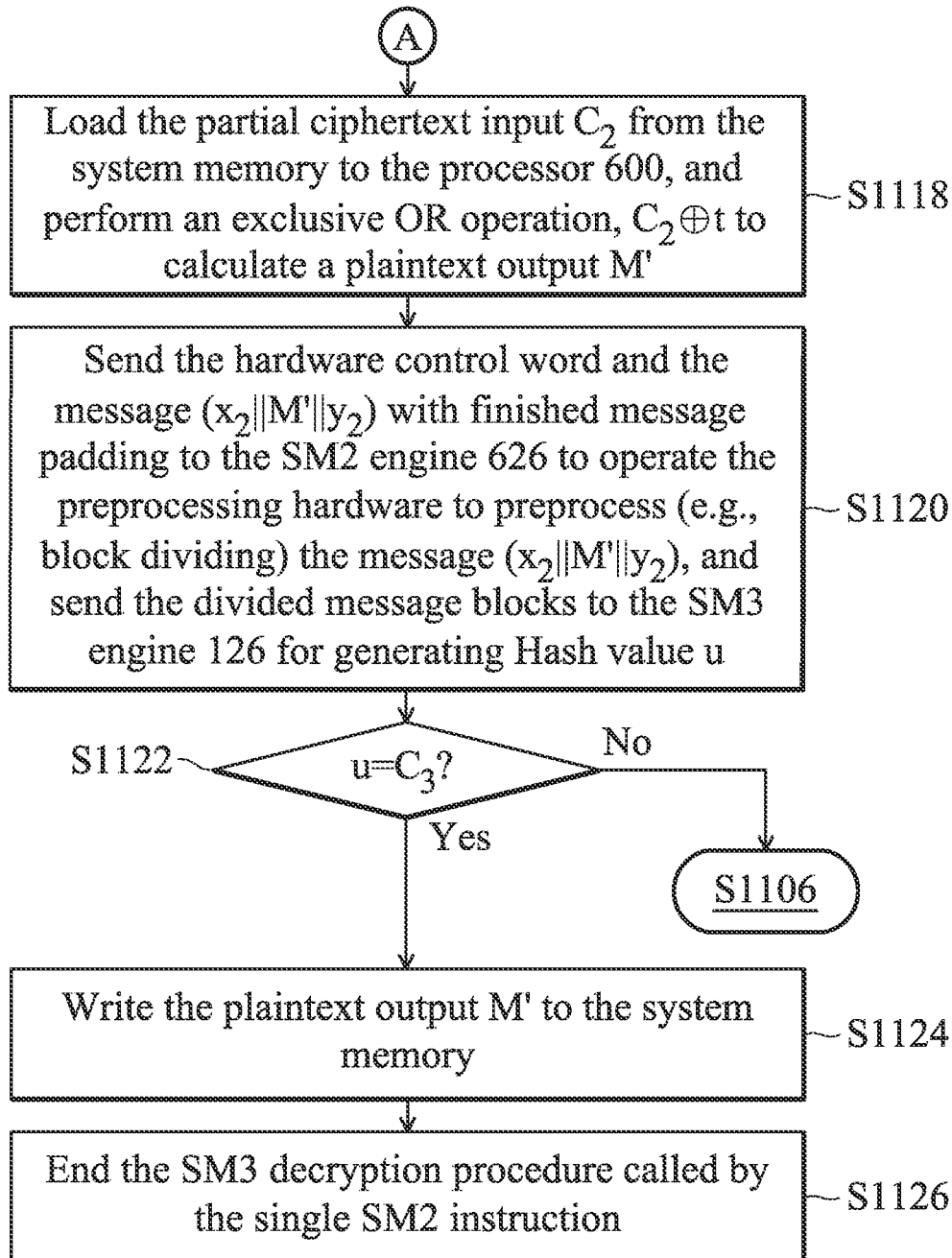

FIGS. 11A and 11B are a flow chart illustrating a decryption procedure performed by executing an ISA SM2 instruction in accordance with an exemplary embodiment of the present application. The illustrated steps relate to the microinstructions decoded from the ISA SM2 instruction.

Starting from FIG. 11A, in step S1102, the processor 600 reads the partial ciphertext input $C_1$ (e.g., an elliptic curve point, hereinafter also referred to as a point $C_1$) from the system memory according to the ciphertext input pointer stored in the input register EAX. For example, ciphertext content $C_1$ may be retrieved from the ciphertext input C and loaded into the processor 600. In step S1104, it is checked whether the point $C_1$ meets an elliptic curve equation. If not, the flow proceeds to step S1106, and the processor 600 outputs a decryption failure prompt, to report an error, and ends the decryption procedure. Conversely, if the point $C_1$ meets to the elliptic curve equation, the flow proceeds to step S1108.

In step S1108, a hardware control word (generated according to the control word cw stored in the input register EDX) and the point $C_1$ are sent into the SM2 engine 626 to operate the point multiplication hardware to calculate an elliptic curve point S, where S=[h]$C_1$. The SM2 engine 626 outputs the elliptic curve point S. In step S1108, a microinstruction for operating the point multiplication hardware may be executed.

In step S1110, it is checked whether the elliptic curve point S is a zero point. If yes, it is determined that the decryption fails, and the flow proceeds to step S1106. The processor 600 outputs a decryption failure prompt. If the elliptic curve point S is not a zero point, the flow proceeds to step S1112, the hardware control word and the decryption private key $d_B$ are sent into the SM2 engine 626 to operate the point multiplication hardware to calculate an elliptic curve point ($x_2$, $y_2$), which is [$d_B$]$C_1$. The SM2 engine 626 outputs the elliptic curve point ($x_2$, $y_2$). In step S1112, a microinstruction for operating the point multiplication hardware may be executed.

Step S1114 is performed based on the bit length klen of a partial ciphertext input $C_2$ (which is part of the ciphertext input C, and is obtained from the system memory according to the ciphertext input pointer stored in the input register EAX), to perform a key derivation function: t=KDF($x_2$||$y_2$, klen).

Step S1116 checks whether the derived t is zero (that is, determining whether each bit of t is zero). If yes, the flow proceeds to step S1106, and the processor 600 outputs a decryption failure prompt. If not, the flow proceeds to step S1118 in FIG. 11B, the partial ciphertext input $C_2$ is loaded into the processor 600 from the system memory, and an exclusive OR operation, C2⊕t, is performed to calculate a plaintext output M'.

In step S1120, the hardware control word and the message ($x_2$||M'||$y_2$) with finished message padding are sent to the SM2 engine 626 to operate the preprocessing hardware to preprocess (e.g., block dividing) the message ($x_2$||M'||$y_2$). The divided message blocks are sent to the SM3 engine 126 for generating Hash value u (referring to the steps S410, S412 and S414 in FIG. 4). The Hash value u is calculated by equation: u=Hash($x_2$||M'||$y_2$), where Hash(.) represents the Hash cryptographic function, and $x_2$||M'||$y_2$ represents the combination of $x_2$, M', and $y_2$. The SM3 engine 626 outputs the Hash value u. Step S1120 may be performed through the execution of a preprocessing microinstruction that operates the preprocessing unit. In another exemplary embodiment, step S1120 is associated with an engine driving microinstruction of the SM3 engine 126.

In step S1122, it is checked whether the Hash value u is equal to a partial ciphertext input $C_3$ (which is part of the ciphertext input C, and is read from the system memory according to the ciphertext input pointer obtained from the input register EAX). If not, it is determined that the decryption fails, and the flow proceeds to step S1106, and the processor 600 outputs a decryption failure prompt. If the Hash value u is equal to the partial ciphertext input $C_3$, step S1124 is performed to write the plaintext output M' to the system memory according to the plaintext output pointer obtained from the input register EDI. Step S1126 ends the SM3 decryption procedure called by the single SM2 instruction.

To summarize, for SM2 decryption, in response to a single elliptic curve cryptographic instruction (SM2 instruction) of an instruction set architecture (ISA), a processor reads a ciphertext input C from a first storage space of the system memory. Based on a private key $d_B$ obtained by referring to a first register, a decryption procedure using an elliptic curve cryptographic algorithm is performed on the ciphertext input C to decrypt the ciphertext input C into a plaintext output M'. The plaintext output M' is programmed into a second storage space of the system memory. In this case, only one single ISA instruction is enough to call the SM2 decryption. In addition to the SM2 engine 626, the SM3 engine 126 can be provided to speed up the SM2 decryption and improve the security. In another exemplary embodiment, the cryptographic unit 118 does not include the specifically designed SM2 engine 626 nor the SM3 engine 126. Instead, the microcode UCODE is specially designed to transform an ISA SM2 instruction into a plurality of microinstructions to operate the existing arithmetic logic units ALUs to perform the SM2 decryption.

The following discussion is related to the signature procedure of SM2 algorithm, in which a Hash value calculated from a first preprocessing procedure and a second preprocessing procedure is required. The first preprocessing procedure and the second preprocessing procedure are discussed in detail later.

FIG. 12 presents a table 1204 to introduce the design in the microcode UCODE related to the signature procedure of SM2 algorithm. According to the microinstructions generated based on the microcode UCODE in response to the signature procedure of SM2 algorithm, the contents in the architectural registers 124 are defined, read and updated as shown in table 1204. The aforementioned control word (cw) 6'b 000100 is programed into the input register EDX in advance to indicate that a signature procedure is called. In addition to the input register EDX, the table 1204 further lists the other input registers EAX, EBX, ESI, and EDI required to start the signature procedure. When finishing the signature procedure called by an ISA SM2 instruction, the registers ECX and EDI are programmed as output registers. The design of the input and output registers may have the other variants.

When being used as an input register, the register EAX stores a Hash value pointer, pointing to a storage space (within the system memory and following ES segmentation technology) that stores a Hash value e. The Hash value e is generated through a first preprocessing procedure and a second preprocessing procedure for the data M to be signed, and is pre-stored in the system memory. The input register EBX stores a private key pointer pointing to a storage space (within the system memory and following ES segmentation technology) that stores a private key $d_A$ owned by the signer. The control word cw stored in the input register EDX is 6'b 000100, which represents the signature procedure. The input register ESI stores an intermediate variable pointer pointing to a storage space (within the system memory and named as a scratch space for temporary storage of high security intermediate variables, may be 8K in size, follow the ES segmentation technology, be initialized to all zeros, and be allocated by the operating system according to a request from software). The input register EDI stores a signature pointer pointing to a storage space (within the system memory and following ES segmentation technology) that stores a digital signature (r, s).

When finishing the SM2 signature requested by the ISA SM2 instruction, the output registers are programed, wherein: the register ECX is programmed to record the number of bytes of the digital signature (r, s); and, the signature pointer stored in the register EDI is modified to point to the higher address, wherein the address increment is the number of bytes of the digital signature (r, s).

Figure 13:
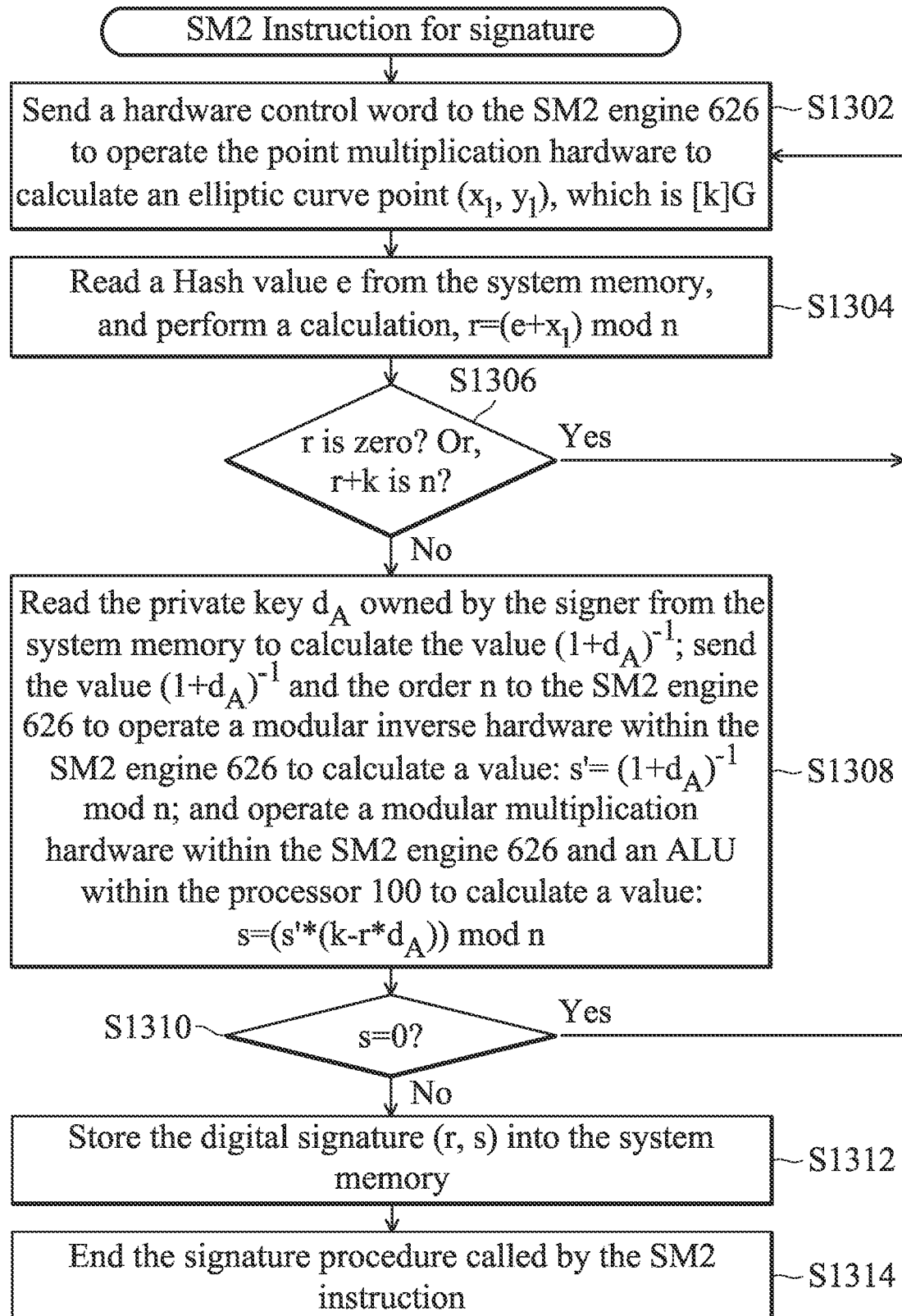
FIG. 13 is a flow chart illustrating a signature procedure performed by executing an ISA SM2 instruction in accordance with an exemplary embodiment of the present application.

FIG. 13 is a flow chart illustrating a signature procedure performed by executing an ISA SM2 instruction in accordance with an exemplary embodiment of the present application. The illustrated steps relate to the microinstructions decoded from the ISA SM2 instruction.

In step S1302, a hardware control word (generated according to the control word cw stored in the input register EDX) is sent to the SM2 engine 626 to operate the point multiplication hardware to calculate an elliptic curve point $(x_1, y_1)$, which is [k]G, wherein k is a random number, and k∈[1, n−1]. The SM2 engine 626 outputs the elliptic curve point $(x_1, y_1)$. The number k is a random number, and G is the base point of the elliptic curve. In step S1302, a microinstruction for operating the point multiplication hardware may be executed.

In step S1304, as indicated by the Hash value pointer stored in the input register EAX, the processor 600 reads a Hash value e from the system memory. A calculation, $r=(e+x_1) \mod n$, is performed. The number, n, is one of the elliptic curve parameters, and is the order of the base point G.

In step S1306, it is checked whether the value r is zero, or whether r+k is n. If r is zero, or/and r+k is n, the flow returns to step S1302, and the point multiplication hardware is operated again with a renewed random number k. If r is not zero and r+k is not n, the flow proceeds to step S1308.

In step S1308, as indicated by the private key pointer stored in the input register EBX, the processor 600 reads the private key $d_A$ owned by the signer from the system memory to calculate the value $(1+d_A)^{-1}$. The value $(1+d_A)^{-1}$ and the order n are sent to the SM2 engine 626 to operate a modular inverse hardware within the SM2 engine 626 to calculate a value: $s'=(1+d_A)^{-1} \mod n$. Based on the value s', a modular multiplication hardware within the SM2 engine 626 and an ALU within processor 100 calculate a value: $s=(s'*(k-r*d_A)) \mod n$. The modular inverse hardware can receive a first modular inverse input and a second modular inverse input to generate a modular inverse output. The modular multiplication hardware can receive a first modular multiplication input, a second modular multiplication input, and a third modular multiplication input to generate a modular multiplication output. When r is not zero and r+k is not n, the processor 600 executes a modular inverse microinstruction and a modular multiplication microinstruction which are provided in the decoded microinstructions. In response to the modular inverse microinstruction, the modular inverse hardware performs modular inverse calculation: $s'=(1+d_A)^{-1} \mod n$, where $(1+d_A)$ is the first modular inverse input, n is the second modular Inverse input, s' is the modular inverse output. In response to the modular multiplication microinstruction, the modular multiplication hardware performs a modular multiplication calculation:

$$s=(s'*(k-r*d_A))\mod n,$$

s' is the first modular multiplication input, and $(k-r*d_A)$ is the second modular multiplication input, n is the third modular multiplication input, and s is the modular multiplication output. In one embodiment, $r*d_A$ is the modular multiplication output of the modular multiplication hardware, wherein r is the first modular multiplication input, and $d_A$ is the second modular multiplication input, n is the third modular multiplication input.

In step S1310, it is checked whether the value s is zero. If yes, the flow repeats step S1302 to operate the point multiplication hardware with the renewed random number k.

If s is not zero, the flow proceeds to step S1312, and the processor stores the digital signature (r, s) into the system memory as indicated by the signature pointer stored in the input register EDI, and stores the length information about the digital signature (r, s) to the register ECX. Step S1314 ends the signature procedure called by the SM2 instruction.

To summarize, in response to a single elliptic curve cryptographic instruction (SM2 instruction) of an instruction set architecture (ISA), a processor reads a Hash value e of the data to be signed (M) from a first storage space of the system memory as indicated by information stored in the first register, reads a private key ($d_A$) of the signer as indicated by information stored in second register, uses the private key ($d_A$) to perform a signature procedure using an elliptic curve cryptographic algorithm on the Hash value e to generate a digital signature (r, s), and programs the digital signature (r, s) into a second storage space of the system memory. In this case, only one single ISA instruction is enough to complete the SM2 signature. The specially designed SM2 engine 626 speeds up the SM2 signature and improves security. In another exemplary embodiment, the cryptographic unit 118 does not include the specifically designed SM2 engine 626. Instead, the microcode UCODE is specially designed to decode an ISA SM2 instruction to a plurality of microinstructions to operate the existing arithmetic logic units ALUs to perform the SM2 signature.

The following discussion is related to a signature verification procedure of SM2 algorithm. The first and second preprocessing procedures (detailed later) are used in calculating a Hash value e' based on the data M'.

FIG. 14 presents a table 1404 to introduce the design in the microcode UCODE related to the signature verification procedure of SM2 algorithm. According to the microinstructions generated based on the microcode UCODE for the signature verification procedure of SM2 algorithm, the contents in the architectural registers 124 are defined, read and updated as shown in table 1404. The aforementioned control word (cw) 6'b 001000 is programed into the input register EDX in advance to indicate that the expected procedure is the signature verification procedure. In addition to the input register EDX, the table 1404 further lists the other input registers EAX, EBX, ESI, and EDI required to start the signature verification. When finishing the signature verification procedure called by an ISA SM2 instruction, the register ECX is programmed as an output register. The design of the input and output registers may have the other variants.

When being used as an input register, the register EAX stores a Hash value pointer, pointing to a storage space (within the system memory and following ES segmentation technology) that stores a Hash value e'. The Hash value e' is generated by processing the data M' through a first preprocessing procedure and a second preprocessing procedure. The register EBX stores a public key pointer pointing to a storage space (within the system memory and following ES segmentation technology) that stores a public key $P_A$. The control word cw stored in the input register EDX is 6'b 001000, which represents the signature verification. The input register ESI stores an intermediate variable pointer pointing to a storage space (within the system memory and named as a scratch space for temporary storage of high security intermediate variables, may be 8K in size, follow the ES segmentation technology, be initialized to all zeros, and be allocated by the operating system according to a request from software). The input register EDI stores a signature pointer pointing to a storage space (within the system memory and following ES segmentation technology) that stores a digital signature (r', s') to be verified.

When finishing the SM2 signature verification procedure requested by an ISA SM2 instruction, the output registers are programed, wherein the register ECX is programmed to show a successful signature verification with "1", and to show a failed signature verification with "0".

Figure 15:
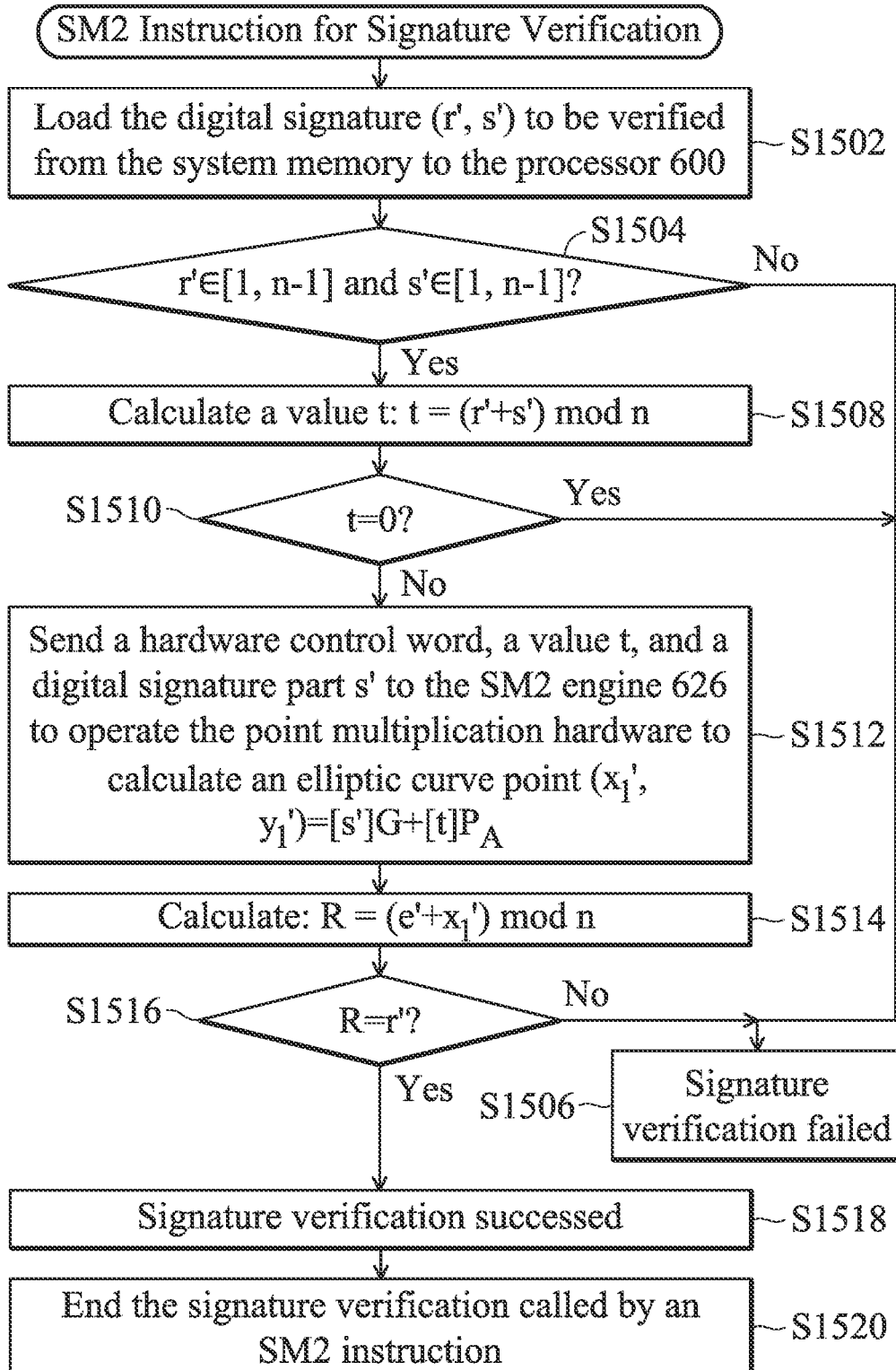
FIG. 15 is a flow chart illustrating a signature verification procedure performed by executing an ISA SM2 instruction in accordance with an exemplary embodiment of the present application.

FIG. 15 is a flow chart illustrating a signature verification procedure performed by executing an ISA SM2 instruction in accordance with an exemplary embodiment of the present application. The illustrated steps relate to the microinstructions decoded from the ISA SM2 instruction.

In step S1502, as indicated by the signature pointer obtained from the input register EDI, the processor 600 reads the digital signature (r', s') to be verified from the system memory. In step S1504, it checks whether r'∈[1, n−1], and further checks whether s'∈[1, n−1]. The value n is the order of a base point G of an elliptic curve. If at least one of the two conditions is not satisfied, step S1506 is performed to announce that the signature verification has failed (for example, programming 0 into the register ECX). If both conditions are satisfied, step S1508 calculates a value t: t=(r'+s') mod n. In step S1510, it is checked whether the value t is zero. If yes, step S1506 is performed to announce that the signature verification has failed. If not, the flow proceeds to step S1512.

In step S1512, a hardware control word (generated according to the control word cw stored in the input register EDX), a value t, and a part s' of digital signature to be verified are sent into the SM2 engine 626 to operate the point multiplication hardware to calculate an elliptic curve point $(x_1', y_1')=[s']G+[t]P_A$. The SM2 engine 626 outputs the elliptic curve point $(x_1', y_1')$. Step S1512 may involve the execution of two point multiplication microinstructions. The first one is operative to operate the SM2 engine 626 to calculate [s']G. The second one is operative to operate the SM2 engine 626 again to calculate $[t]P_A$. In another embodiment, Step S1512 involves the execution of only one point multiplication microinstruction, which operates the point multiplication hardware to calculate the elliptic curve point $(x_1', y_1')=[s']G+[t]P_A$.

In step S1514, as indicated by a Hash value pointer stored in the input register, the processor 600 reads a Hash value e' (stored in the system memory, and is calculated from the first and second preprocessing procedures for the data M') from the system memory. According to the Hash value e', the processor 600 calculates a digital signature part: $R=(e'+x_1')$ mod n.

In step S1516, it is verified whether the digital signature part R is equal to the part r' of digital signature to be verified. If not, the flow proceeds to step S1506, and the output register ECX is filled with 0 to indicate that the signature verification has failed. If yes, the flow proceeds to step S1518, and the output register ECX is filled with 1 to indicate that the signature verification has succeeded. In another exemplary embodiment, the output register ECX with 1 indicates that the signature verification has failed, and the output register ECX with 0 indicates that the signature verification has succeeded. It is not intended to limit the values representing the success or failure of the signature verification. In step S1520, the signature verification called by an SM2 instruction ends.

To summarize, in response to a single elliptic curve cryptographic instruction (SM2 instruction) of an instruction set architecture (ISA), a processor reads a Hash value e' of the data (M') by referring to a first register, reads a public key $(P_A)$ by referring to a second register, reads a digital signature—(r', s') to be verified by referring to a third register, uses the public key $(P_A)$ and the digital signature (r', s') to be verified to perform a signature verification procedure using an elliptic curve cryptographic algorithm on the Hash value e', and stores the result of signature verification. In this case, only one single ISA instruction is enough to complete the SM2 signature verification. The specially designed SM2 engine 626 speeds up the SM2 signature verification and improves security. In another exemplary embodiment, the cryptographic unit 118 does not include the specifically designed SM2 engine 626. Instead, the microcode UCODE is specially designed to transform one ISA SM2 instruction into a plurality of microinstructions to operate the existing arithmetic logic units ALUs to perform the SM2 signature verification.

The key exchange function of SM2 algorithm is discussed in the following paragraphs. The key exchange function may be accomplished by three procedures: the first key exchange procedure, the second key exchange procedure, and the third key exchange procedure. The second and third key exchange procedures each have a Hash value related version and a Hash-value nonrelated version. In an exemplary embodiment, an instruction set architecture providing three types of elliptic curve cryptographic instructions (three different SM2 instructions) is shown. An initiator processor generates a key pair $(r_A, R_A)$ by executing the first elliptic curve cryptographic key exchange instruction, wherein $r_A$ is a temporary private key and $R_A$ is a first temporary public key. A responder processor receives the first temporary public key $R_A$ from the initiator processor, and generates a second temporary public key $R_B$ and private key $r_B$ for itself. Based on the first temporary public key $R_A$, the second temporary private key $r_{B-}$, public key $P_A$ of initiator, private key $d_B$ and public key $P_B$ of responder, the responder processor executes the second elliptic curve cryptographic key exchange instruction to generate a responder-generated shared key $K_B$. Based on the temporary private key $r_A$, the temporary public keys $R_A$ and $R_B$, public key $P_B$ of responder, private key $d_A$ and public key $P_A$ of initiator, the initiator processor executes the third elliptic curve cryptographic key exchange instruction to generate a initiator-generated shared key $K_A$.

FIG. 16 presents a table 1604 to introduce the design in the microcode UCODE related to the first key exchange procedure for the key exchange function of SM2 algorithm. According to the microinstructions generated based on the microcode UCODE for the first key exchange procedure, the contents in the architectural registers 124 are defined, read and updated as shown in table 1604. The aforementioned control word (cw) 6'b 010000 is programed into the input register EDX in advance to indicate that the first key exchange procedure is called. In addition to the input register EDX, the table 1604 further lists the other input registers ESI and EDI required to start the first key exchange procedure. When finishing the first key exchange procedure called by an ISA SM2 instruction, the register EDI is programmed as an output register. The design of the input and output registers may have the other variants.

When being used as an input register, the control word cw stored in the register EDX is 6'b 010000, which represents the first key exchange procedure. The input register ESI stores an intermediate variable pointer pointing to a storage space (within the system memory and named as a scratch space for temporary storage of high security intermediate variables, may be 8K in size, follow the ES segmentation technology, be initialized to all zeros, and be allocated by the operating system according to a request from software). The input register EDI stores a key pair output pointer, pointing to a storage space (within the system memory and following ES segmentation technology) to indicate the storage of the key pair ($r_A$, $R_A$).

When finishing the first key exchange procedure requested by an ISA SM2 instruction, the output register EDI is not changed.

Figure 17:
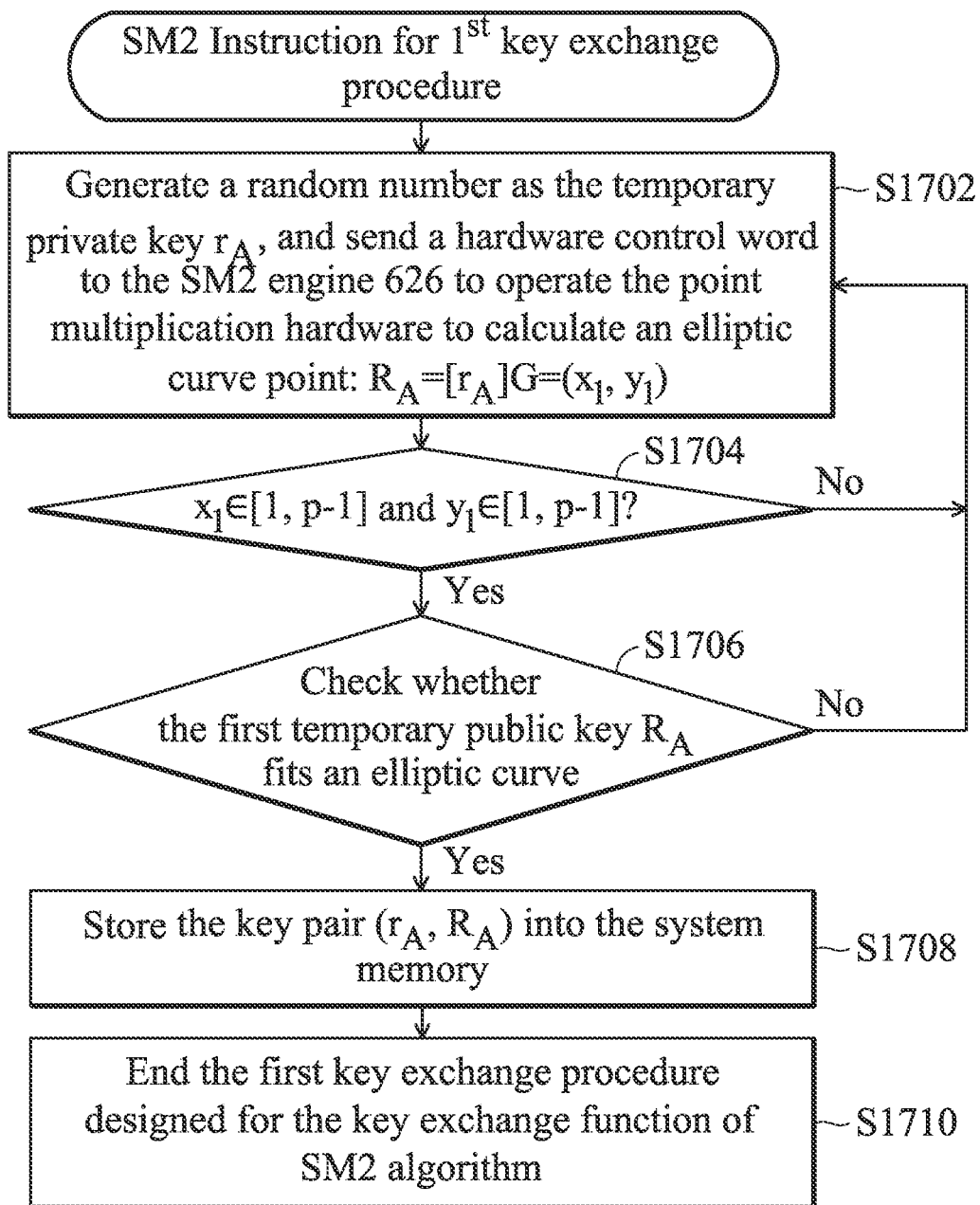
FIG. 17 is a flow chart illustrating a first key exchange procedure performed by executing an ISA SM2 instruction in accordance with an exemplary embodiment of the present application.

FIG. 17 is a flow chart illustrating a first key exchange procedure performed by executing an ISA SM2 instruction in accordance with an exemplary embodiment of the present application. The illustrated steps relate to the microinstructions decoded from the ISA SM2 instruction. The ISA SM2 instruction is executed by the initiator processor that initiates the key exchange.

In step S1702, a hardware control word (generated according to the control word cw stored in the input register EDX) is sent to the SM2 engine 626 to operate the point multiplication hardware to calculate an elliptic curve point: $R_A=[r_A]G=(x_1, y_1)$, where $r_A$ is a random number and is regarded as a temporary private key of the initiator processor, and $R_A$ is the first temporary public key. Step S1702 may be performed through the execution of a point multiplication microinstruction (operative to operate the point multiplication hardware), or be further associated with a random number generation microinstruction that operates a random number generator within the cryptographic unit 618 to generate a random number as the temporary private key $r_A$.

In step S1704, it is determined whether $x_1 \in [1, p-1]$ and $y_1 \in [1, p-1]$, where p is a 256-bit prime number. If any condition is not true, the flow repeats step S1702 to update the key pair ($r_A$, $R_A$) by a new random number. If both conditions are satisfied, step S1706 is performed to check whether the first temporary public key $R_A$ fits an elliptic curve (that is, determining whether an elliptic curve equation is satisfied, the same below). If not, the flow repeats step S1702 to update the key pair ($r_A$, $R_A$) by a new random number. If yes, step S1708 stores the key pair ($r_A$, $R_A$) into the system memory as indicated by the key pair output pointer stored in the input register EDI. Step S1710 ends the first key exchange procedure designed for the key exchange function of SM2 algorithm. The key pair ($r_A$, $R_A$) is kept in the initiator processor and will be used in the later procedure for the generation of the shared key $K_A$ and $K_B$. The first temporary public key $R_A$ needs to be transferred (for example, via a network) to the responder processor for the execution of the second key exchange procedure.

Figure 18:
FIG. 18 presents a table 1804 to introduce the design in the microcode UCODE related to the second key exchange procedure for the key exchange function of SM2 algorithm.

FIG. 18 presents a table 1804 to introduce the design in the microcode UCODE related to the second key exchange procedure for the key exchange function of SM2 algorithm. According to the microinstructions generated based on the microcode UCODE for the second key exchange procedure, the contents in the architectural registers 124 are defined, read and updated as shown in table 1804. The aforementioned control word cw (e.g., 6'b 010001 representing that the second key exchange procedure is irrelevant to Hash values, or 6'b 010101 representing that the second key exchange procedure depends on Hash values) is programed into the input register EDX in advance to show what version of the second key exchange procedure is called. In addition to the input register EDX, the table 1804 further lists the other input registers EAX, ECX, ESI, and EDI required to start the second key exchange procedure. When finishing the second key exchange procedure called by an ISA SM2 instruction, the register EDI is programmed as an output register. The design of the input and output registers may have the other variants.

When being used as an input register, the register EAX stores a key exchange information pointer, pointing to a storage space (within the system memory and following ES segmentation technology) of the key exchange information. The key exchange information includes: a first temporary public key $R_A$, a responder-side private key $d_B$, a responder-side public key $P_B$, an initiator-side public key $P_A$, a bit length $ID_A\_len$ of an initiator identification code (or a recognizable logo) $ID_A$, the initiator identification code $ID_A$, a bit length $ID_B\_len$ of a responder identification code $ID_B$, the responder identification code $ID_B$. The input register ECX stores a bit length klen of a shared key. The bit length klen of the shared key depends on the application purpose of the initiator and responder. For example, for SM4 encryption, the bit length of the shared key klen can be 128 bits, 192 bits, or 256 bits. The control word cw stored in the input register EDX may be 6'b 010001 (representing the second key exchange procedure irrelevant to Hash values), or 6'b 010101 (representing the second key exchange procedure depends on Hash values). The input register ESI stores an intermediate variable pointer pointing to a storage space (within the system memory and named as a scratch space for temporary storage of high security intermediate variables, may be 8K in size, follow the ES segmentation technology, be initialized to all zeros, and be allocated by the operating system according to a request from software). The input register EDI stores a shared key pointer, pointing to a storage space (within the system memory and following ES segmentation technology) to indicate the storage of the responder-generated shared key $K_B$ and the second temporary public key $R_B$. In some exemplary embodiments, the shared key pointer further indicates the storage of the Hash values $S_2$ and $S_B$ (optional; not used when the second key exchange procedure is irrelevant to Hash values).

When finishing the second key exchange procedure requested by an ISA SM2 instruction, the output register EDI is not changed.

Figure 19A:
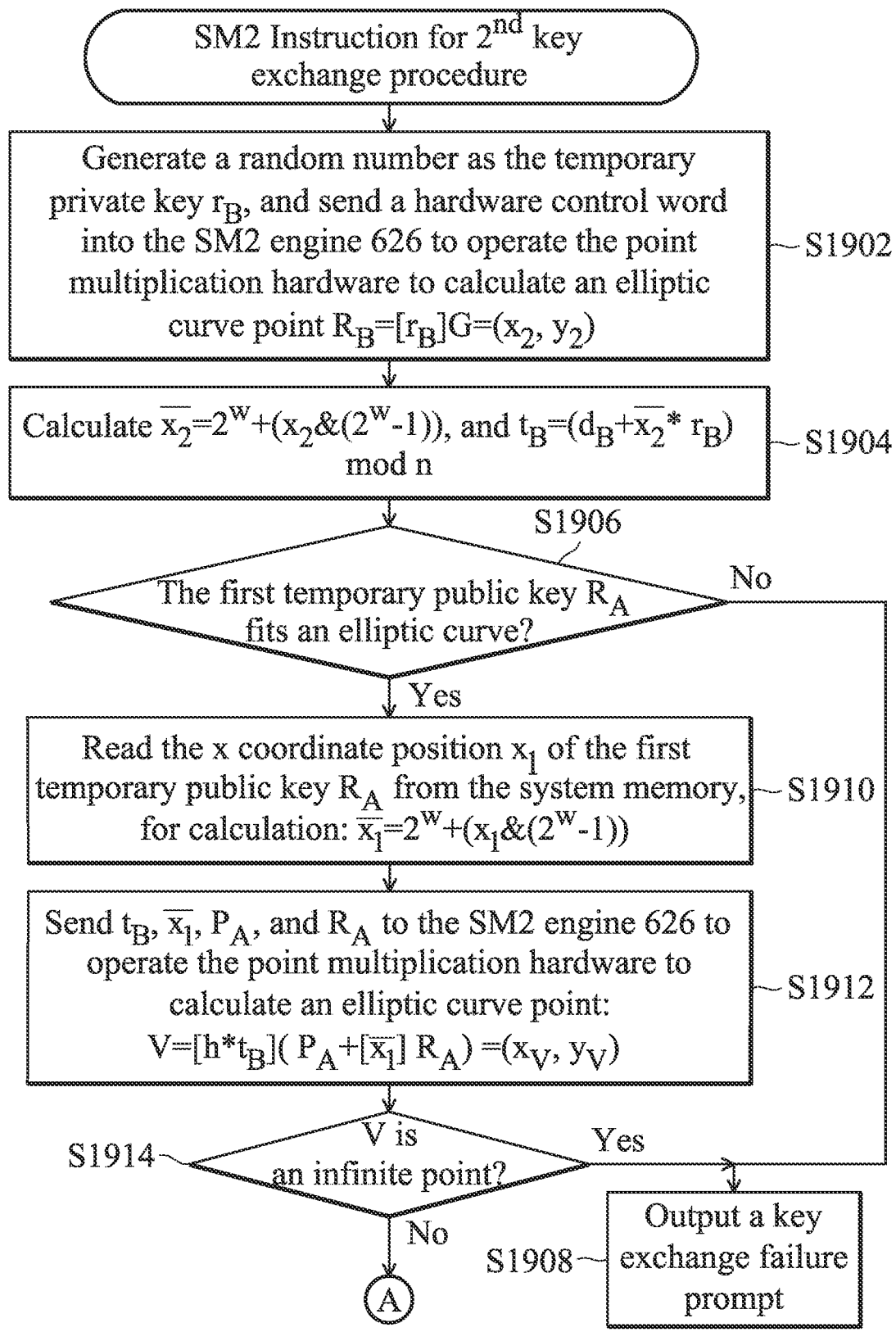
FIGS. 19A and 19B are a flow chart illustrating the second key exchange procedure performed by executing an ISA SM2 instruction in accordance with an exemplary embodiment of the present application.
Figure 19B:
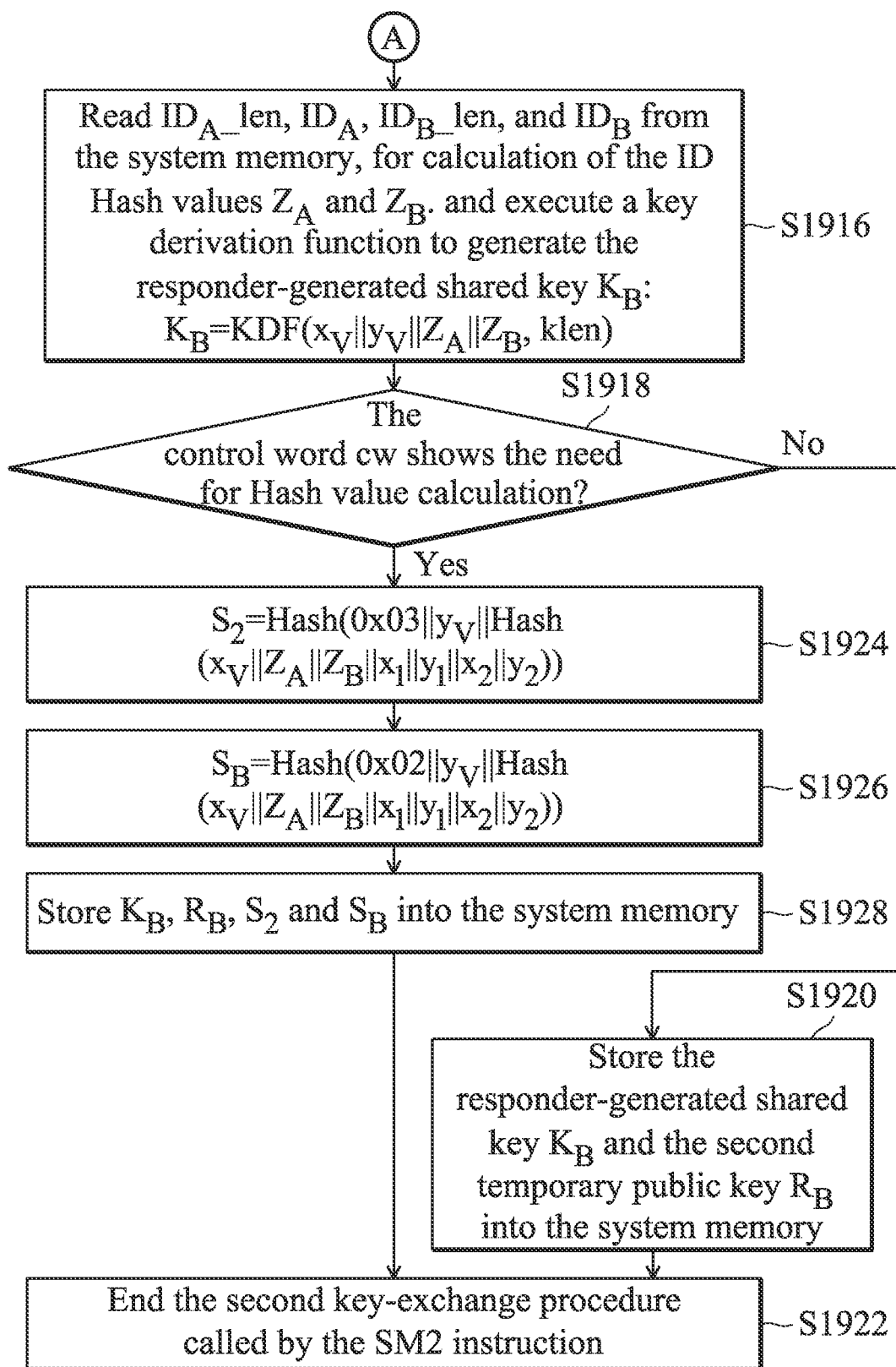

FIGS. 19A and 19B are a flow chart illustrating the second key exchange procedure performed by executing an ISA SM2 instruction in accordance with an exemplary embodiment of the present application. The illustrated steps relate to the microinstructions decoded from the ISA SM2 instruction. The ISA SM2 instruction is executed by the responder processor that receives a request for key exchange.

Starting from FIG. 19A, in step S1902, a hardware control word (generated according to the control word cw stored in the input register EDX) is sent into the SM2 engine 626 to operate the point multiplication hardware to calculate an elliptic curve point $R_B=[r_B]G=(x_2, y_2)$, where $r_B$ is a random number that is regarded as a temporary private key of the responder processor, and $R_B$ is the second temporary public key. Step S1902 may be performed through the execution of a point multiplication microinstruction (operative to operate the point multiplication hardware), or be further associated with a random number generation microinstruction that operates a random number generator within the cryptographic unit 618 to generate a random number as the temporary private key $r_B$.

In step S1904, the following calculations are performed:

$$\overline{x}_2 = 2^w + (x_2 \& (2^w - 1)); \text{and}$$

$$t_B = (d_B + \overline{x}_2 * r_B) \bmod n,$$

where w is a constant.

In step S1906, the responder processor determines whether the first temporary public key $R_A$ generated by the initiator processor fits an elliptic curve, wherein the responder processor reads the first temporary public key $R_A$ from the system memory as indicated by the key exchange information pointer stored in the input register EAX. If not, step S1908 is performed and the responder processor outputs a key exchange failure prompt. If yes, step S1910 reads the x coordinate position $x_1$ of the first temporary public key $R_A$ from the system memory, for calculation: $\overline{x_1}=2'+(x_1 \& (2^w-1))$.

In step S1912, the values $t_B$ and $\overline{x_1}$, the initiator-side public key $P_A$, and the first temporary public key $R_A$ are input to the SM2 engine 626 to operate the point multiplication hardware to calculate an elliptic curve point:

$$V=[h*t_B](P_A+[\overline{x_1}]R_A)=(x_V,y_V).$$

Step S1912 may be performed through the execution of two point multiplication microinstructions, one for the calculation of $[\overline{x_1}] R_A$, and another one for the calculation of $[h*t_B] (P_A+[\overline{x_1}] R_A)$.

In step S1914, it is determined whether the elliptic curve point V is an infinite point (also called an infinite distance point or a zero point). If yes, step S1908 is performed, and the responder processor outputs a key exchange failure prompt. If not, the flow proceeds to step S1916 in FIG. 19B.

In step S1916, as indicated by the key exchange information pointer stored in the input register EAX, the processor reads the initiator ID code bit length $ID_A$\_len, the initiator ID code $ID_A$, the responder ID code bit length $ID_B$\_len, and the responder ID code $ID_B$ from the system memory, for calculation of the ID Hash values $Z_A$ and $Z_B$. A key derivation function is executed to get the responder-generated shared key $K_B$, the calculation is:

$$K_B=KDF(x_V||y_V||Z_A||Z_B,\text{klen})$$

In an exemplary embodiment, the ID Hash values $Z_A$ and $Z_B$ are calculated using the first preprocessing procedure.

In step S1918, the control word cw stored in the register EDX is checked to determine whether to calculate and output Hash values. If not (cw=6'b 010001), step S1920 is performed to store the responder-generated shared key $K_B$ and the second temporary public key $R_B$ into the system memory, and then step S1922 is performed to end the second key-exchange procedure called by the SM2 instruction. Otherwise (cw=6'b 010101), the flow goes to steps S1924 and S1926. In step S1924, a Hash value $S_2$ is calculated:

$$S_2=\text{Hash}(0x03||y_V||\text{Hash}(x_V||Z_A||Z_B||x_1||y_1||x_2||y_2))$$

In step S1926, a Hash value $S_B$ is calculated:

$$S_B=\text{Hash}(0x02||y_V||\text{Hash}(x_V||Z_A||Z_B||x_1||y_1||x_2||y_2))$$

In step S1928, as indicated by the shared key pointer stored in the input register EDI, the responder-generated key $K_B$, the second temporary public key $R_B$, and the Hash value $S_2$ and $S_B$ are stored into the system memory. In step S1922, the second key-exchange procedure called by the SM2 instruction ends. The second temporary public key $R_B$ needs to be transferred (for example, via a network) to the initiator processor for the execution of the third key exchange procedure.

FIG. 20 presents a table 2004 to introduce the design in the microcode UCODE related to the third key exchange procedure for the key exchange function of SM2 algorithm. According to the microinstructions generated based on the microcode UCODE for the third key exchange procedure, the contents in the architectural registers 124 are defined, read and updated as shown in table 1804. The control word cw (e.g., 6'b 010010, meaning that the third key exchange procedure is irrelevant to Hash values, or 6'b 010110, meaning that the third key exchange procedure depends on Hash values) is programed into the input register EDX in advance to show what version of the third key exchange procedure is requested. In addition to the input register EDX, the table 2004 further lists the other input registers EAX, ECX, ESI, and EDI required to start the third key exchange procedure. When finishing the third key exchange procedure called by an ISA SM2 instruction, the register EDI is programmed as an output register. The design of the input and output registers may have the other variants.

When being used as an input register, the register EAX stores a key exchange information pointer, pointing to a storage space (within the system memory and following ES segmentation technology) of the key exchange information. The key exchange information includes: a initiator-side temporary private key $r_A$, a first temporary public key $R_A$ of the initiator processor, a responder-side temporary public key $R_B$, a responder-side public key $P_B$, an initiator-side private key $d_A$, an initiator-side public key $P_A$, a bit length $ID_A$\_len of an initiator identification code $ID_A$, the initiator identification code $ID_A$, a bit length $ID_B$\_len of a responder identification code $ID_B$, and the responder identification code $ID_B$. The input register ECX stores a bit length klen of a shared key. The control word cw stored in the input register EDX may be 6'b 010010 (representing the third key exchange procedure that is irrelevant to Hash values), or 6'b 010110 (representing the third key exchange procedure that depends on Hash values). The input register ESI stores an intermediate variable pointer pointing to a storage space (within the system memory and named as a scratch space for temporary storage of high security intermediate variables, may be 8K in size, follow the ES segmentation technology, be initialized to all zeros, and be allocated by the operating system according to a request from software). The input register EDI stores a shared key pointer, pointing to a storage space (within the system memory and following ES segmentation technology) to indicate the storage of the initiator-generated shared key $K_A$. In some exemplary embodiments, the shared key pointer further indicates the storage of the Hash values $S_1$ and $S_A$ (optional; not used when the third key exchange procedure is irrelevant to Hash values).

When finishing the third key exchange procedure requested by an ISA SM2 instruction, the output register EDI is not changed.

Figure 21A:
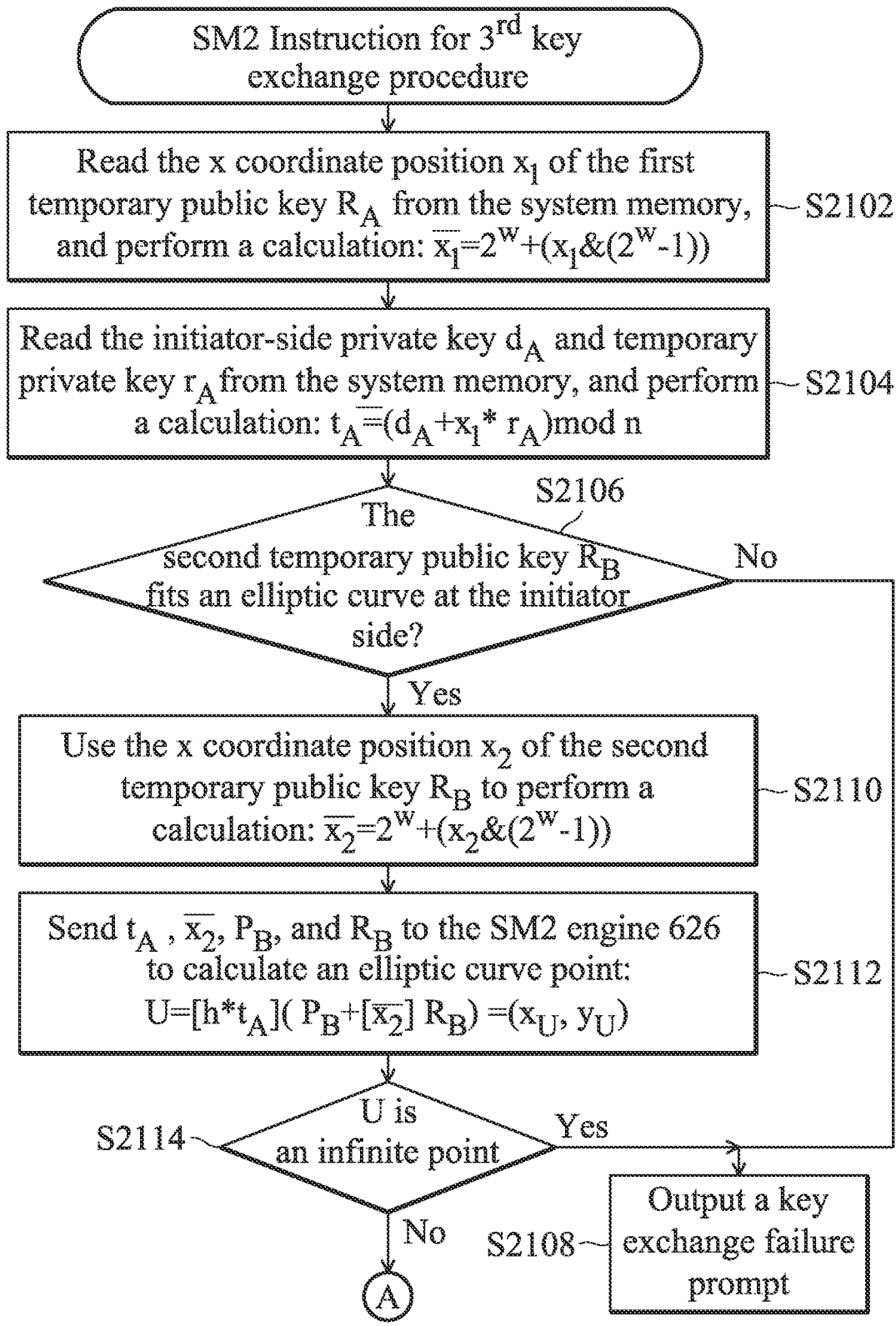
FIGS. 21A and 21B are a flow chart illustrating the third key exchange procedure performed by executing an ISA SM2 instruction in accordance with an exemplary embodiment of the present application.
Figure 21B:
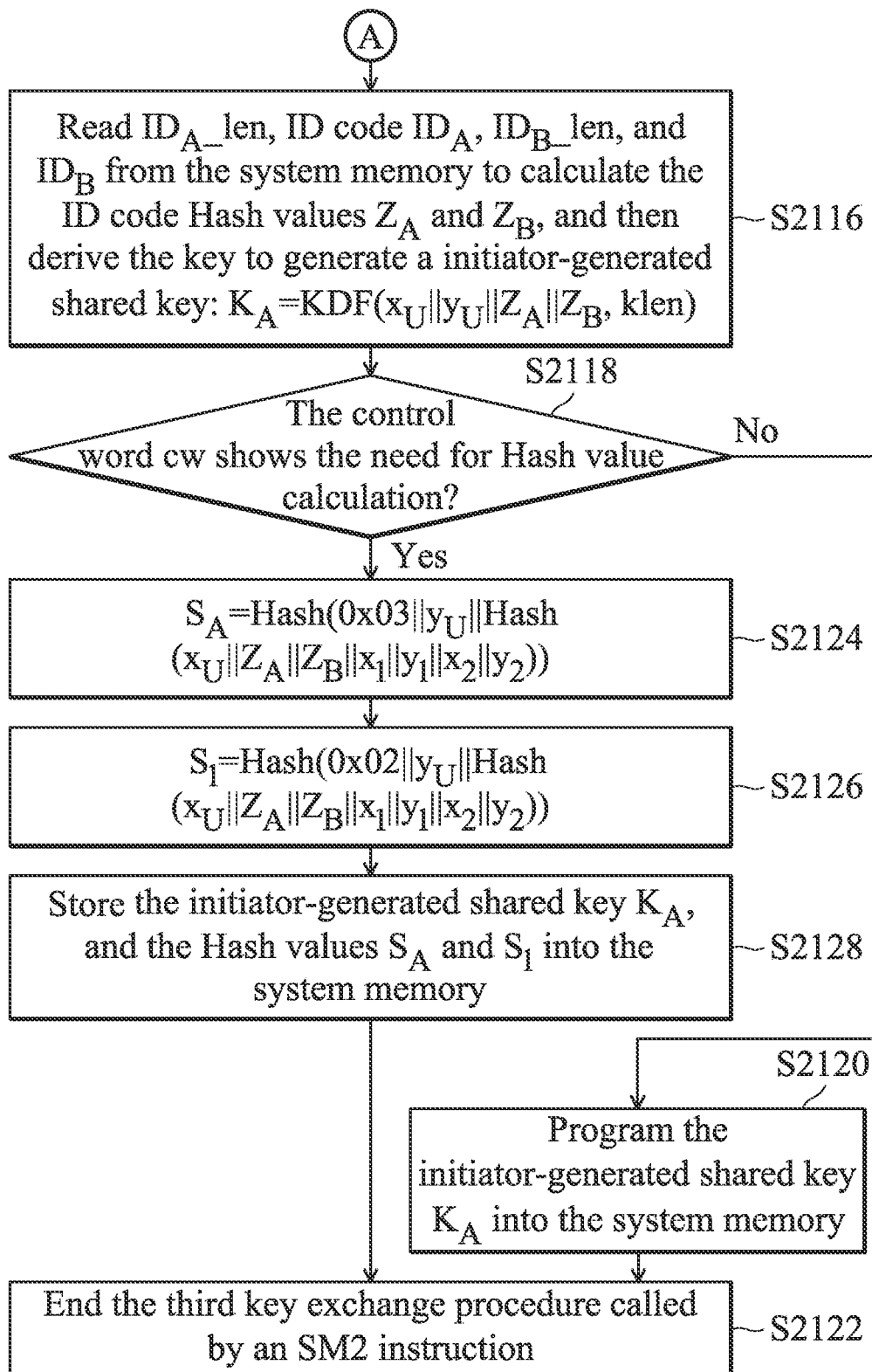

FIGS. 21A and 21B are a flow chart illustrating the third key exchange procedure performed by executing an ISA SM2 instruction in accordance with an exemplary embodiment of the present application. The illustrated steps relate to the microinstructions decoded from the ISA SM2 instruction. The ISA SM2 instruction is executed by the initiator processor which initiates the key exchange and receives the response from the responder processor.

Starting from step S2102 of FIG. 21A, as indicated by the key exchange information pointer obtained from the input register EAX, the processor reads the x coordinate position $x_1$ of the first temporary public key $R_A$ from the system memory, and performs a calculation: $\overline{x_1}=2^w+(x_1 \& (2^w-1))$. In step S2104, the processor reads the initiator-side private key $d_A$ and temporary private key $r_A$ from the system memory, and performs a calculation: $t_A=(d_A+\overline{x_1}*r_A) \bmod n$. In step S2106, it is determined whether the second temporary public key $R_B$ provided by the responder processor fits an elliptic curve at the initiator side. If not, step S2108 is performed and the initiator processor outputs a key exchange failure prompt. On the contrary, step S2110 uses the x coordinate position $x_2$ of the second temporary public key $R_B$ to perform a calculation:

$$\overline{x_2}=2^w+(x_2 \& (2^w-1))$$

In step S2112, data $t_A$ and $\overline{x_2}$, the responder-side public key $P_B$, and the second temporary public key $R_B$ are input into the SM2 engine 626 to calculate an elliptic curve point:

$$U=[h*t_A](P_B+[\overline{x_2}]R_B)=(x_U,y_U)$$

The SM2 engine 626 outputs the elliptic curve point U. Step S2112 may be performed through the execution of two point multiplication microinstructions; one for the calculation of [$\overline{x_2}$] $R_B$, and the other for the calculation of $[h*t_A]$ $(P_B+[\overline{x_2}]R_B)$.

In step S2114, it is determined whether the elliptic curve point U is an infinite point. If yes, step S2108 is performed, and the processor outputs a key exchange failure prompt. If not, the flow proceeds to step S2116 in FIG. 21B.

In step S2116, as indicated by the key exchange information pointer stored in the input register EAX, the initiator processor reads the initiator ID code bit length $ID_A\_len$, the initiator ID code $ID_A$, the responder ID code bit length $ID_B\_len$, and the responder ID code $ID_B$ from the system memory, to calculate the ID code Hash values $Z_A$ and $Z_B$, and then derive the key to generate a initiator-generated shared key:

$$K_A=KDF(x_U\|y_U\|Z_A\|Z_B,\text{klen})$$

In an exemplary embodiment, the ID code Hash values $Z_A$ and $Z_B$ are calculated using the first preprocessing procedure.

In step S2118, the control word cw stored in the register EDX is checked to determine whether Hash value calculations are required. If not (cw=6'b 010010), step S2120 is performed to program the initiator-generated shared key $K_A$ into the system memory. In step S2122, the third key exchange procedure called by an SM2 instruction ends. Otherwise (cw=6'b 010110), the flow proceeds to steps S2124 and S2126.

In step S2124, a Hash value $S_A$ is calculated:

$$S_A=\text{Hash}(0x03\|y_U\|\text{Hash}(x_U\|Z_A\|Z_B\|x_1\|y_1\|x_2\|y_2))$$

In step S2126, a Hash value $S_1$ is calculated:

$$S_1=\text{Hash}(0x02\|y_U\|\text{Hash}(x_U\|Z_A\|Z_B\|x_1\|y_1\|x_2\|y_2))$$

In step S2128, as indicated by a shared key pointer obtained from the input register EDI, the initiator-generated shared key $K_A$, and the Hash values $S_A$ and $S_1$ are stored into the system memory. Then, step S2122 is performed to end the third key exchange procedure called by an SM2 instruction.

In the embodiments wherein the Hash values are required, the Hash values $S_A$ and $S_1$ calculated at the initiator side are compared with the Hash values $S_2$ and $S_B$ calculated at the responder side to determine whether the key exchange succeeds or not.

Figure 22:
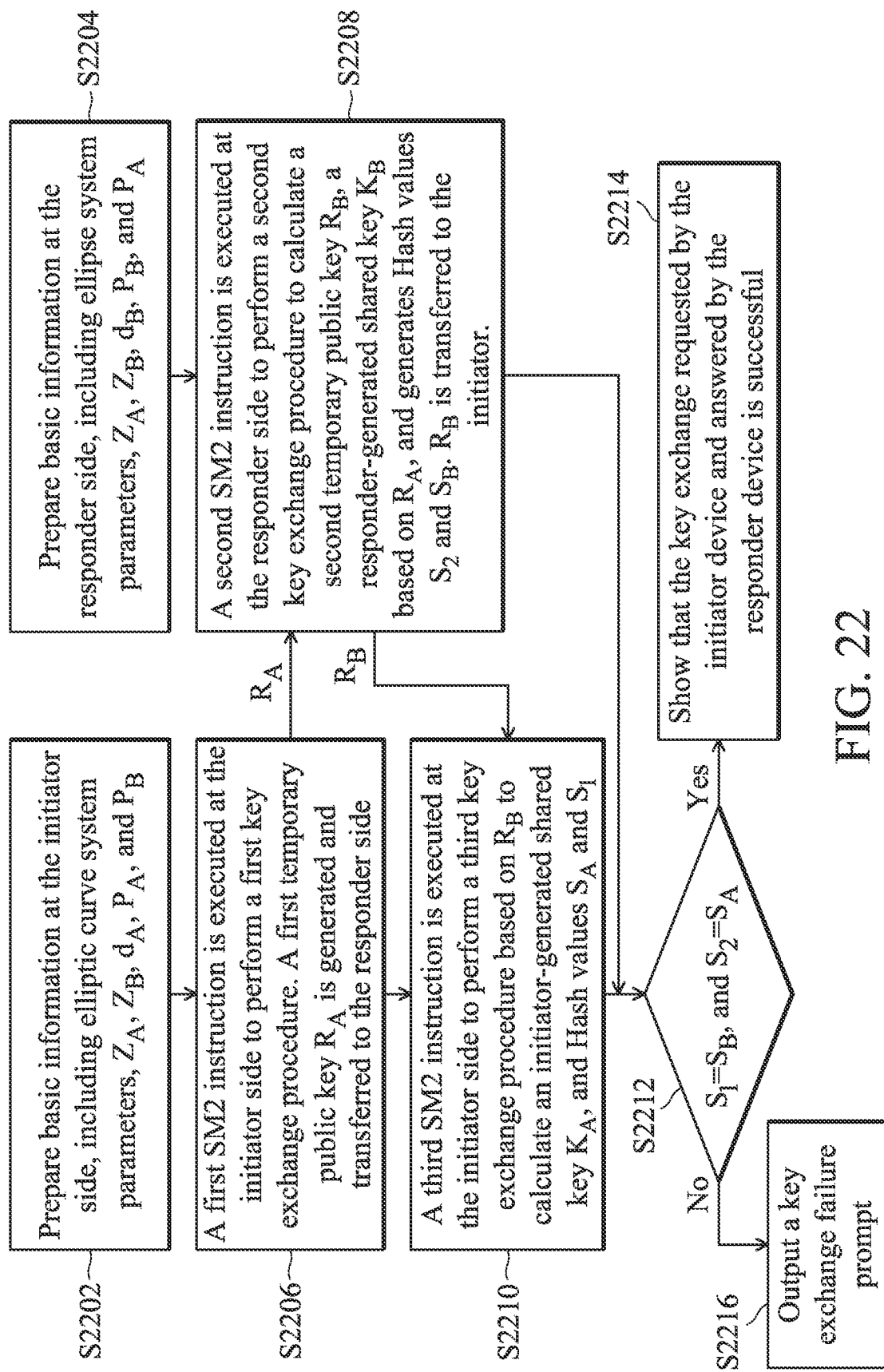
FIG. 22 illustrates how an initiator device and a responder device accomplish key exchange using the first, second, and third key exchange procedures in accordance with an exemplary embodiment of the present application.

FIG. 22 illustrates how an initiator device and a responder device accomplish key exchange using the first, second, and third key exchange procedures in accordance with an exemplary embodiment of the present application. The initiator device and the responder device can communicate with each other. In an exemplary embodiment, the initiator device and the responder device each include a processor (e.g., the processor 600). In another exemplary embodiment, the initiator device and the responder device work at the same processor (600). In another exemplary embodiment, at least one of the initiator device and responder device is an encryption and decryption card. The present application does not limit the application of the initiator device and the responder device.

In step S2202, basic information to request key exchange is prepared at the initiator side, including elliptic curve system parameters, ID code Hash values $Z_A$ and $Z_B$, an initiator-side private key $d_A$, an initiator-side public key $P_A$, and a responder-side public key $P_B$. In step S2204, basic information to respond to the received key exchange request is prepared at the responder side, including ellipse system parameters, ID code Hash values $Z_A$, $Z_B$, a responder-side private key $d_B$, a responder-side public key $P_B$, and an initiator-side public key $P_A$.

In step S2206, a first SM2 instruction is executed at the initiator side, and the control word cw prepared in its register EDX corresponds to a first key exchange procedure. A first temporary public key $R_A$ is generated using the first key exchange procedure and is transferred to the responder side.

In step S2208, a second SM2 instruction is executed at the responder side, wherein the control word cw prepared in its register EDX corresponds to a second key exchange procedure. A second temporary public key $R_B$ is generated at the responder side and transferred to the initiator. Furthermore, by executing the second SM2 instruction, the responder device generates a responder-generated shared key $K_B$ based on the first temporary public key $R_A$ received from the initiator device, and generates Hash values $S_2$ and $S_B$. The Hash values $S_2$ and $S_B$ are required later to determine whether the key exchange succeeds or not.

In step S2210, in response to the second temporary public key $R_B$ transferred from the responder device, a third SM2 instruction is executed at the initiator side, and the control word cw prepared in its register EDX corresponds to a third key exchange procedure. By executing the third SM2 instruction, the initiator device generates an initiator-generated shared key $K_A$, and Hash values $S_A$ and $S_1$. The Hash values $S_A$ and $S_1$ are required later to determine whether the key exchange succeeds or not.

In step S2212, it is checked at the initiator side whether the Hash value $S_1$ is equal to the Hash value $S_B$, and it is checked at the responder side whether the Hash value $S_2$ is equal to the Hash value $S_A$. If both conditions are satisfied, it is determined in step S2214 that the key exchange requested by the initiator device and answered by the responder device was successful. If any condition is not satisfied, step S2216 is performed to operate the processors to output the key exchange failure prompt.

In accordance with an exemplary embodiment of the present application, at the initiator side, a first register (EDI) and a second register (EAX) are required. For the execution of a first elliptic curve cryptographic instruction of an instruction set architecture (ISA), the first register (EDI) stores a key pair output pointer that is operative to indicate how to store a key pair ($r_A$, $R_A$) to the system memory. In response to the first elliptic curve cryptographic instruction, the processor performs a first key exchange procedure to generate a random number as a temporary private key $r_A$, uses the temporary private key $r_A$ to process an elliptic curve base point G to generate a first temporary public key $R_A$, and writes the temporary private key $r_A$ and the first temporary public key $R_A$ into the system memory as indicated by the key pair output pointer obtained from the first register (EDI). The second register (EAX) stores a key exchange information pointer pointing to the key exchange information stored in the memory. The key exchange information includes the temporary private key $r_A$, the first temporary public key $R_A$, and a second temporary public key $R_B$. The second temporary public key $R_B$ is generated at the responder side of key exchange. By executing a second elliptic curve key instruction, the processor at the responder side performs a second key exchange procedure of elliptic curve cryptographic algorithm to generate the second temporary public key $R_B$, and generate a responder-generated shared key $K_B$ based on the first temporary public key $R_A$ and the second temporary public key $R_B$. For the execution of a third elliptic curve cryptographic instruction, the first register (EDI) is updated to store a shared key pointer that indicates how to program an initiator-generated shared key $K_A$ into the system memory. In response to the third elliptic curve cryptographic instruction, the processor performs a third key exchange procedure to read the second temporary public key $R_B$ by referring to the second register (EAX), generate the initiator-generated shared key $K_A$ based on the temporary private key $r_A$, the first temporary public key $R_A$, and the second temporary public key $R_B$, and write the initiator-generated shared key $K_A$ into the system memory as indicated by the first register (EDI).

In accordance with an exemplary embodiment of the present application, at the responder side, a first register (EDI) and a second register (EAX) are required. The second register (EAX) stores a key exchange information pointer pointing to the key exchange information stored in the system memory. The key exchange information includes a first temporary public key $R_A$. The first temporary public key $R_A$ is generated at the initiator side of the key exchange. By executing a first elliptic curve key instruction, the processor at the initiator side performs a first key exchange procedure of elliptic curve cryptographic algorithm to generate the first temporary public key $R_A$. The first register stores a shared key pointer indicating how to program a responder-generated shared key $K_B$ and a second temporary public key $R_B$ into the system memory. By executing a second elliptic curve key instruction, the processor at the responder side performs a second key exchange procedure of elliptic curve cryptographic algorithm to generate a random number as a temporary private key $r_B$, use the temporary private key $r_B$ to process an ellipse curve base point G to generate the second temporary public key $R_B$, obtain the first temporary public key $R_A$ by referring to the second register (EAX), generate a responder-generated shared key $K_B$ based on the first temporary public key $R_A$ and the second temporary public key $R_B$, and store the second temporary public key $R_B$ and the responder-generated shared key $K_B$ into the system memory as indicated by the first register (EDI). The second temporary public key $R_B$ is read by the processor at the initiator side. By executing a third elliptic curve key instruction, the processor at the initiator side perform a third key exchange procedure of the elliptic curve cryptographic algorithm to generate an initiator-generated shared key $K_A$ based on the second temporary public key $R_B$.

This case completes the key exchange of SM2 algorithm with three simple ISA instructions. In addition to the SM2 engine 626, the SM3 engine 126 is adopted to speed up the SM2 key exchange and improve the security. In another exemplary embodiment, the cryptographic unit 118 does not include the specifically designed SM2 engine 626 nor the SM3 engine 126. Instead, the microcode UCODE is specially designed to transform an ISA SM2 instruction into a plurality of microinstructions to operate the existing arithmetic logic units ALUs to perform the SM2 key exchange.

The details of the first preprocessing procedure and the second preprocessing procedure about Hash value calculation are discussed in following paragraphs.

Figure 23:
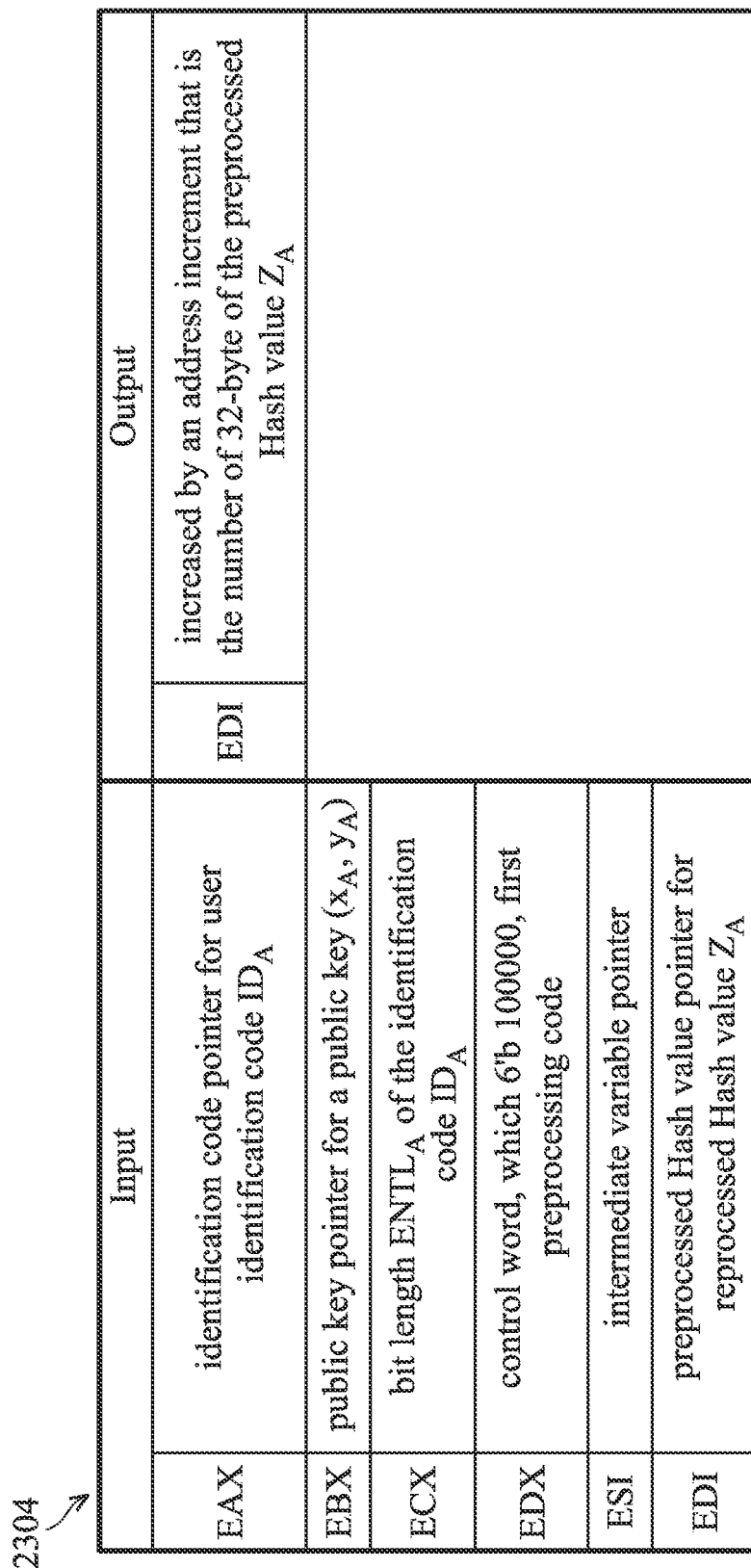
FIG. 23 presents a table 2304 to introduce the design in the microcode UCODE related to the first preprocessing procedure.

FIG. 23 presents a table 2304 to introduce the design in the microcode UCODE related to the first preprocessing procedure. According to the microinstructions generated based on the microcode UCODE in response to an SM2 instruction calling the first preprocessing procedure, the contents in the architectural registers 124 are defined, read and updated as shown in table 2304. The control word cw, 6'b 100000, is programed into the input register EDX in advance to show that the SM2 instruction is calling the first preprocessing procedure. In addition to the input register EDX, the table 2304 further lists the other input registers EAX, EBX, ECX, ESI, and EDI required to start the first preprocessing procedure. When finishing the first preprocessing procedure called by an ISA SM2 instruction, the register EDI is programmed as an output register. The design of the input and output registers may have the other variants.

When being used as an input register, the register EAX stores an identification code pointer, pointing to a storage space (within the system memory and following ES segmentation technology) of user identification code $ID_A$. The input register EBX stores a public key pointer pointing to a storage space (within the system memory and following ES segmentation technology) of a public key $(x_A, y_A)$. The input register ECX stores a bit length $ENTL_A$ of the identification code $ID_A$. The control word cw stored in the input register EDX is 6'b 100000, which is first preprocessing code. The input register ESI stores an intermediate variable pointer pointing to a storage space (within the system memory and named as a scratch space for temporary storage of high security intermediate variables, may be 8K in size, follow the ES segmentation technology, be initialized to all zeros, and be allocated by the operating system according to a request from software). The input register EDI stores a preprocessed Hash value pointer, pointing to a storage space (within the system memory and following ES segmentation technology) to indicate the storage of a preprocessed Hash value $Z_A$.

When finishing the first preprocessing procedure requested by an ISA SM2 instruction, the preprocessed Hash value pointer stored in the register EDI is modified to point to the higher address. The address increment is the number of 32-byte of the preprocessed Hash value $Z_A$.

Figure 24:
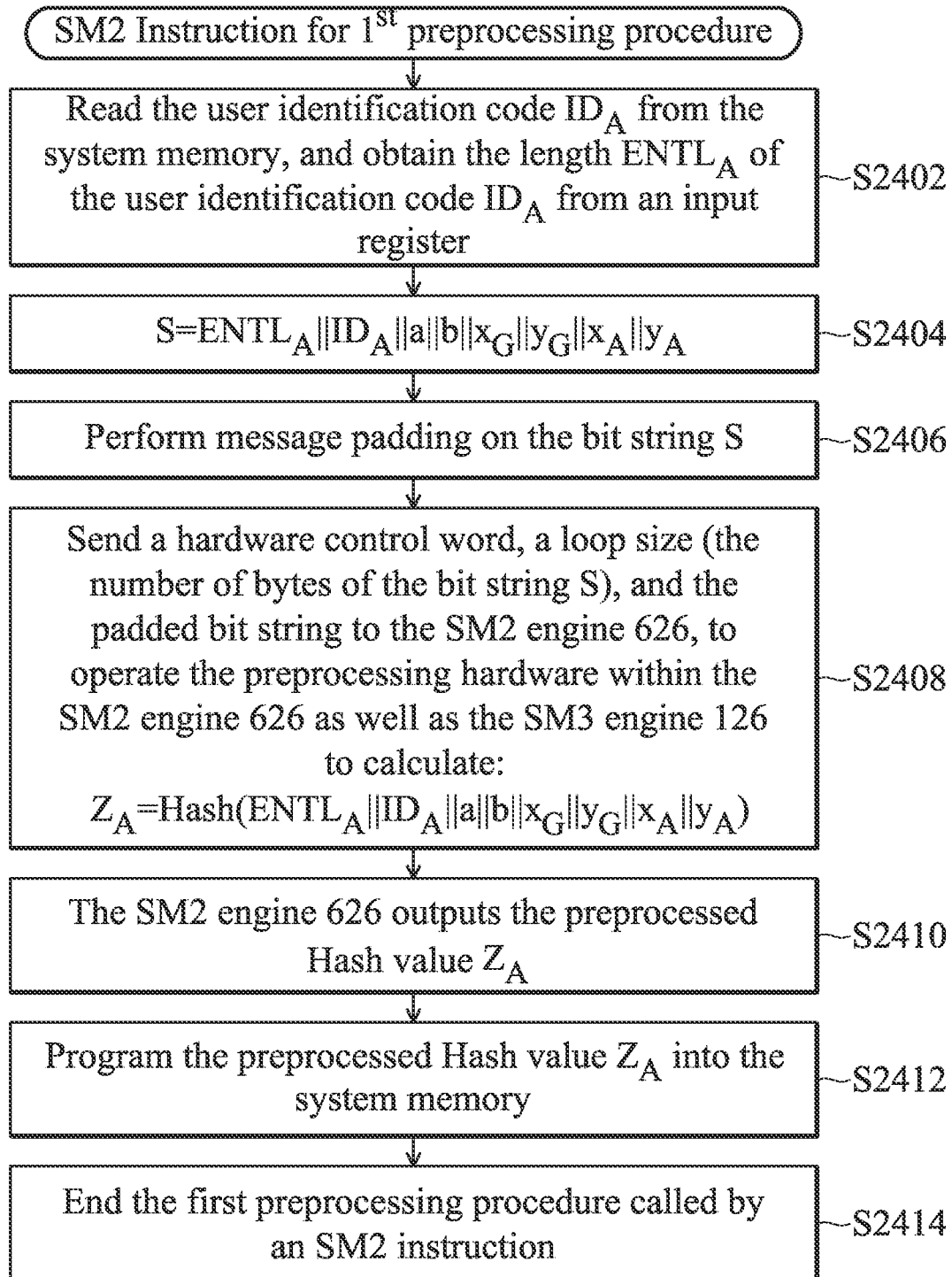
FIG. 24 is a flow chart illustrating the first preprocessing procedure performed by executing an ISA SM2 instruction in accordance with an exemplary embodiment of the present application.

FIG. 24 is a flow chart illustrating the first preprocessing procedure performed by executing an ISA SM2 instruction in accordance with an exemplary embodiment of the present application. The illustrated steps relate to the microinstructions decoded from the ISA SM2 instruction.

In step S2402, as indicated by the user identification code pointer stored in input register EAX, the processor 600 reads the user identification code $ID_A$ from the system memory, and obtains the length $ENTL_A$ of the user identification code $ID_A$ from input register ECX. In step S2404, data combination is performed to get data S, $$S = ENTL_A \| ID_A \| a \| b \| x_G \| y_G \| x_A \| y_A$$

where a and b are elliptic curve parameters, $(x_G, y_G)$ represents an elliptic curve base point G, $(x_A, y_A)$ is the public key, and S is a bit string.

In step S2406, message padding is performed on the bit string S. In step S2408, a hardware control word, a loop size (the number of bytes of the bit string S), and the padded bit string are sent into the SM2 engine 626, to operate the preprocessing hardware within the SM2 engine 626. The SM3 engine 126 may also operate to speed up the calculation of a preprocessed Hash value. The SM3 engine 126 calculates:

$$Z_A = Hash(ENTL_A \| ID_A \| a \| b \| x_G \| y_G \| x_A \| y_A)$$

The loop size is: ceil((2+ECX/8+32+32+32+32+32)/64), and the register ECX stores the bit length $ENTL_A$ of the user identification code $ID_A$, wherein ceil( ) denotes round up operation.

The step S2408 may be performed through a preprocessing microinstruction that is operative to drive the preprocessing hardware. In an exemplary embodiment, an SM3 engine driving microinstruction is also executed in step S2408. In step S2410, the SM2 engine 626 outputs the preprocessed Hash value $Z_A$. In step S2412, as indicated by the preprocessed Hash value pointer stored in the input register EDI, the preprocessed Hash value $Z_A$ is stored into the system memory. In step S2414, the first preprocessing procedure called by an SM2 instruction ends.

To summarize, in response to an elliptic curve cryptographic instruction (an SM2 instruction) of an instruction set architecture (ISA), a processor obtains a user identification code $ID_A$ by referring to a first register (EAX), obtains a public key $(x_A, y_A)$ by referring to a second register (EBX), performs a first preprocessing procedure using an elliptic curve cryptographic algorithm to generate a preprocessed Hash value $Z_A$ based on the public key $(x_A, y_A)$, the user identification code $ID_A$, and a user identification code length $ENTL_A$, and programs the preprocessed Hash value $Z_A$ into the system memory. The preprocessed Hash value $Z_A$ stored in the system memory will be read in the subsequent second preprocessing procedure. In this case, only one single ISA instruction is enough to complete the first preprocessing procedure of SM2 algorithm. The specially designed SM2 engine 626 speeds up the calculation and improves security. In another exemplary embodiment, the cryptographic unit 118 does not include the specifically designed SM2 engine 626 and SM3 engine 126. Instead, the microcode UCODE is specially designed to transform an ISA SM2 instruction into a plurality of microinstructions to operate the existing arithmetic logic units ALUs to perform the first preprocessing procedure of SM2 algorithm.

Figure 25:
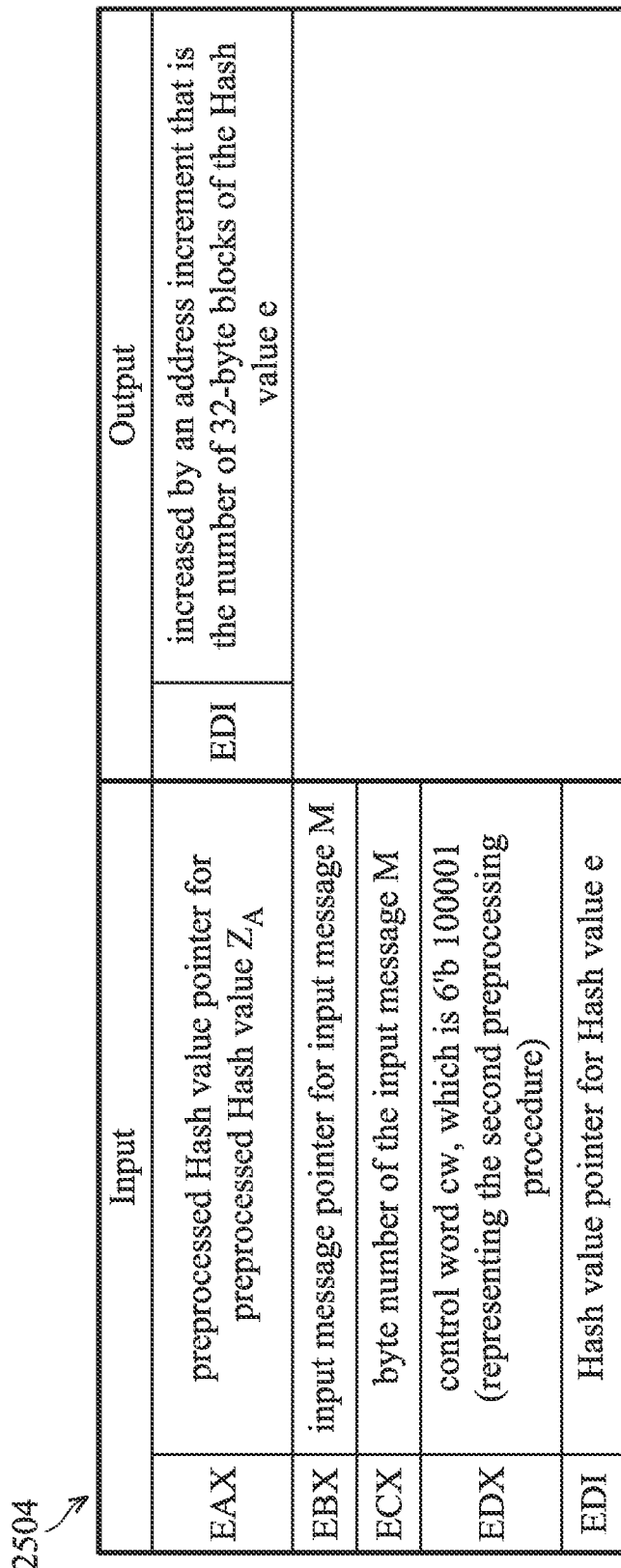
FIG. 25 presents a table 2504 to introduce the design in the microcode UCODE related to the second preprocessing procedure.

FIG. 25 presents a table 2504 to introduce the design in the microcode UCODE related to the second preprocessing procedure. According to the microinstructions generated based on the microcode UCODE in response to an SM2 instruction calling the second preprocessing procedure, the contents in the architectural registers 124 are defined, read and updated as shown in table 2504. The control word cw, 6'b 100001, is programed into the input register EDX in advance to show that the SM2 instruction is calling the second preprocessing procedure. In addition to the input register EDX, the table 2504 further lists the other input registers EAX, EBX, ECX, and EDI which are also used in starting the second preprocessing procedure. When finishing the second preprocessing procedure called by an ISA SM2 instruction, the register EDI is programmed as an output register. The design of the input and output registers may have the other variants.

When being used as an input register, the register EAX stores a preprocessed Hash value pointer, pointing to system memory to indicate the preprocessed Hash value $Z_A$ generated and loaded into the system memory by the aforementioned first preprocessing procedure. The input register EBX stores an input message pointer pointing to a storage space (within the system memory and following ES segmentation technology) of an input message M (e.g. the data to be signed in a signature procedure). The input register ECX stores a byte number of the input message M. The control word cw stored in the input register EDX is 6'b 100001 (representing the second preprocessing procedure). The input register EDI stores a Hash value pointer pointing to a storage space (within the system memory and following ES segmentation technology) for the storage of a Hash value e.

When finishing the second preprocessing procedure requested by an ISA SM2 instruction, the Hash value pointer stored in the register EDI is modified to point to the higher address. The address increment is the number of 32-byte of the Hash value e.

Figure 26:
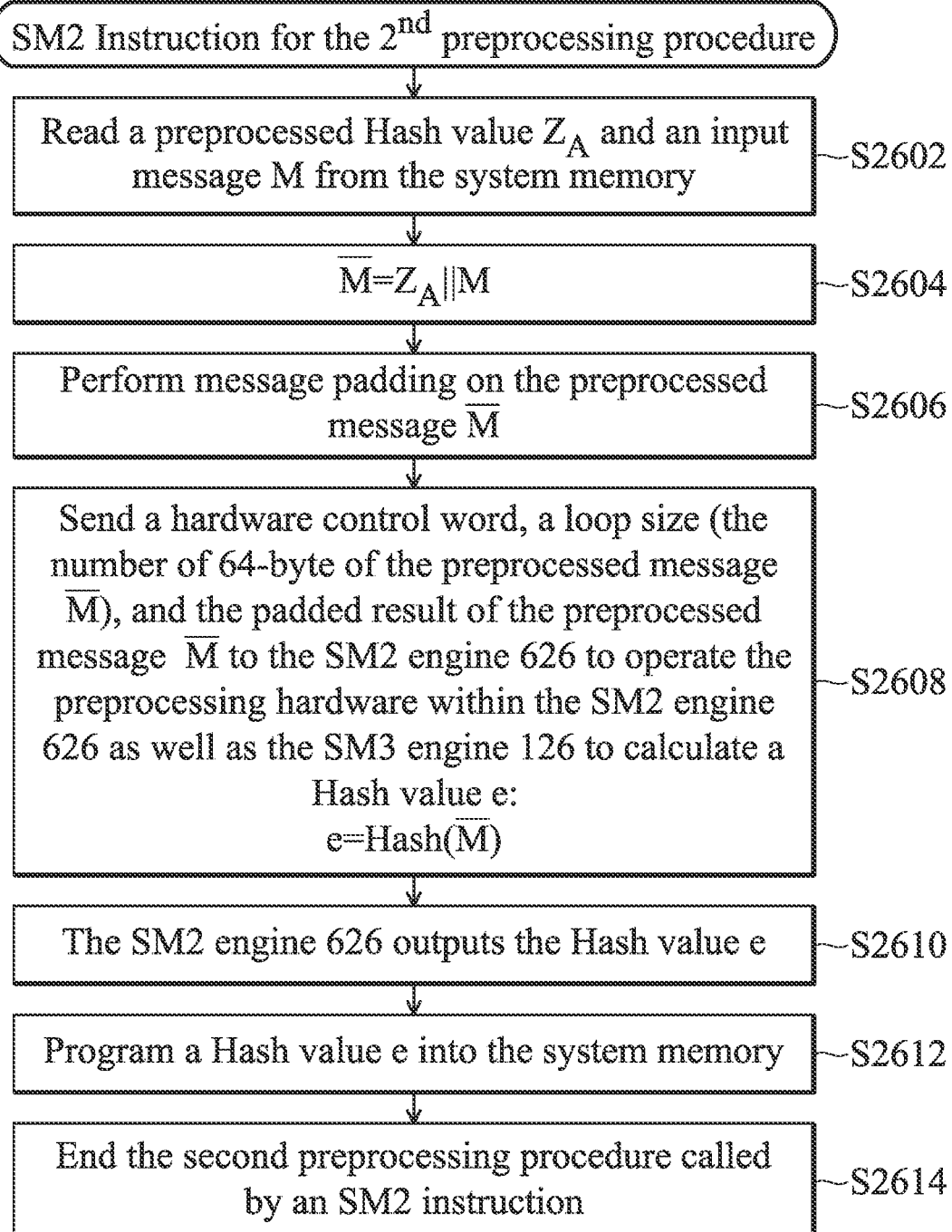
FIG. 26 is a flow chart illustrating the second preprocessing procedure performed by executing an ISA SM2 instruction in accordance with an exemplary embodiment of the present application.

FIG. 26 is a flow chart illustrating the second preprocessing procedure performed by executing an ISA SM2 instruction in accordance with an exemplary embodiment of the present application. The illustrated steps relate to the microinstructions decoded from the ISA SM2 instruction.

In step S2602, as indicated by the preprocessed Hash value pointer obtained from the input register EAX, the processor 600 reads a preprocessed Hash value $Z_A$ and an input message M from the system memory. In step S2604, the preprocessed Hash value $Z_A$ and the input message M are combined to generate a preprocessed message $\overline{M}(=Z_A\|M)$. In step S2606, message padding is performed on the preprocessed message $\overline{M}$.

In step S2608, a hardware control word, a loop size (the number of 64-byte of the preprocessed message $\overline{M}$), and the padded result of the preprocessed message $\overline{M}$ are sent into the SM2 engine 626 to operate the preprocessing hardware within the SM2 engine 626 as well as the SM3 engine 126 to calculate a Hash value e:

$$e=\text{Hash}(\overline{M})$$

The loop size may be calculated by: ceil((32+ECX)/64), where ECX shows the number of bytes of the input message M, wherein ceil( ) denotes round up operation. The step S2608 may be performed by executing a preprocessing microinstruction that drives the preprocessing hardware. In an exemplary embodiment, the step S2608 is further associated with the execution of an SM3 engine driving microinstruction that drives the SM3 engine 126. In step S2610, the SM2 engine 626 outputs the Hash value e. In step S2612, as indicated by a Hash value pointer obtained from the input register EDI, a Hash value e is stored into the system memory. In step S2614, the second preprocessing procedure called by an SM2 instruction ends.

In summary, in response to an elliptic curve cryptographic instruction (SM2 instruction) of an instruction set architecture (ISA), a processor obtains a preprocessed Hash value $Z_A$ from the system memory by referring to a first register (EAX), obtains an input message M from the system memory by referring to a second register (EBX), performs a second preprocessing procedure of elliptic curve cryptographic algorithm on the preprocessed Hash value $Z_A$ and the input message M to generate a preprocessed message $\overline{M}$, generates a Hash value e based on the preprocessed message $\overline{M}$, and programs the Hash value e into the system memory. In this case, only one single ISA instruction is enough to complete the second preprocessing procedure of SM2 algorithm. In another exemplary embodiment, the cryptographic unit 118 does not include the specifically designed SM2 engine 626 and SM3 engine 126. Instead, the microcode UCODE is specially designed to transform an ISA SM2 instruction into a plurality of microinstructions to operate the existing arithmetic logic units ALUs to perform the second preprocessing procedure of SM2 algorithm.

The aforementioned preprocessing design is implemented by two SM2 instructions, and an input message M is converted into a Hash value e. The first SM2 instruction is executed to perform a first preprocessing procedure to generate a preprocessed Hash value $Z_A$:

$$Z_A=\text{Hash}(ENTL_A\|ID_A\|a\|b\|x_G\|y_G\|x_A\|y_A).$$

The second SM2 instruction is executed to perform a second preprocessing procedure to generate a Hash value e based on the input message M and the preprocessed Hash value $Z_A$, and the calculation is:

$$\overline{M}=Z_A\|M, \text{ and } e=\text{Hash}(\overline{M})$$

Prior to the signature procedure, the first and second preprocessing procedures may be performed in advance to prepare a Hash value for the input message M to be signed. Prior to the signature verification procedure, the first and second preprocessing procedures may be performed in advance to prepare a Hash value for the input message M' from the signer.

In the example of key exchange, the first preprocessing procedure may be performed to calculate the ID Hash value $Z_B$. Different from the calculation of the ID Hash value $Z_A$, when performing the first preprocessing procedure to calculate the ID Hash value $Z_B$, the input register EAX stores a user identification code pointer pointing to a storage space (within the system memory and following ES segmentation technology) of the user identification code $ID_B$. The input register EBX stores a public key pointer pointing to a storage space (within the system memory and following ES segmentation technology) of a public key ($x_B$, $y_B$). The input register ECX stores a bit length $ENTL_B$ of the user identification code $ID_B$. The input register EDI stores a preprocessed Hash value pointer pointing to a storage space (within the system memory and following ES segmentation technology) for the storage of a preprocessed Hash value $Z_B$. In addition, the steps of the flowchart shown in FIG. 24 may be replaced by using the data related to the calculation of the preprocessed Hash value $Z_B$, which will not be repeated here.

The following paragraphs describe the hardware design of the present application in detail.

Figure 27:
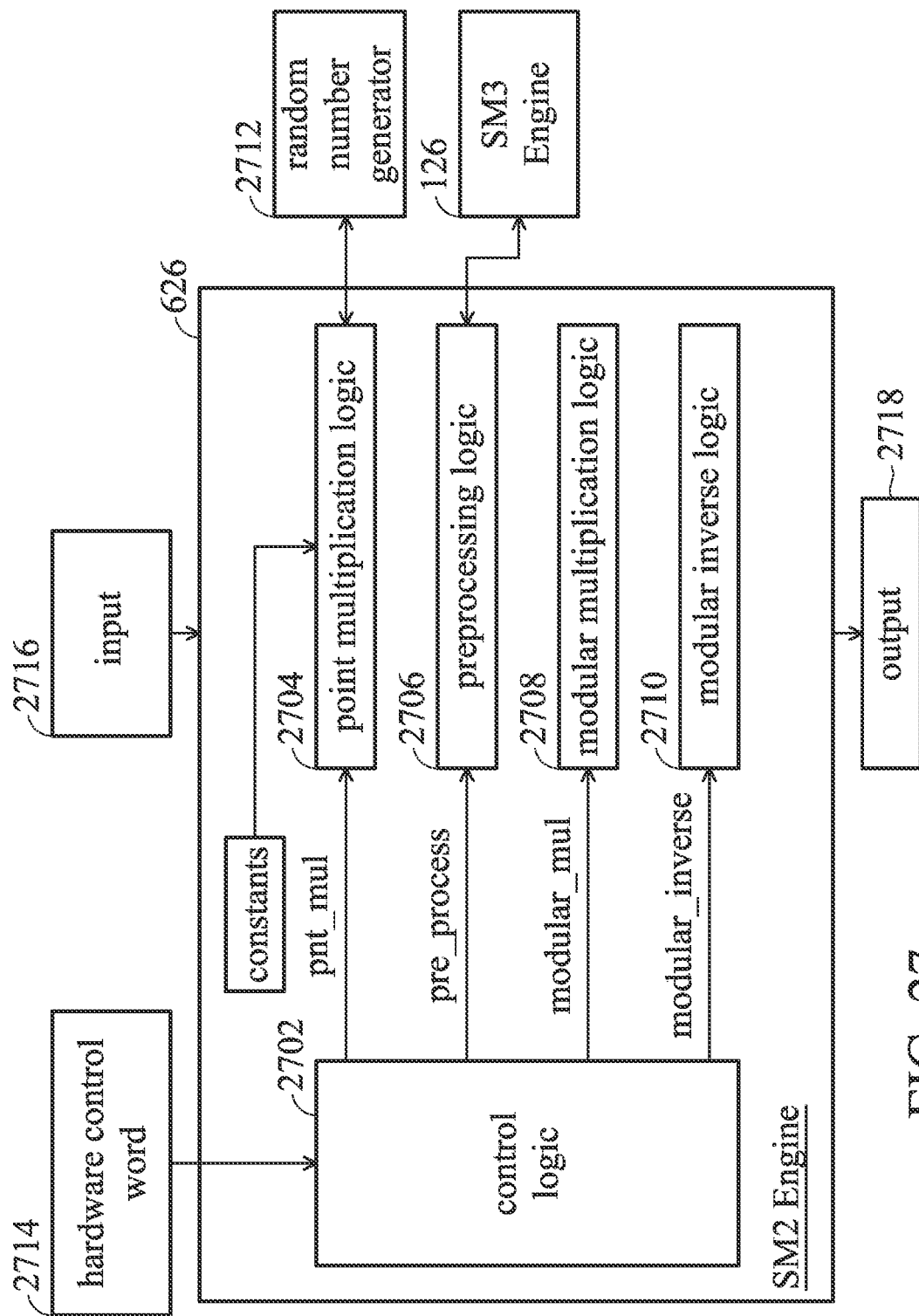
FIG. 27 illustrates the detailed hardware architecture of the SM2 engine 626 in accordance with an exemplary embodiment of the present application.

FIG. 27 illustrates the detailed hardware architecture of the SM2 engine 626 in accordance with an exemplary embodiment of the present application, which includes hardware for a control logic 2702, a point multiplication logic 2704, a preprocessing logic 2706, a modular multiplication logic 2708, and a modular inverse logic 2710. The cryptographic unit 618 of FIG. 6 further includes a random number generator 2712. The SM2 engine 626 is also connected to the random number generator 2712 and the SM3 engine 126.

According to a hardware control word 2714, the control logic 2702 outputs a control signal pnt_mul to operate the point multiplication logic 2704, or outputs a control signal preprocess to operate the preprocessing logic 2706, or outputs a control signal modular_mul to operate the modular multiplication logic 2708, or outputs a control signal modular_inverse to operate the modular inverse logic 2710. The input 2716 may be obtained as indicated by the input registers designed for the called SM2 procedure. After the SM2 procedure, the SM2 engine 626 generates an output 2718.

Figure 28:
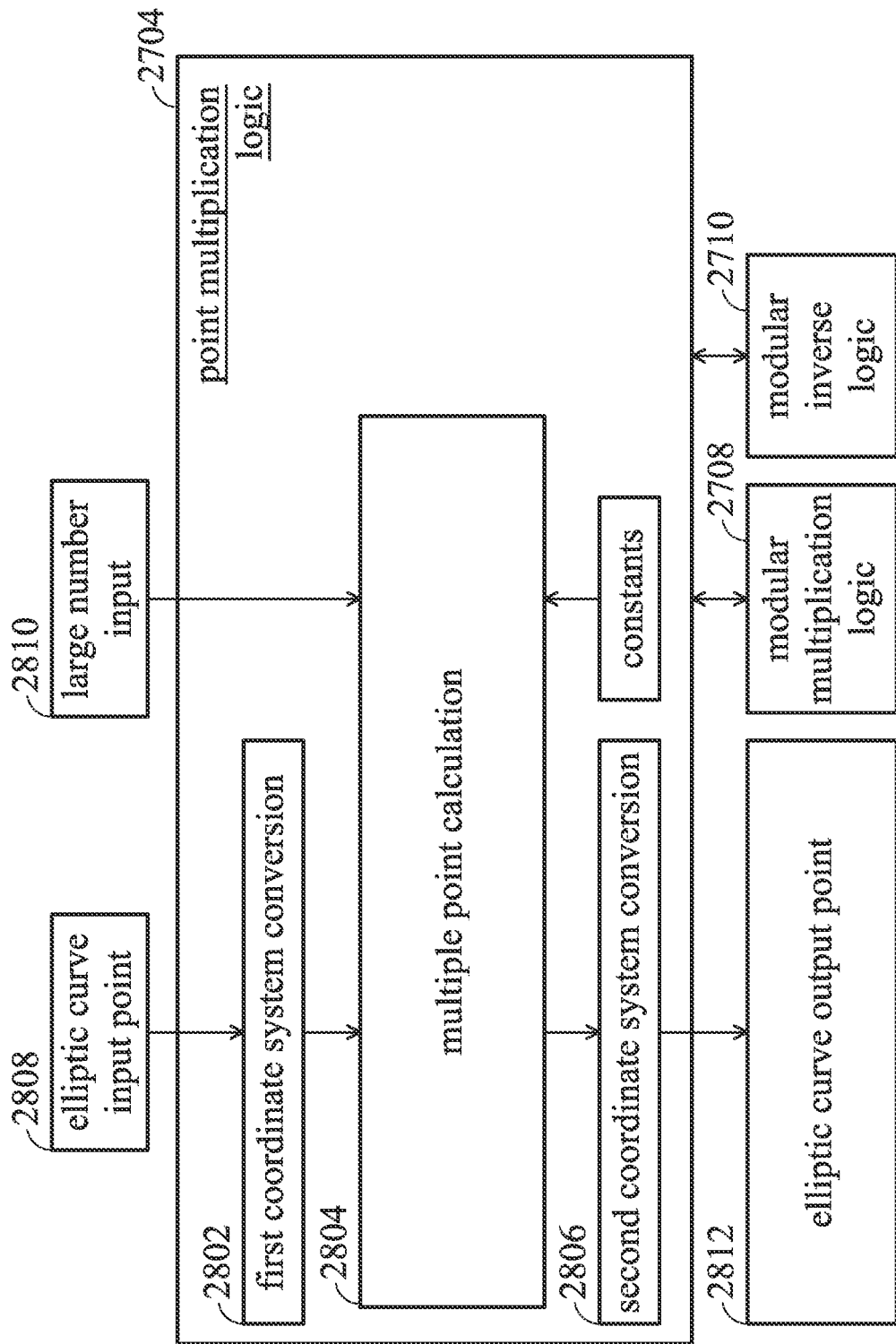
FIG. 28 illustrates the details of the point multiplication logic 2704 driven by a point multiplication microinstruction in accordance with an exemplary embodiment of the present application.

FIG. 28 illustrates the details of the point multiplication logic 2704 driven by a point multiplication microinstruction in accordance with an exemplary embodiment of the present application. The hardware for point multiplication logic 2704 is implemented by hardware for a first coordinate system conversion 2802, a multiple point calculation 2804, and a second coordinate system conversion 2806. The hardware of point multiplication logic 2704 may be further connected to the hardware of modular multiplication logic 2708 and modular inverting logic 2710. Based on an elliptic curve input point 2808 and a large number input 2810 sent into the point multiplication logic 2704, with the co-work of the modular multiplication logic 2708 and the modular inverse logic 2710, an elliptic curve output point 2812 is calculated.

In an exemplary embodiment, the first coordinate system conversion logic 2802 converts the elliptic curve input point 2808 (that is an affine coordinate point) into a first intermediate point. The first intermediate point is an aggravated projective coordinate point. The hardware for multiple point calculation 2804 uses the input large number 2810 to perform a multiple point calculation on the first intermediate point to generate a second intermediate point. The second coordinate system conversion logic 2806 converts the second intermediate point that is an aggravated projective coordinate point into the elliptic curve output point 2812. The elliptic curve output point 2812 is an affine coordinate point.

Figure 29:
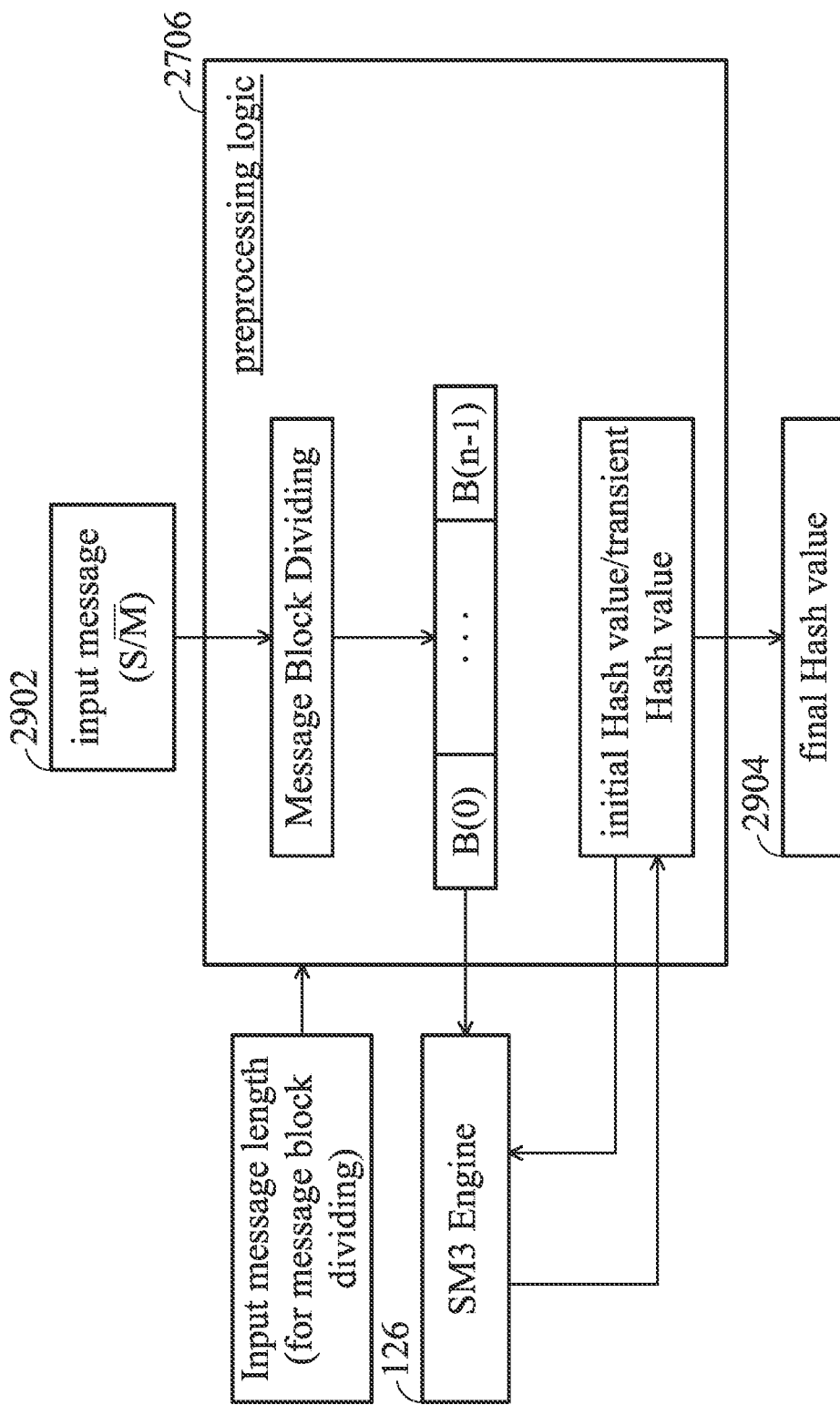
FIG. 29 illustrates the hardware of a preprocessing logic 2706, which is driven by a preprocessing microinstruction in accordance with an exemplary embodiment of the present application.

FIG. 29 illustrates the hardware of a preprocessing logic 2706, which is driven by a preprocessing microinstruction in accordance with an exemplary embodiment of the present application. The preprocessing logic 2706 divides the padded message into blocks. Accordingly, the input message 2902 is transformed into n message blocks B(0) ... B(n−1), which are sent to the SM3 engine 126 block by block for message expansion and iterative compression, and the transient Hash value is constantly updated, and finally a final Hash value 2904 is generated. Specifically, the preprocessing logic 2706 sends the first message block B(0) and an initial Hash value V(0) to the SM3 engine 126 to generate a transient Hash value V(1), and then the second message block B(1) and the transient Hash value V(1) are sent to the SM3 engine 126 to generate the transient Hash value V(2), and so on, until the final Hash value V(n) is generated.

Figure 30:
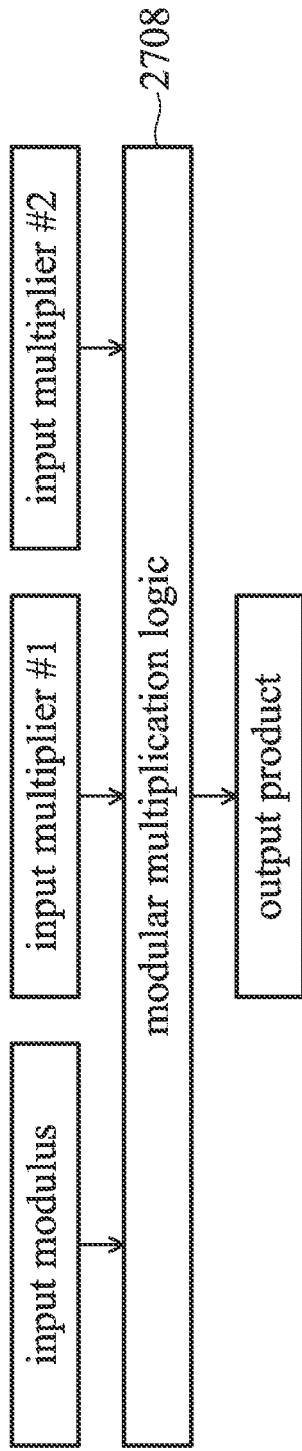
FIG. 30 details the hardware of the modular multiplication logic 2708 that is driven by a modular multiplication microinstruction in accordance with an exemplary embodiment of the present application.

FIG. 30 details the hardware of the modular multiplication logic 2708 that is driven by a modular multiplication microinstruction in accordance with an exemplary embodiment of the present application. Based on the hardware input, the modular multiplication logic 2708 performs a calculation:

$$\text{output product}=(\text{input multiplier \#1})*(\text{input multiplier \#2})\bmod(\text{input modulus})$$

The input multiplier #1, input multiplier #2, and input modulus may be called the first, second, and third modular multiplication inputs, respectively. The output product is the modular multiplication output.

Figure 31:
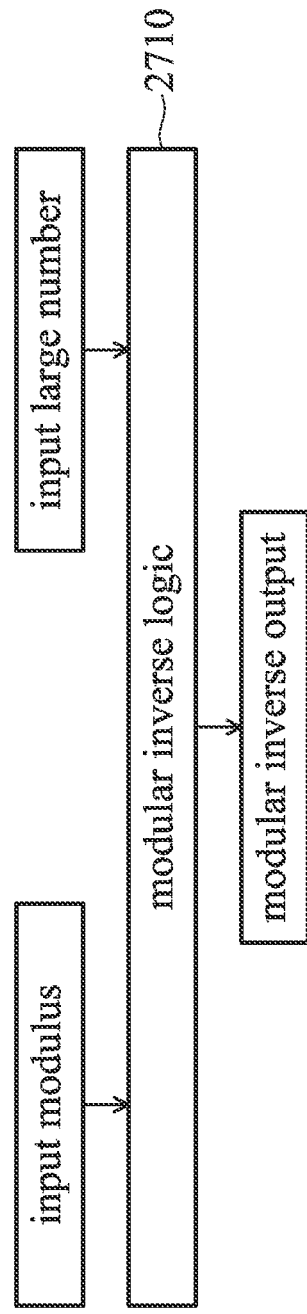
FIG. 31 details the hardware of the modular inverse logic 2710, which is driven by a modular inverse microinstruction in accordance with an exemplary embodiment of the present application

FIG. 31 details the hardware of the modular inverse logic 2710, which is driven by a modular inverse microinstruction in accordance with an exemplary embodiment of the present application. Based on the hardware input, the modular inverse logic 2710 performs a calculation:

$$\text{modular inverse output}=(\text{input large number})^{-1}\bmod(\text{input modulus})$$

The input large number can be called the first modular inverse input. The input modulus can be called the second modular inverse input.

The hardware and microcode UCODE design in the present application may have various variations.

In an exemplary embodiment, the cryptographic unit 118 does not include the specifically designed SM2 engine 626. By planning the microcode UCODE content, an ISA single SM2 instruction is converted into a plurality of microinstructions to operate the existing ALUs to accomplish the SM2 algorithm.

In another exemplary embodiment, an SM2 engine having fewer functional modules than the SM2 engine 626 is proposed, and the missing functional modules (for example, the hardware for the modular multiplication logic 2708) are replaced by some exiting ALUs operated according to a specially designed microcode UCODE.

In the conventional technology, more than one ISA instruction is needed to implement a Hash cryptographic algorithm, the intermediate data generated during the operation may be exposed, and data security is poor. In the present application, a processor with a Hash cryptographic algorithm (e.g., an SM3 algorithm) and its data processing method are proposed. Only one single ISA instruction is enough to operate the processor to accomplish the Hash cryptographic algorithm. The intermediate data generated in the calculations of the Hash cryptographic algorithm is protected within the internal storage space of the processor. The intermediate data cannot be accessed from outside the processor, so that data security is greatly improved. In the conventional technology, the software and/or the specialized hardware (e.g., an external cryptographic card) is used to implement an elliptic curve cryptographic algorithm. Data security cannot be effectively guaranteed by software implementation. The use of specialized hardware implementation requires buying additional specialized hardware during deployment, thus increasing deployment costs. In the present application, a processor with an elliptic curve cryptographic algorithm (e.g., an SM2 algorithm) and its data processing method are proposed. Only one single ISA instruction is enough to operate the processor to accomplish a particular function of the elliptic curve cryptographic algorithm. The intermediate data generated in the calculations of the elliptic curve cryptographic algorithm is protected within the internal storage space of the processor. The intermediate data cannot be accessed from outside the processor, so that data security is greatly improved. In addition, deployment costs are reduced by eliminating the need to purchase additional specialized hardware during deployment.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A processor with an elliptic curve cryptographic algorithm, comprising:
   a cryptographic unit, including an elliptic curve cryptographic acceleration engine;
   a set of architectural registers, including a first register and a second register, wherein, for execution of a first elliptic curve cryptographic instruction, the first register stores a Hash value pointer pointing to a first storage space within a system memory, a Hash value of data to be signed is stored in the first storage space, and the second register stores a private key pointer pointing to a private key of a signer;
   a microcode storage device, storing microcode; and
   a decoder, generating a plurality of microinstructions based on the microcode in response to the first elliptic curve cryptographic instruction;
   wherein, in response to the first elliptic curve cryptographic instruction of an instruction set architecture, the processor reads the Hash value of the data to be signed from the first storage space by referring to the first register, reads the private key by referring to the second register, performs a signature procedure using the elliptic curve cryptographic algorithm on the Hash value based on the private key to generate a digital signature, and programs the digital signature into a second storage space within the system memory;
   the elliptic curve cryptographic acceleration engine includes hardware for point multiplication that receives an elliptic curve input point and a big number input to generate an elliptic curve output point;
   the microinstructions decoded from the first elliptic curve cryptographic instruction includes a point multiplication microinstruction;
   in response to the point multiplication microinstruction, the hardware for point multiplication performs a calculation, $(x_1, y_1)=[k]G$, where k is a random number used as the big number input, G is an elliptic curve base point used as the elliptic curve input point, and $(x_1, y_1)$ is the elliptic curve output point generated by the hardware for point multiplication;
   according to the microinstructions, the processor performs calculation, $r=(e+x_1) \bmod n$, wherein e is the Hash value, n is the order of G, and r is calculated to form the digital signature;
   according to the microinstructions, the processor determines whether r is zero and whether r+k is n; and
   according to the microinstructions, if r is zero or r+k is n, the random number is renewed and the point multiplication microinstruction is executed again,
   wherein:
   prior to the first elliptic curve cryptographic instruction, the processor executes a second elliptic curve cryptographic instruction;
   for execution of the second elliptic curve cryptographic instruction, the first register stores a user identification code pointer and the second register stores a public key pointer, the user identification code pointer points to a fourth storage space within the system memory that stores a user identification code, and the public key pointer points to a public key; and
   in response to the second elliptic curve cryptographic instruction, the processor reads the user identification code from the fourth storage space by referring to the first register, reads the public key by referring to the second register, performs a first preprocessing procedure using the elliptic curve cryptographic algorithm on the user identification code and a user identification code length based on the public key to generate a preprocessed Hash value, and programs the preprocessed Hash value into a fifth storage space within the system memory to be converted into the Hash value for execution of the first elliptic curve cryptographic instruction.

2. The processor with the elliptic curve cryptographic algorithm as claimed in claim 1, wherein: parameters used in the first elliptic curve cryptographic instruction include the Hash value pointer, the private key pointer, and a signature pointer pointing to the second storage space.

3. The processor with the elliptic curve cryptographic algorithm as claimed in claim 1, further comprising:
   a third register, storing an intermediate variable pointer, pointing to a third storage space within the system memory;
   wherein an intermediate variable generated by the processor while performing the signature procedure on the Hash value is stored in the third storage space as indicated by the intermediate variable pointer obtained from the third register.

4. The processor with the elliptic curve cryptographic algorithm as claimed in claim 3, wherein: prior to performing the signature procedure on the Hash value, the processor stores a starting address of the third storage space in the third register, and resets all bytes in the third storage space to zero.

5. The processor with the elliptic curve cryptographic algorithm as claimed in claim 4, wherein: the third storage space is allocated by an operating system according to a request from software.

6. The processor with the elliptic curve cryptographic algorithm as claimed in claim 1, further comprising:
a fourth register, wherein a length of the digital signature is programmed into the fourth register when the processor finishes the signature procedure on the Hash value.

7. The processor with the elliptic curve cryptographic algorithm as claimed in claim 1, further comprising:
a fifth register, storing a signature pointer pointing to the second storage space, wherein when finishing the signature procedure on the Hash value, the processor produces an address increment on the signature pointer stored in the fifth register, and the address increment is equal to a length of the digital signature.

8. The processor with the elliptic curve cryptographic algorithm as claimed in claim 1, further comprising:
a sixth register, storing a control word, indicating performing the signature procedure in response to the first elliptic curve cryptographic instruction.

9. The processor with the elliptic curve cryptographic algorithm as claimed in claim 1, wherein:
according to the microinstructions:
the set of architectural registers is defined, read and updated; and
when a register in the set of architectural registers provides a control word indicating a signature code, the cryptographic unit using the set of architectural registers performs the signature procedure on the Hash value based on the private key.

10. The processor with the elliptic curve cryptographic algorithm as claimed in claim 1, wherein:
the elliptic curve cryptographic algorithm engine further includes hardware for modular inverse calculation, which receives a first modular inverse input and a second modular inverse input to generate a modular inverse output;
the elliptic curve cryptographic algorithm engine further includes hardware for modular multiplication calculation, which receives a first modular multiplication input, a second modular multiplication input, and a third modular multiplication input to generate a modular multiplication output;
when r is not zero and r+k is not n, the processor executes a modular inverse microinstruction and a modular multiplication microinstruction provided by the microinstructions decoded from the first elliptic curve cryptographic instruction;
in response to the modular inverse microinstruction, the hardware for modular inverse calculation calculates:

$$s'=(1+d_A)^{-1} \bmod n$$

where $d_A$ is the private key, $(1+d_A)$ is the first modular inverse input, n is the second modular inverse input, and s' is the modular inverse output;

in response to the modular multiplication microinstruction, the hardware for modular multiplication calculation calculates:

$$s=(s'*(k-r*d_A)) \bmod n$$

where s' is the first modular multiplication input, $(k-r*d_A)$ is the second modular multiplication input, n is the third modular multiplication input, and s is the modular multiplication output;
according to the microinstructions, the processor checks whether s is zero and, if yes, the processor renews the random number to execute the point multiplication microinstruction again; and if s is not zero, according to the microinstructions, the digital signature is (r, s).

11. The processor with the elliptic curve cryptographic algorithm as claimed in claim 1, wherein the hardware for point multiplication comprises: hardware for a first coordinate system conversion, converting the elliptic curve input point that is an affine coordinate point into a first intermediate point that is an aggravated projective coordinate point;
hardware for multiple point calculation, using the big number input to perform a multiple point calculation on the first intermediate point to generate a second intermediate point; and
hardware for a second coordinate system conversion, converting the second intermediate point that is an aggravated projective coordinate point into the elliptic curve output point that is an affine coordinate point.

12. The processor with the elliptic curve cryptographic algorithm as claimed in claim 1, wherein: parameters used in the second elliptic curve cryptographic instruction include the user identification code pointer, the public key pointer, the user identification code length, and a preprocessed Hash value pointer pointing to the fifth storage space.

13. The processor with the elliptic curve cryptographic algorithm as claimed in claim 1, further comprising: a third register, storing an intermediate variable pointer pointing to a third storage space within the system memory;
wherein an intermediate variable generated by the processor while performing the first preprocessing procedure is stored in the third storage space as indicated by the intermediate variable pointer obtained from the third register.

14. The processor with the elliptic curve cryptographic algorithm as claimed in claim 1, further comprising: a fourth register, storing the user identification code length.

15. The processor with the elliptic curve cryptographic algorithm as claimed in claim 1, further comprising: a fifth register, storing a preprocessed Hash value pointer pointing to the fifth storage space,
wherein when finishing the first preprocessing procedure, the processor produces an address increment on the preprocessed Hash value pointer stored in the fifth register, and the address increment is equal to a length of the preprocessed Hash value.

16. The processor with the elliptic curve cryptographic algorithm as claimed in claim 1, further comprising: a sixth register, storing a control word, indicating to perform the first preprocessing procedure in response to the second elliptic curve cryptographic instruction.

17. The processor with the elliptic curve cryptographic algorithm as claimed in claim 1, wherein: the decoder generates a plurality of microinstructions based on the microcode in response to the second elliptic curve cryptographic instruction; and
according to the microinstructions decoded from the second elliptic curve cryptographic instruction:

the set of architectural registers is defined, read and updated; and when a register in the set of architectural registers provides a control word indicating a first preprocessing code, the cryptographic unit using the set of architectural registers performs the first preprocessing procedure.

18. The processor with the elliptic curve cryptographic algorithm as claimed in claim 17, wherein:

according to the microinstructions decoded from the second elliptic curve cryptographic instruction, a calculation is performed:

$$S=ENTL_A\|ID_A\|a\|b\|x_G\|y_G\|x_A\|y_A$$

where $ENTL_A$ is the user identification code length, $ID_A$ is the user identification code, a and b are elliptic curve parameters, $(x_G, y_G)$ is an elliptic curve base point, $(x_A, y_A)$ is a coordinate representation of the public key, and S is a bit string.

19. The processor with the elliptic curve cryptographic algorithm as claimed in claim 18, wherein:

the elliptic curve cryptographic acceleration engine further includes hardware for preprocessing; the cryptographic unit further includes a Hash cryptographic acceleration engine;

the microinstructions decoded from the second elliptic curve cryptographic instruction includes a preprocessing microinstruction;

in response to the preprocessing microinstruction, the hardware for preprocessing divides the bit string, S, with finished message padding into message blocks to be sent into the Hash cryptographic acceleration engine for a Hash value transform; and the hardware for preprocessing includes an internal storage space storing an initial Hash value that is gradually updated by the Hash cryptographic acceleration engine till a Hash value, Hash(S), is updated into the internal storage space as the preprocessed Hash value.

20. The processor with the elliptic curve cryptographic algorithm as claimed in claim 1, wherein:

prior to the first elliptic curve cryptographic instruction and after the second elliptic curve cryptographic instruction, the processor executes a third elliptic curve cryptographic instruction;

for execution of the third elliptic curve cryptographic instruction, the first register stores a preprocessed Hash value pointer and the second register stores a data pointer for the data to be signed, the preprocessed Hash value pointer points to the fifth storage space, and the data pointer points to a sixth storage space within the system memory that stores the data to be signed; and in response to the third elliptic curve cryptographic instruction, the processor reads the preprocessed Hash value from the fifth storage space by referring to the first register, reads the data to be signed from the sixth storage space by referring to the second register, performs a second preprocessing procedure using the elliptic curve cryptographic algorithm on the preprocessed Hash value and the data to be signed to generate preprocessed data, processes the preprocessed data to generate the Hash value, and programs the Hash value into the first storage space for execution of the first elliptic curve cryptographic instruction.

21. The processor with the elliptic curve cryptographic algorithm as claimed in claim 20, wherein:

parameters used in the third elliptic curve cryptographic instruction include the preprocessed Hash value pointer and the data pointer for the data to be signed.

22. The processor with the elliptic curve cryptographic algorithm as claimed in claim 20, further comprising:

a third register, storing an intermediate variable pointer pointing to a third storage space within the system memory;

wherein an intermediate variable generated by the processor while performing the second preprocessing procedure is stored in the third storage space as indicated by the intermediate variable pointer obtained from the third register.

23. The processor with the elliptic curve cryptographic algorithm as claimed in claim 20, further comprising:

a fourth register, storing a length of the data to be signed.

24. The processor with the elliptic curve cryptographic algorithm as claimed in claim 20, further comprising:

a fifth register, storing the Hash value pointer pointing to the first storage space, wherein when finishing the second preprocessing procedure, the processor produces an address increment on the Hash value pointer stored in the fifth register, and the address increment is equal to a length of the Hash value.

25. The processor with the elliptic curve cryptographic algorithm as claimed in claim 20, further comprising:

a sixth register, storing a control word, indicating performing the second preprocessing procedure in response to the third elliptic curve cryptographic instruction.

26. The processor with the elliptic curve cryptographic algorithm as claimed in claim 20, wherein: the decoder generates a plurality of microinstructions based on the microcode in response to the third elliptic curve cryptographic instruction; and according to the microinstructions decoded from the third elliptic curve cryptographic instruction: the set of architectural registers is defined, read and updated; and when a register in the set of architectural registers provides a control word indicating a second preprocessing code, the cryptographic unit using the set of architectural registers performs the second preprocessing procedure.

27. The processor with the elliptic curve cryptographic algorithm as claimed in claim 26, wherein:

according to the microinstructions, a calculation is performed:

$$\overline{M}=Z_A\|M$$

where $Z_A$ is the preprocessed Hash value, M is the data to be signed, and is $\overline{M}$ is the preprocessed data.

28. The processor with the elliptic curve cryptographic algorithm as claimed in claim 27, wherein:

the elliptic curve cryptographic acceleration engine includes hardware for preprocessing;

the cryptographic unit further includes a Hash cryptographic acceleration engine;

the microinstructions decoded from the third elliptic curve cryptographic instruction includes a preprocessing microinstruction;

in response to the preprocessing microinstruction, the hardware for preprocessing divides the preprocessed data,$\overline{M}$, with finished message padding into message blocks to be sent into the Hash cryptographic acceleration engine for a Hash value transform; and the hardware for preprocessing includes an internal storage space storing an initial Hash value that is gradually updated by the Hash cryptographic acceleration engine till a Hash value, Hash($\overline{M}$), is updated into the internal storage space as the Hash value.

29. A method for performing an elliptic curve cryptographic algorithm using a processor, comprising:
providing a cryptographic unit on the processor, wherein the cryptographic unit includes an elliptic curve cryptographic acceleration engine;
in response to a first elliptic curve cryptographic instruction of an instruction set architecture, reading a first storage space of a system memory to obtain a Hash value of data to be signed, reading a private key, operating the elliptic curve cryptographic acceleration engine to performing a signature procedure using the elliptic curve cryptographic algorithm on the Hash value based on the private key to generate a digital signature, and programming the digital signature into a second storage space within the system memory;
wherein:
the elliptic curve cryptographic acceleration engine includes hardware for point multiplication that receives an elliptic curve input point and a big number input to generate an elliptic curve output point;
microinstructions decoded from the first elliptic curve cryptographic instruction includes a point multiplication microinstruction;
in response to the point multiplication microinstruction, the hardware for point multiplication performs a calculation, $(x_1, y_1)=[k]G$, where k is a random number used as the big number input, G is an elliptic curve base point used as the elliptic curve input point, and $(x_1, y_1)$ is the elliptic curve output point generated by the hardware for point multiplication;
according to the microinstructions, the processor performs calculation, $r=(e+x_1) \mod n$, wherein e is the Hash value, n is the order of G, and r is calculated to form the digital signature;
according to the microinstructions, the processor determines whether r is zero and whether r+k is n; and
according to the microinstructions, if r is zero or r+k is n, the random number is renewed and the point multiplication microinstruction is executed again,
wherein:
prior to the first elliptic curve cryptographic instruction, executing a second elliptic curve cryptographic instruction;
for execution of the second elliptic curve cryptographic instruction, the first register stores a user identification code pointer and the second register stores a public key pointer, the user identification code pointer points to a fourth storage space within the system memory that stores a user identification code, and the public key pointer points to a public key; and
in response to the second elliptic curve cryptographic instruction, reading the user identification code from the fourth storage space by referring to the first register, reads the public key by referring to the second register, performs a first preprocessing procedure using the elliptic curve cryptographic algorithm on the user identification code and a user identification code length based on the public key to generate a preprocessed Hash value, and programs the preprocessed Hash value into a fifth storage space within the system memory to be converted into the Hash value for execution of the first elliptic curve cryptographic instruction.

30. The method as claimed in claim 29, wherein:
parameters involved by the first elliptic curve cryptographic instruction include a Hash value pointer pointing to the Hash value, a private key pointer pointing to the private key, and a signature pointer pointing to the second storage space.

31. The method as claimed in claim 29, further comprising:
storing an intermediate variable, generated while performing the signature procedure, in a third storage space within the system memory; and
prior to performing the signature procedure, resetting all bytes in the third storage space to zero.

32. The method as claimed in claim 31, wherein:
the third storage space is allocated by an operating system according to a request from software.

33. The method as claimed in claim 29, further comprising:
generating a plurality of microinstructions based on microcode in response to the first elliptic curve cryptographic instruction; and
according to the microinstructions, if a control word indicates a signature code, performing the signature procedure on the Hash value based on the private key.

34. The method as claimed in claim 29, further comprising:
prior to the first elliptic curve cryptographic instruction, executing a second elliptic curve cryptographic instruction; and
in response to the second elliptic curve cryptographic instruction, reading a user identification code from a fourth storage space within the system memory, reading a public key, performing a first preprocessing procedure using the elliptic curve cryptographic algorithm on the user identification code and a user identification code length based on the public key to generate a preprocessed Hash value, and programing the preprocessed Hash value into a fifth storage space within the system memory to be converted into the Hash value for execution of the first elliptic curve cryptographic instruction.

35. The method as claimed in claim 34, further comprising:
generating a plurality of microinstructions based on microcode in response to the second elliptic curve cryptographic instruction; and
according to the microinstructions, if a control word indicates a first preprocessing code, performing the first preprocessing procedure.

36. The method as claimed in claim 34, further comprising:
prior to the first elliptic curve cryptographic instruction and after the second elliptic curve cryptographic instruction, executing a third elliptic curve cryptographic instruction; and
in response to the third elliptic curve cryptographic instruction, reading the preprocessed Hash value from the fifth storage space, reading the data to be signed from a sixth storage space within the system memory, performing a second preprocessing procedure using the elliptic curve cryptographic algorithm on the preprocessed Hash value and the data to be signed to generate preprocessed data, processing the preprocessed data to generate the Hash value, and programing the Hash value into the first storage space for execution of the first elliptic curve cryptographic instruction.

37. The method as claimed in claim 36, further comprising:
- generating a plurality of microinstructions based on microcode in response to the third elliptic curve cryptographic instruction; and
- according to the microinstructions, if a control word indicates a second preprocessing code, performing the second preprocessing procedure.

* * * * *